(12) United States Patent
Bicer

(10) Patent No.: US 9,015,813 B2
(45) Date of Patent: Apr. 21, 2015

(54) SYSTEMS AND METHODS FOR AUTHENTICATION, VERIFICATION, AND PAYMENTS

(71) Applicant: Jack Bicer, Irvine, CA (US)

(72) Inventor: Jack Bicer, Irvine, CA (US)

(*) Notice: Subject to any disclaimer, the term of this patent is extended or adjusted under 35 U.S.C. 154(b) by 0 days.

(21) Appl. No.: 14/203,380

(22) Filed: Mar. 10, 2014

(65) Prior Publication Data

US 2015/0032578 A1 Jan. 29, 2015

Related U.S. Application Data

(63) Continuation-in-part of application No. 13/963,941, filed on Aug. 9, 2013, now Pat. No. 8,677,116.

(60) Provisional application No. 61/729,266, filed on Nov. 21, 2012, provisional application No. 61/772,110, filed on Mar. 4, 2013, provisional application No. 61/893,767, filed on Oct. 21, 2013.

(51) Int. Cl.
*H04L 29/06* (2006.01)
*G06Q 30/06* (2012.01)

(52) U.S. Cl.
CPC ............ *H04L 63/08* (2013.01); *G06Q 30/0637* (2013.01)

(58) Field of Classification Search
None
See application file for complete search history.

(56) References Cited

U.S. PATENT DOCUMENTS

| | | | |
|---|---|---|---|
| 7,922,082 | B2 | 4/2011 | Muscato |
| 8,177,125 | B1 | 5/2012 | Cooley et al. |
| 8,219,808 | B2 | 7/2012 | Belohoubek et al. |
| 8,256,664 | B1 | 9/2012 | Balfanz et al. |
| 8,332,323 | B2 | 12/2012 | Stals et al. |

(Continued)

FOREIGN PATENT DOCUMENTS

| | | |
|---|---|---|
| EP | 1197046 A1 | 4/2002 |
| GB | 2481663 B2 | 6/2012 |

(Continued)

OTHER PUBLICATIONS http://www.calvin-c.com/blog/tag/mobile-payment Jul. 23, 2013.

(Continued)

*Primary Examiner* — Jung Kim
*Assistant Examiner* — Robert Leung
(74) *Attorney, Agent, or Firm* — Knobbe, Martens, Olson & Bear LLP

(57) ABSTRACT

Computer systems and methods are provided for authenticating a user seeking to conduct at least one interaction with a secured capability provided by a computer. The method includes providing a first identifier to at least one verification server and providing a second identifier to an electronic device being used by the user. The first identifier and the second identifier each corresponds to the secured capability. The method further includes providing the electronic device with a user-selectable link configured to, upon being selected by the user, initiate a program to run on the electronic device. The program is configured to transmit a third identifier to the at least one verification server. The third identifier corresponds to the secured capability. The method further includes receiving authorization information from at least one of the electronic device and the at least one verification server. The method further includes using a processor (e.g., a processor of the computer) to provide the user with access to conduct the at least one interaction with the secured capability in response at least to the authorization information.

26 Claims, 30 Drawing Sheets

(56) References Cited

U.S. PATENT DOCUMENTS

| | | |
|---|---|---|
| 8,595,809 B2 | 11/2013 | Chayanam et al. |
| 2003/0233334 A1 | 12/2003 | Smith |
| 2004/0019792 A1 | 1/2004 | Funamoto et al. |
| 2006/0271497 A1* | 11/2006 | Cullen et al. ............ 705/64 |
| 2006/0272007 A1 | 11/2006 | Sweeley et al. |
| 2007/0079135 A1 | 4/2007 | Saito |
| 2007/0244831 A1* | 10/2007 | Kuo ................. 705/67 |
| 2008/0077526 A1 | 3/2008 | Arumugam |
| 2008/0319905 A1 | 12/2008 | Carlson |
| 2009/0235347 A1 | 9/2009 | Syed et al. |
| 2009/0283589 A1 | 11/2009 | Moore et al. |
| 2009/0293112 A1 | 11/2009 | Moore et al. |
| 2010/0242103 A1 | 9/2010 | Richardson et al. |
| 2010/0273527 A1 | 10/2010 | Silverbrook et al. |
| 2011/0071895 A1 | 3/2011 | Masri |
| 2011/0125561 A1 | 5/2011 | Marcus |
| 2011/0137742 A1 | 6/2011 | Parikh |
| 2011/0137797 A1* | 6/2011 | Stals et al. ............ 705/44 |
| 2011/0208659 A1 | 8/2011 | Easterly et al. |
| 2011/0212717 A1 | 9/2011 | Rhoads et al. |
| 2011/0219427 A1 | 9/2011 | Hito et al. |
| 2011/0258443 A1 | 10/2011 | Barry |
| 2011/0288962 A1 | 11/2011 | Rankin, Jr. et al. |
| 2011/0289106 A1 | 11/2011 | Rankin, Jr. et al. |
| 2011/0307318 A1 | 12/2011 | LaPorte et al. |
| 2011/0313870 A1 | 12/2011 | Eicher et al. |
| 2011/0320343 A1* | 12/2011 | Koh et al. ............ 705/39 |
| 2012/0012649 A1 | 1/2012 | Hsu |
| 2012/0078782 A1 | 3/2012 | Schoenberg et al. |
| 2012/0084162 A1 | 4/2012 | Smith et al. |
| 2012/0123841 A1 | 5/2012 | Taveau et al. |
| 2012/0124656 A1 | 5/2012 | Senac |
| 2012/0136739 A1 | 5/2012 | Chung |
| 2012/0150729 A1 | 6/2012 | Isaacson et al. |
| 2012/0158581 A1 | 6/2012 | Cooley et al. |
| 2012/0159591 A1 | 6/2012 | Payne et al. |
| 2012/0173426 A1 | 7/2012 | Foster et al. |
| 2012/0179527 A1 | 7/2012 | Ball et al. |
| 2012/0191553 A1 | 7/2012 | Sathe et al. |
| 2012/0191569 A1* | 7/2012 | Shah ............ 705/26.41 |
| 2012/0191610 A1 | 7/2012 | Prasad |
| 2012/0203695 A1* | 8/2012 | Morgan et al. ............ 705/44 |
| 2012/0222055 A1 | 8/2012 | Schaefer et al. |
| 2012/0234907 A1 | 9/2012 | Clark et al. |
| 2012/0246018 A1 | 9/2012 | Sathe et al. |
| 2012/0254025 A1 | 10/2012 | Prasad |
| 2012/0265585 A1 | 10/2012 | Muirbrook et al. |
| 2012/0267432 A1 | 10/2012 | Kuttuva |
| 2012/0284130 A1 | 11/2012 | Lewis et al. |
| 2012/0290418 A1 | 11/2012 | Itwaru |
| 2012/0290480 A1 | 11/2012 | Chen |
| 2012/0310757 A1 | 12/2012 | Kim et al. |
| 2013/0041781 A1 | 2/2013 | Freydberg |
| 2013/0054320 A1 | 2/2013 | Dorso et al. |
| 2013/0060686 A1 | 3/2013 | Mersky |
| 2013/0067235 A1 | 3/2013 | Anson |
| 2013/0254858 A1 | 9/2013 | Giardina et al. |
| 2013/0262850 A1 | 10/2013 | Canpolat et al. |
| 2013/0269018 A1 | 10/2013 | Dingwall et al. |

FOREIGN PATENT DOCUMENTS

| | | |
|---|---|---|
| WO | WO 2006/102848 | 10/2006 |
| WO | WO 2007/144708 | 12/2007 |
| WO | WO 2008/040949 | 4/2008 |
| WO | WO 2009/116954 | 9/2009 |
| WO | WO 2012/069845 | 5/2013 |

OTHER PUBLICATIONS http://www.calvin-c.com/blog/mobile-payment Jul. 23, 2013.

International Search Report and Written Opinion for International Application No. PCT/US2013/070791 dated Mar. 13, 2014 in 14 pages.

Kao et al., Physical Access Control Based on QR Code, 2011 International Conference on Cyber-Enabled Distributed Computing and Knowledge Discovery, 2011, 285-288.

International Search Report and Written Opinion for International Application No. PCT/US2014/060971 dated Feb. 6, 2015 in 11 pages.

* cited by examiner

SYSTEMS AND METHODS FOR AUTHENTICATION, VERIFICATION, AND PAYMENTS

CROSS-REFERENCE TO RELATED APPLICATIONS

This application is a continuation-in-part from U.S. patent application Ser. No. 13/963,941 filed Aug. 9, 2013, incorporated in its entirety by reference herein, and which claims the benefit of priority to U.S. Provisional Appl. No. 61/729,266, filed Nov. 21, 2012 and U.S. Provisional Appl. No. 61/772,110, filed Mar. 4, 2013, both of which are incorporated in their entirety by reference herein. This application also claims the benefit of priority to U.S. Provisional Appl. No. 61/893,767, filed Oct. 21, 2013 and incorporated in its entirety by reference herein.

BACKGROUND

1. Field

This application is generally directed to systems and methods for authentication and verification of users, and more specifically to such systems and methods utilizing a mobile or portable device.

2. Description of the Related Art

There is a growing need to authenticate users trying to access a secured internet portal (e.g., website) or a real-world secured device (e.g., lock, door) that can be actuated via the internet. In addition, with more and more consumer transactions occurring over the internet, the need for a secure and fast online electronic payment capability is also growing.

SUMMARY

In certain embodiments, a method is provided for authenticating a user seeking to conduct at least one interaction with a secured capability provided by a computer. The method comprises receiving a first signal from the computer providing the secured capability. The first signal comprises a reusable identifier corresponding to the secured capability. The method further comprises receiving a second signal from an electronic device being used by the user. The second signal comprises a copy of the reusable identifier and user verification information. The method further comprises using a processor to evaluate, based at least on the first signal and the second signal, whether the user is authorized to conduct the at least one interaction with the secured capability. The method further comprises, in response to an indication from the processor that the user is authorized to conduct the at least one interaction with the secured capability, transmitting a third signal comprising authorization information to at least one of the electronic device and the computer. In certain embodiments, a non-transitory (e.g., tangible) computer storage is provided having stored thereon a computer program (e.g., code) that instructs a computer system to perform the method described in this paragraph.

In certain embodiments, a computer system is provided for authenticating users seeking to conduct interactions with a plurality of secured capabilities. The computer system comprises a first input configured to receive a plurality of first signals from a plurality of computers. Each computer of the plurality of computers provides at least one secured capability of the plurality of secured capabilities. Each first signal of the plurality of first signals comprises a reusable identifier corresponding to a secured capability of the plurality of secured capabilities. The computer system further comprises a second input configured to receive a plurality of second signals from a plurality of electronic devices being used by the users. Each second signal of the plurality of second signals comprises a copy of a reusable identifier and user verification information. The computer system further comprises a storage device comprising a first association of each secured capability of the plurality of secured capabilities with at least one corresponding reusable identifier, and a second association of the user verification information with corresponding verified users authorized to access at least one secured capability of the plurality of secured capabilities. The computer system further comprises a processor configured to evaluate, based at least on a first signal received from a computer of the plurality of computers and a second signal received from an electronic device of the plurality of electronic devices, whether a user of the electronic device is authorized to conduct at least one interaction with a secured capability corresponding to the reusable identifier. The computer system further comprises an output configured to transmit a third signal comprising authorization information to at least one of the electronic device and the computer providing the secured capability corresponding to the reusable identifier, if the user of the electronic device is authorized to conduct the at least one interaction with the secured capability corresponding to the reusable identifier.

In certain embodiments, a method is provided for authenticating users seeking to conduct at least one interaction with a secured capability. The method comprises transmitting a first signal to a verification server. The first signal comprises a reusable identifier corresponding to the secured capability. The verification server is configured to receive validation data from an electronic device being used by the user and is further configured to evaluate, based at least on the validation data and the reusable identifier, whether the user is authorized to conduct the at least one interaction with the secured capability. The method further comprises transmitting a second signal to the user. The second signal comprises the reusable identifier. The method further comprises receiving authorization information from at least one of the verification server and the electronic device. The method further comprises using a processor to provide the user with access to conduct the at least one interaction with the secured capability in response at least to the authorization information. In certain embodiments, a non-transitory (e.g., tangible) computer storage is provided having stored thereon a computer program (e.g., code) that instructs a computer system to perform the method described in this paragraph.

In certain embodiments, a method is provided for authenticating users seeking to conduct at least one interaction with a secured capability. The method comprises storing a plurality of identifiers corresponding to the secured capability. The method further comprises selecting a first identifier of the plurality of identifiers to be presented to a first user and to a verification server to initiate a first interaction with the first user. The first identifier is to be presented to the first user in a first form configured to be detected by a first electronic device being used by the first user. The verification server is configured to receive the plurality of identifiers and to receive validation signals from electronic devices being used by the users. The verification server is further configured to evaluate, based at least on the received validation signals and identifiers, whether the users are authorized to conduct the at least one interaction with the secured capability. The method further comprises selecting a second identifier of the plurality of identifiers to be presented to a second user and to the verification server to initiate a second interaction with the second user. The second identifier is to be presented to the second user in a second form configured to be detected by a second electronic device being used by the second user. The method further comprises selecting the first identifier to be presented to a third user and to the verification server to initiate a third interaction with the third user. The first identifier is to be presented to the third user in a third form configured to be detected by a third electronic device being used by the third user. In certain embodiments, a non-transitory (e.g., tangible) computer storage is provided having stored thereon a computer program (e.g., code) that instructs a computer system to perform the method described in this paragraph.

In certain embodiments, a method is provided for authenticating a user seeking to conduct at least one interaction with a secured capability provided by a computer. The method comprises detecting an encoded identifier comprising a reusable identifier corresponding to the secured capability. The method further comprises using a processor to decode the encoded identifier to extract the reusable identifier. The method further comprises transmitting validation data to a validation server. The validation data comprises the extracted reusable identifier and a user verification code. The verification server is configured to evaluate, based at least on the validation data and the reusable identifier, whether the user is authorized to access the secured capability. In certain embodiments, a non-transitory (e.g., tangible) computer storage is provided having stored thereon a computer program (e.g., code) that instructs a computer system to perform the method described in this paragraph.

In certain embodiments, a method is provided for authenticating a user seeking to conduct at least one interaction with a secured capability provided by a computer. The method comprises accessing a first signal. The first signal comprises a first identifier corresponding to the secured capability. The method further comprises receiving a second signal from an electronic device being used by the user. The second signal comprises a second identifier corresponding to the secured capability and user verification information. In certain embodiments, the second identifier is the same as (e.g., a copy of) the first identifier, while in certain other embodiments, the first identifier and the second identifier have a known and predetermined relationship to one another. The method further comprises using a processor to evaluate, based at least on one or both of the first signal and the second signal, whether the user is authorized to conduct the at least one interaction with the secured capability. The method further comprises, in response to an indication from the processor that the user is authorized to conduct the at least one interaction with the secured capability, generating a third signal comprising authorization information. In certain embodiments, the method further comprises providing the third signal to at least one of the electronic device and the computer. In certain embodiments, a non-transitory (e.g., tangible) computer storage is provided having stored thereon a computer program (e.g., code) that instructs a computer system to perform the method described in this paragraph. In certain embodiments, the electronic device being used by the user comprises a mobile electronic device (e.g., mobile phone, smartphone, tablet) that is configured to display a page (e.g., shopping cart, access page) containing a link (e.g., a specially-formatted URL in the form of a user-selectable button, or other graphical image or alphanumeric "link") that, upon being selected by the user, launches a computer program application or "app" on the mobile electronic device. The app transmits the second signal.

In certain embodiments, a method is provided for authenticating a user seeking to conduct at least one interaction with a secured capability provided by a computer. The method comprises providing a first identifier to at least one verification server. The first identifier corresponds to the secured capability. The method further comprises providing a second identifier to an electronic device being used by the user. The second identifier corresponds to the secured capability (e.g., matches the first identifier or is related to the first identifier with a known and predetermined relationship). The method further comprises providing the electronic device with a user-selectable link configured to, upon being selected by the user, initiate a program to run on the electronic device. The program is configured to transmit a third identifier to the at least one verification server. The third identifier corresponds to the secured capability (e.g., matches one or both of the first identifier and the second identifier or is related to one or both of the first identifier and the second identifier with a known and predetermined relationship). The method further comprises receiving authorization information from at least one of the electronic device and the at least one verification server. The method further comprises using a processor (e.g., a processor of the computer) to provide the user with access to conduct the at least one interaction with the secured capability in response at least to the authorization information. In certain embodiments, a non-transitory (e.g., tangible) computer storage is provided having stored thereon a computer program (e.g., code) that instructs a computer system to perform the method described in this paragraph. In certain embodiments, the electronic device being used by the user comprises a mobile electronic device (e.g., mobile phone, smartphone, tablet) that is configured to display a page (e.g., shopping cart, access page) containing a link (e.g., a specially-formatted URL in the form of a user-selectable button, or other graphical image or alphanumeric "link") that, upon being selected by the user, launches a computer program application or "app" on the mobile electronic device. The app transmits the identifier and the validation data from the mobile electronic device to the at least one validation server.

In certain embodiments, a method is provided for authenticating users seeking to conduct at least one interaction with a secured capability. The method comprises accessing a first identifier corresponding to the secured capability. The method further comprises pushing a second identifier corresponding to the secured capability to the user (e.g., to an electronic device being used by the user). In certain embodiments, the second identifier is the same as (e.g., a copy of) the first identifier, while in certain other embodiments, the first identifier and the second identifier have a known and predetermined relationship to one another. The method further comprises receiving validation data (e.g., with a third identifier, which can be the same as the first identifier or the second identifier, or can have a known and predetermined relationship to one or both of the first identifier or the second identifier) from the electronic device. The method further comprises using a processor to evaluate, based at least on the validation data and one or both of the first identifier and the second identifier, whether the user is authorized to conduct the at least one interaction with the secured capability. In certain embodiments, the method further comprises providing (e.g., transmitting) an authorization signal to at least one of the electronic device and the computer. In response to the authorization signal (e.g., containing authorization information), a processor of the computer can be used to provide the user with access to conduct the at least one interaction with the secured capability. In certain embodiments, pushing the second signal is performed by at least one of the computer providing the secured capability and the verification server. In certain embodiments, a non-transitory (e.g., tangible) computer storage is provided having stored thereon a computer program (e.g., code) that instructs a computer system to perform the method described in this paragraph. In certain embodiments, the electronic device being used by the user comprises a mobile electronic device (e.g., mobile phone, smartphone, tablet) that is configured to display a page (e.g., shopping cart, access page) containing a link (e.g., a specially-formatted URL in the form of a user-selectable button, or other graphical image or alphanumeric "link") that, upon being selected by the user, launches a computer program application or "app" on the mobile electronic device. The app transmits the identifier and the validation data from the mobile electronic device to the validation server.

In certain embodiments, a method is provided for authenticating a user seeking to conduct at least one interaction with a secured capability provided by a computer. The method comprises accessing an identifier corresponding to the secured capability. The method further comprises transmitting validation data to a validation server. The validation data comprises the identifier and a user verification code. The verification server is configured to evaluate, based at least on the validation data and the identifier, whether the user is authorized to access the secured capability. In certain embodiments, a non-transitory (e.g., tangible) computer storage is provided having stored thereon a computer program (e.g., code) that instructs a computer system to perform the method described in this paragraph. In certain embodiments, the electronic device being used by the user comprises a mobile electronic device (e.g., mobile phone, smartphone, tablet) that is configured to display a page (e.g., shopping cart, access page) containing a link (e.g., a specially-formatted URL in the form of a user-selectable button, or other graphical image or alphanumeric "link") that, upon being selected by the user, launches a computer program application or "app" on the mobile electronic device. The app transmits the validation data from the mobile electronic device to the validation server.

The paragraphs above recite various features and configurations of one or more methods, computer systems, and computer storage, that have been contemplated by the inventor. It is to be understood that the inventor has also contemplated methods, computer systems, and computer storage which comprise combinations of these features and configurations from the above paragraphs, as well as methods, computer systems, and computer storage which comprise combinations of these features and configurations from the above paragraphs with other features and configurations disclosed in the following paragraphs. While the methods and systems are discussed herein in terms of elements (e.g., signals, identifiers) labeled by ordinal adjectives (e.g., first, second, etc.), use of the ordinal adjective are used merely as labels to distinguish one element from another (e.g., one signal from another or one identifier from another), and the ordinal adjective is not used to denote an order of these elements or of their use.

DETAILED DESCRIPTION

While various embodiments are described herein by citing websites and smartphones as examples of devices which can be used, the systems and methods described herein are not so limited. Certain embodiments also extend to bank safes, door locks, and any other objects that use some form of security to access, and other forms of mobile personal devices (e.g., mobile phones, electronic tablets). Certain embodiments described herein can be used to provide higher security to access any secured or sensitive information or object. For example, certain embodiments can be used to allow users be identified and verified as being among those individuals who are authorized to access information that is secured or that is sensitive.

Although commonly used terms are used to describe the systems and methods of certain embodiments for ease of understanding, these terms are used herein to have their broadest reasonable interpretation, as described in more detail herein.

Certain embodiments described herein include methods which are performed by computer hardware, software or both, comprising one or more modules. The hardware used for certain embodiments described herein (e.g., the first electronic devices 20, the second electronic devices 30, the computers 50, and the validation server 60) can take a wide variety of forms, including processors, general-purpose computers, network servers, workstations, personal computers, mainframe computers and the like. The hardware running the software will typically include one or more input devices, such as a mouse, trackball, touchpad, and/or keyboard, a display, and computer-readable memory media, such as random-access memory (RAM) integrated circuits and a data storage device (e.g., tangible storage, non-transitory storage, flash memory, hard-disk drive). It will be appreciated that one or more portions, or all of the software code may be remote from the user and, for example, resident on a network resource, such as a LAN server, Internet server, network storage device, etc. The software code which configures the hardware to perform in accordance with certain embodiments described herein can be downloaded from a network server which is part of a local-area network or a wide-area network (such as the internet) or can be provided on a tangible (e.g., non-transitory) computer-readable medium, such as a CD-ROM or a flash drive. Various computer languages, architectures, and configurations can be used to practice the various embodiments described herein.

Using Reusable Identifiers

Figure 1:
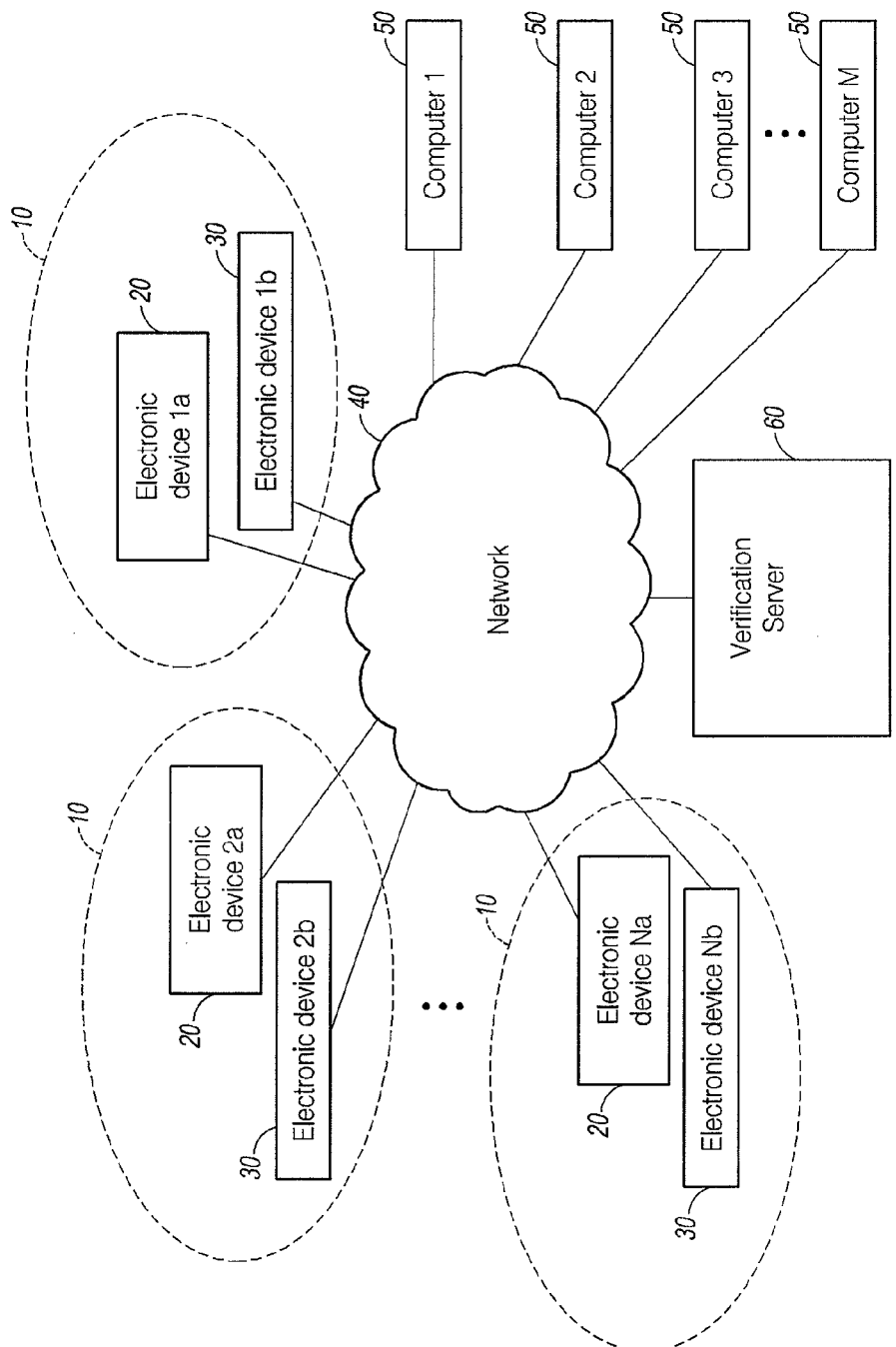
FIG. 1 schematically illustrates an example configuration in which certain embodiments described herein can be used.

FIG. 1 schematically illustrates an example configuration in which certain embodiments described herein can be used. A plurality of users 10 (e.g., user 1, user 2, . . . , user N) are each utilizing a first electronic device 20 (e.g., device 1a, device 2a, . . . , device. Na) operatively coupled to a network 40 (e.g., the internet), and a second electronic device 30 (e.g., device 1b, device 2b, . . . , device Nb) operatively coupled to the network 40. For example, the first electronic device 20 can be a personal computer (e.g., laptop, notebook) that is running a web browser program (e.g., Internet Explorer®, Firefox®, Safari®) to access or visit websites hosted by one or more computers 50 (e.g., computer 1, computer 2, computer 3, . . . , computer M) via the network 40, or can be a mobile device (e.g., mobile phone, smartphone, or tablet) that is running an application that accesses or visits websites hosted by the one or more computers 50 via the network 40, and the second electronic device 30 can be a mobile device (e.g., mobile phone, smartphone, or tablet) that is running an application that accesses the network 40. The computers 50 (e.g., web servers) can each provide at least one secured capability (e.g., access to secured information, access to conduct a secure transaction) with which authorized users visiting the website are to conduct at least one interaction.

A verification server 60 (e.g., a computing device that can authorize a connection or a validation attempt) is also operatively coupled to the network 40 as is described more fully herein. While FIG. 1 shows an example configuration in which the verification server 60 is separate from the one or more computers 50 (e.g., as a specific server operatively coupled to the network), in other example configurations, the verification server 60 is integrated with one or more of the computers 50. In certain embodiments, two or more verification servers 60 may be used to increase scalability and performance. The functionality of the verification server 60 described herein can be parsed among two or more servers, which communicate with one another. For example, the at least one verification server 60 can comprise at least one first server that is in communication with the computers 50, that manages the distribution of the reusable identifiers to the computers 50 (e.g., and the corresponding QR code images), and that informs a computer 50 that a user has been authorized. The at least one first server (e.g., a "software-as-a-service" or "SaaS" server) thus interacts with the one or more computers 50 (e.g., one or more web servers). Such a SaaS server can provide implementation convenience by providing functionality (e.g., handling the pool of identifiers, selecting the next identifier for the next transaction) that might otherwise be handled by the computers 50. By placing this functionality in a common server rather than having the same functionality implemented by each of the computers 50, integration of the various embodiments described herein can be much easier to achieve and in a shorter amount of time. The at least one verification server 60 can further comprise at least one second server that is in communication with the at least one first server and with the electronic devices 20, that receives validation data from the electronic devices 20, and that performs the evaluation of whether the user is authorized to access the secured capability. In certain embodiments in which the at least one verification server 60 comprises two or more servers which communicate with one another, one server can be responsible for synchronizing information across the multiple servers by causing them to update and synchronize their data. While in this example, the at least one first server is considered to be part of the at least one verification server 60, it can operate as a proxy for the one or more computers 50 so the at least one first server can be considered to be part of the one or more computers 50.

Figure 2:
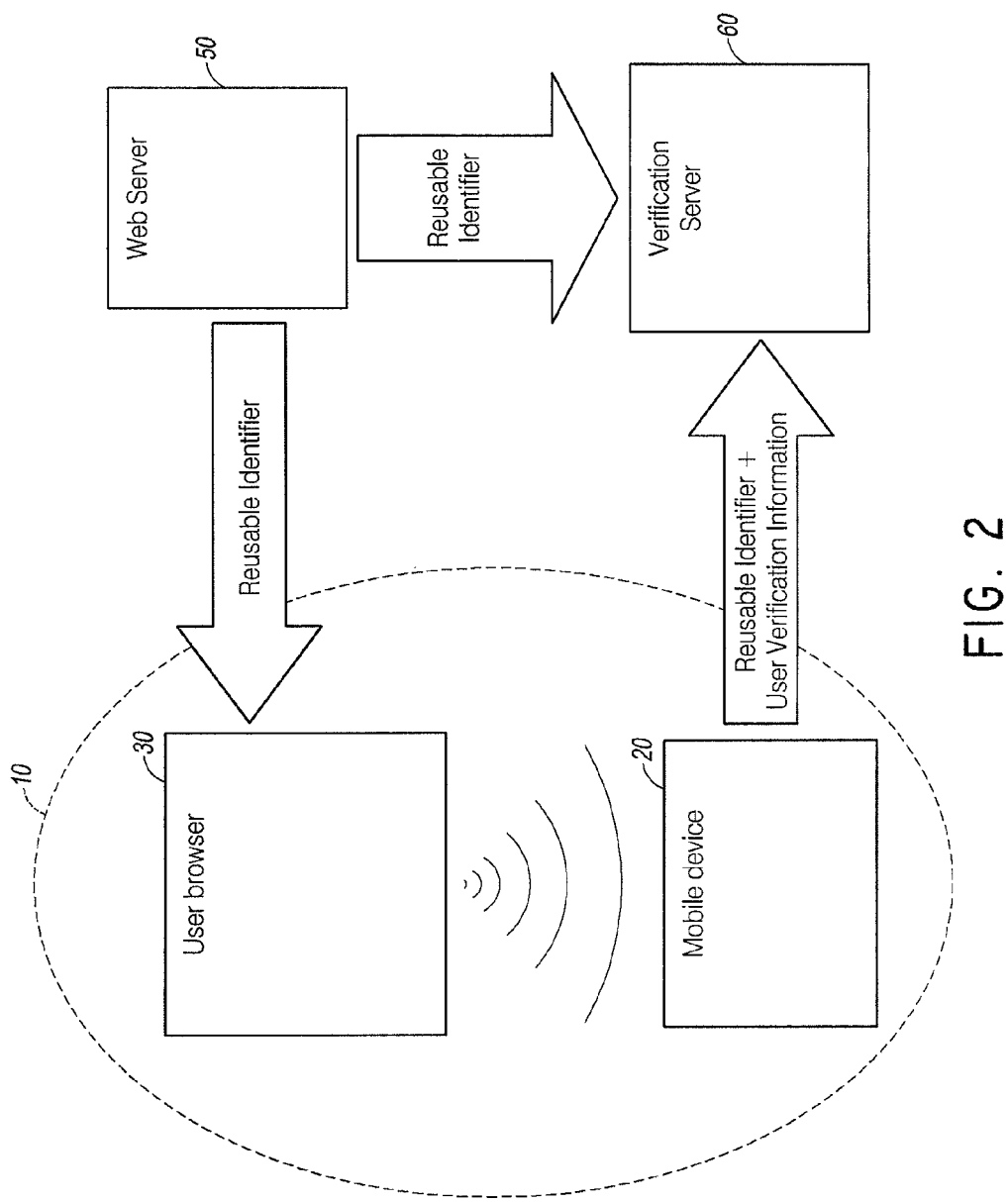
FIG. 2 schematically illustrates an example subset of the configuration of FIG. 1 showing an aspect of communication among components of the configuration in accordance with certain embodiments described herein.

FIG. 2 schematically illustrates an example subset of the configuration of FIG. 1 showing an aspect of communication among components of the configuration in accordance with certain embodiments described herein. In the example communication scheme of FIG. 2, the user 10 utilizes a first electronic device 20 as described below in an authorization (e.g., authentication, verification) process. While the description herein includes numerous communication schemes, the example communication scheme of FIG. 2 can be helpful for understanding the general context in which certain embodiments described herein can be used. In the example configuration of FIG. 2, a user 10 can use the second electronic device 30 (e.g., a computer with a user browser running a browser window viewed on a display device) to view content provided by the computer 50 (e.g., web server) with the intention of conducting an interaction with a secured capability of the computer, such as entering into a secure environment or website (e.g., to access secure information or sensitive information) or making a payment as part of an ecommerce transaction. The computer 50 of the example configuration of FIG. 2 provides a reusable identifier both to the second electronic device 30 (e.g., with the reusable identifier encoded as a QR code) and to the verification server 60 (e.g., a computing device that can authorize an interaction) with the reusable identifier serving as a start signal for the authentication process. Using the first electronic device 20 (e.g., a mobile device, such as a smartphone or a tablet), the user 10 can scan the QR code displayed by the second electronic device 30 and can extract the reusable identifier from the displayed QR code. The first electronic device 20 then transmits the extracted reusable identifier and user verification information to the verification server 60. In response at least to the reusable identifier received from the first computer 50, the reusable identifier received from the first electronic device 20, and the user verification information received from the first electronic device 20, the verification server 60 determines whether the user 10 is authorized to conduct the interaction with the secured capability. If the user is authorized, the verification server 60 can send an authorization signal to the computer 50, which then provides the access to the user 10.

In certain embodiments described herein, using the reusable identifier provides advantages not available from conventional systems. For example, by using reusable identifiers that do not include user-specific or transaction-specific information, details regarding the transaction (e.g., items to be purchased, pricing, user information, shipping information) can be updated or changed without having to produce a new identifier. For another example, by not including user-specific or transaction-specific information in the reusable identifier, the QR code in which the reusable identifier is encoded can be much simpler than in systems in which the QR code encodes additional information. Thus, the QR code can have larger light and dark regions in a given image (e.g., less resolution is needed to read the QR code), making the QR code more easily read and decoded (e.g., using the limited computing power and optical resolution of many mobile devices) and the process is faster and more reliable, thereby contributing to a favorable user experience, which can be a key to market acceptance. For another example, such QR codes would not require real-time instantaneous generation of complex graphical images (the QR codes), thereby reducing server computing requirements and increasing server scalability to serve a higher number of users and processing a higher number of transactions as compared to one-time-use QR codes. For another example, since no user- or transaction-specific information is contained in the reusable identifiers, such identifiers are safer to use, and do not require complex and time-consuming encryption/decryption processes to protect sensitive data.

Figure 3A:
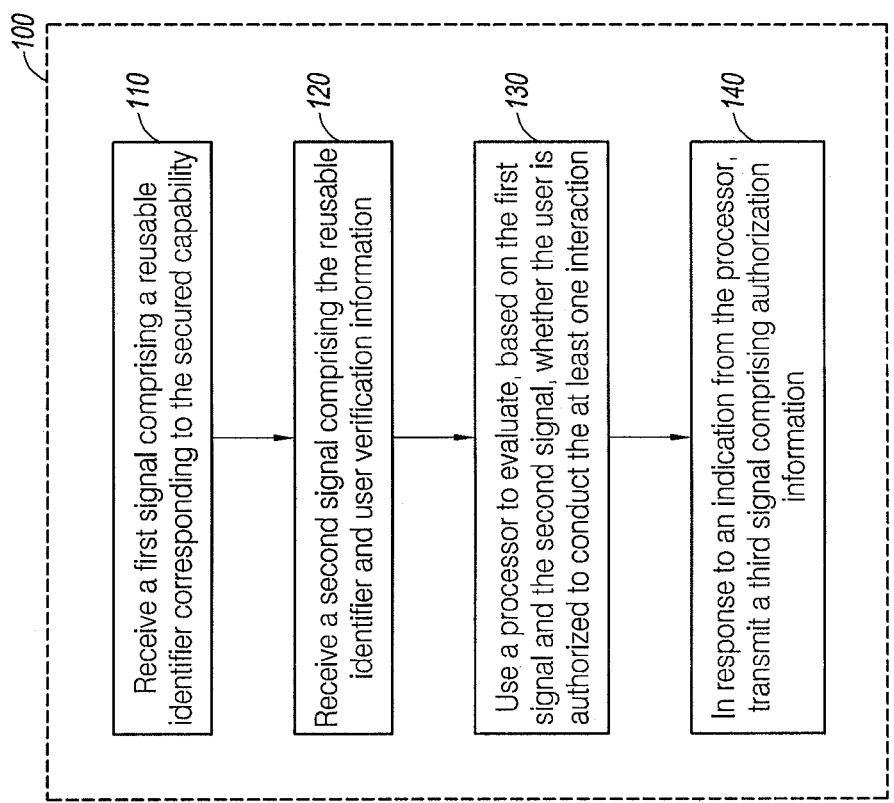
FIG. 3A is a flow diagram of an example method of authenticating a user seeking to conduct at least one interaction with a secured capability provided by a computer, in accordance with certain embodiments described herein.
Figure 3B:
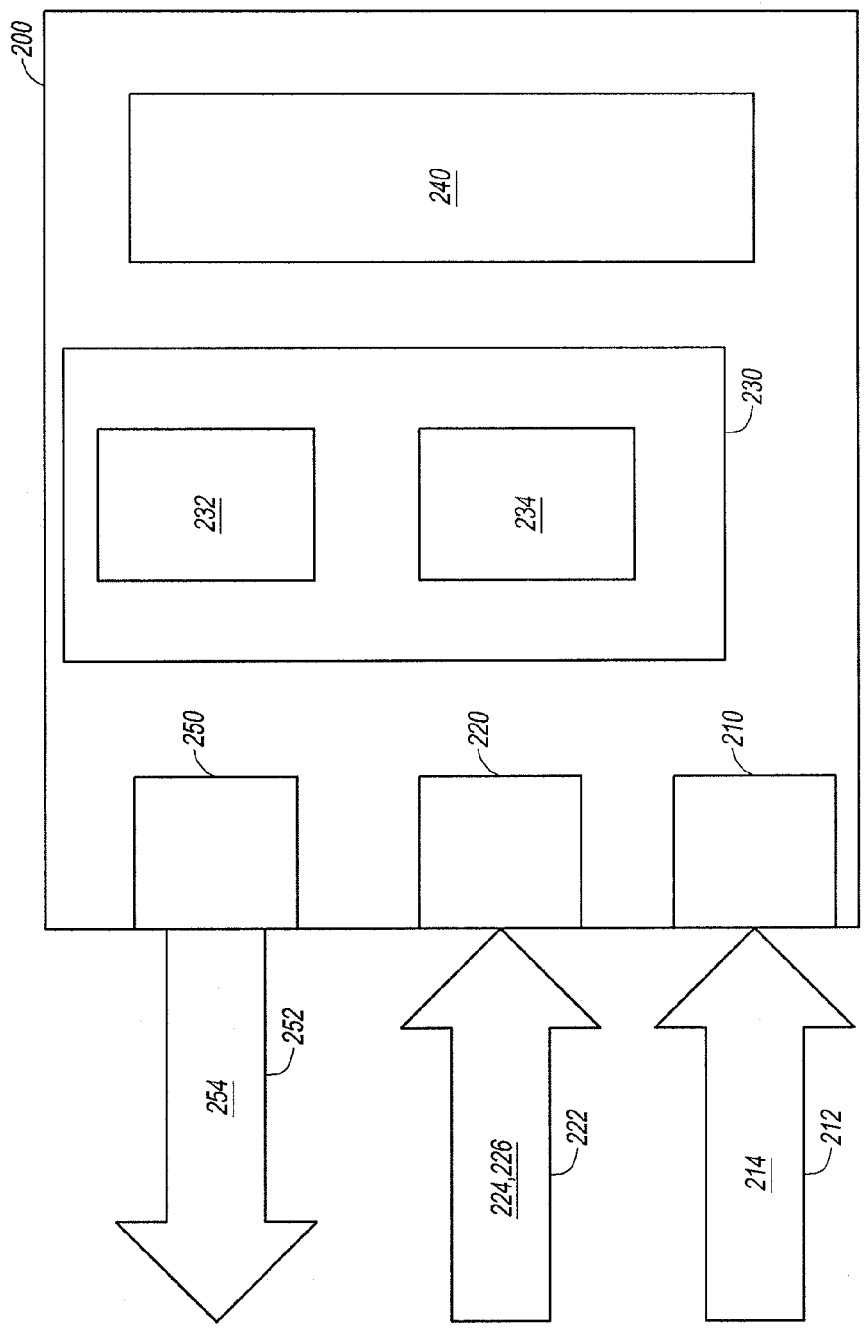
FIG. 3B schematically illustrates an example computer system (e.g., a verification server) in accordance with certain embodiments described herein.

FIG. 3A is a flow diagram of an example method 100 of authenticating a user 10 seeking to conduct at least one interaction with a secured capability provided by a computer 50, in accordance with certain embodiments described herein. FIG. 3B schematically illustrates an example computer system 200 (e.g., a verification server 60) in accordance with certain embodiments described herein for performing the method 100. The example method 100 is described herein with regard to the aspects of an authorization process that are performed by a computer system 200 (e.g., a verification server 60). Other methods are described herein with regard to the aspects of an authorization process that are performed by the computer 50 and to the aspects of an authorization process that are performed by the electronic device 20. While the method 100 is described below by referencing the structural components shown in FIG. 3B, the method 100 may be performed by other structural components.

In an operational block 110, the method 100 comprises receiving a first signal 212 from the computer 50 providing the secured capability. The first signal 212 comprises a first reusable identifier 214 corresponding to the secured capability. In an operational block 120, the method 100 further comprises receiving a second signal 222 from an electronic device 20 being used by the user 10. The second signal 222 comprises a second reusable identifier 214 corresponding to the secured capability (e.g., a copy 224 of the first reusable identifier 214 of the first signal 212 or a reusable identifier that is related to the first reusable identifier with a known and predetermined relationship) and user verification information 226. In an operational block 130, the method 100 further comprises using a processor 240 to evaluate, based at least on the first signal 212 and the second signal 222, whether the user 10 is authorized to conduct the at least one interaction with the secured capability. In an operational block 140, the method 100 further comprises generating, in response to an indication from the processor 240 that the user 10 is authorized to conduct the at least one interaction with the secured capability, a third signal 252 comprising authorization information 254. In certain embodiments, the third signal is provided to at least one of the electronic device 20 and the computer 50.

The computer system 200 (e.g., a verification server 60) comprises a first input 210 configured to receive a plurality of first signals 212 from a plurality of computers 50. Each computer 50 of the plurality of computers 50 is configured to provide at least one secured capability of the plurality of secured capabilities. Each first signal 212 of the plurality of first signals 212 comprises a first reusable identifier 214 corresponding to a secured capability of the plurality of secured capabilities. The computer system 200 further comprises a second input 220 configured to receive a plurality of second signals 222 from a plurality of electronic devices 20 being used by the users 10. Each second signal 222 of the plurality of second signals 222 comprises a second reusable identifier 214 corresponding to the secured capability (e.g., a copy 224 of a first reusable identifier 214 of a first signal 212 or a reusable identifier that is related to the first reusable identifier with a known and predetermined relationship) and user verification information 226. The computer system 200 further comprises a storage device 230 comprising a first association 232 of each secured capability of the plurality of secured capabilities with at least one corresponding reusable identifier 214. The storage device 230 further comprises a second association 234 of the user verification information 226 with corresponding verified users 10 authorized to access at least one secured capability of the plurality of secured capabilities. The computer system 200 further comprises a processor 240 configured to evaluate, based at least on a first signal 212 received from a computer 50 of the plurality of computers 50 and a second signal 222 received from an electronic device 20 of the plurality of electronic devices 20, whether a user 10 of the electronic device 20 is authorized to conduct at least one interaction with a secured capability (e.g., a secured capability corresponding to the reusable identifier 214). The computer system 200 further comprises an output 250 configured to transmit a third signal 252 comprising authorization information 254 to at least one of the electronic device 20 and the computer 50 providing the secured capability, if the user 10 of the electronic device 20 is authorized to conduct the at least one interaction with the secured capability.

The first input 210, the second input 220, and the output 250 are each configured to be operationally coupled to the network 40 (e.g., the internet). In certain embodiments, two or more of the first input 210, the second input 220, and the output 250 can integrated together in a network portal, or can be distributed among one, two, or more network portals. The first input 210, the second input 220, and the output 250 are also configured to communicate with one or both of the storage device 230 and the processor 240 of the computer system 200.

In certain embodiments, the verification server 60 is configured to remotely disable the ability to use the electronic device 20 in an authorization process. For example, a separate website or push message may be used to communicate to the verification server 60 that the security of the electronic device 20 has been compromised (e.g., the electronic device 20 has been stolen), so communications with the electronic device 20 should no longer be used. In certain embodiments, information or data relevant to the authorization process can be remotely deleted from the electronic device 20 (e.g., via a push message) in the event that the security of the electronic device 20 has been compromised.

In certain embodiments, the secured capability can comprise a structure (e.g., a locked door, fence, gate, elevator) that is operatively coupled to the computer 50 and that is configured to selectively inhibit physical access to a region (e.g., interior of a safe, building, house, vehicle, automobile, snack dispensing machine) or operation of a machine (e.g., automobile, elevator) to only authorized users, and the at least one interaction can comprise access to the restricted region (e.g., opening a lock thereby allowing entry to or exit from the restricted region) or turning the machine on or off. In certain embodiments, the secured capability can comprise a security module that is run by or operatively coupled to the computer 50 and that is configured to selectively restrict access to a memory region (e.g., a database, a secured internet portal) to only authorized users, and the at least one interaction can comprise access to the restricted memory region (e.g., retrieval of information from the secured internet portal, writing to or reading from the restricted memory region). In certain embodiments, the secured capability can comprise an electronic payment module that is run by or operatively coupled to the computer 50 and that is configured to selectively restrict access to an electronic payment as part of an ecommerce transaction (e.g., purchase) with the user that initiated the transaction, and the at least one interaction can comprise a transfer of funds (e.g., from the user to a merchant) to conduct the ecommerce transaction.

In certain embodiments, the reusable identifier 214 corresponds to a particular secured capability and serves as a "transaction start indicator" or "TSSID" that denotes the beginning of a process. The reusable identifier 214 may include data, such as information about the company providing the secured capability, the particular secured capability that corresponds to the TSSID, or both. For example, the reusable identifier 214 can include a short sequence of numbers, letters, or characters that identifies the company providing the secured capability, the secured capability, or both. In certain embodiments having two or more verification servers 60, the reusable identifier 214 can comprise information identifying which of the verification servers 60 is to be used. The verification servers 60 can use this information to direct one or both of the first signal 212 and the second signal 222 to the appropriate verification server 60. In certain embodiments, the reusable identifier 214 does not contain information about the company providing the secured capability. In certain embodiments, the reusable identifier 214 includes only numbers, not alphabetic characters, which can make the visual identifier (e.g., QR code) which encodes the reusable identifier 214 more simple and easier to scan. In certain embodiments, the reusable identifier 214 does not comprise data that is to be kept confidential, so the data of the reusable identifier 214 may or may not be encrypted.

As used herein, the term "reusable" in conjunction with the reusable identifier 214 has its broadest reasonable interpretation, including but not limited to, an identifier that can be used more than once (e.g., the identifier is not for merely "one-time-use," is not unique to one particular user or transaction, or both). For example, a reusable identifier 214 (e.g., a reusable TSSID) signals the beginning of a transaction, does not contain user-specific or transaction-specific information, and can be reused for multiple users and multiple transactions. In certain embodiments described herein, a reusable identifier 214 is utilized in a different way than the "one-time-use" or "unique" identifiers (IDs) of conventional systems (e.g., systems that utilize identifiers containing transaction-specific information, so that, for example, when a smartphone sends login or payment information to a webserver, the webserver can associate the user to the transaction).

In certain embodiments, a predefined and previously generated list of the reusable identifiers 214 can be assigned to each secured capability of each computer 50. The reusable identifier 214 assigned to each secured capability can be stored in the storage device 230 in the first association 232 (e.g., a database or look-up table) that keeps track of both the reusable identifiers 214 and the secured capabilities to which they are assigned. The reusable identifiers 214 to be used by a computer 50 can also be stored in a storage device of the computer 50. For example, the computer 50 can store a pool of reusable identifiers to select from, or in another example, the verification server 60 can store the pool of reusable identifiers and the selection of a reusable identifier can be performed by the verification server 60. As described above, a SaaS server (e.g., which can be considered to be part of the at least one verification server 60 or part of the plurality of computers 50) can store the pool of reusable identifiers and can select a reusable identifier for each transaction, which can allow a larger pool of reusable identifiers to be more efficiently maintained. In certain such embodiments, the computer 50 requests a reusable identifier from the SaaS server with the reusable identifier to correspond to (e.g., assigned to be used by) the secured capability of the computer 50. In turn, the SaaS server accesses a reusable identifier from the pool of reusable identifiers and provides the reusable identifier to the computer 50 (e.g., to be displayed as a QR code to be read by the electronic device 20). Thus, if the SaaS server is considered part of the plurality of computers 50, the computers 50 provide a signal comprising a reusable identifier to the verification server 60 which then accesses the signal. Alternatively, if the SaaS server is considered part of the at least one verification server 60, in response to the request from the computer 50, the verification server 60 accesses a signal comprising a reusable identifier corresponding to (e.g., assigned to be used by) the secured capability, and provides the reusable identifier to the computer 50. As described herein, in certain embodiments, the reusable identifier is assigned to be used by the secured capability for a finite period of time.

The individual reusable identifiers 214 assigned to a secured capability can be used sequentially (e.g., one after another, for sequential attempts to authenticate users seeking to conduct at least one interaction with the secured capability). In certain such embodiments, when all the reusable identifiers 214 of the predefined and previously generated list for the secured capability have been used to denote various users seeking to access the secured capability, the list can be restarted by again using the reusable identifiers 214 on the list (round robin usage). In certain embodiments, the reusable identifiers 214 are each only valid for a finite and predetermined period of time (e.g., one or more minutes, one or more hours, one or more days) but can be used in multiple such periods of time. For example, in certain embodiments, while the same reusable identifier 214 cannot be used again within the same time period, the reusable identifier 214 can be reused in a subsequent period of time (e.g., after one or more other reusable identifiers 214 have been selected and used sequentially in a round robin fashion). For another example, in certain embodiments, once a new time period is started, one or more previously-used reusable identifiers 214 can be used, even if the list of reusable identifiers 214 has not yet been exhausted within the previous time period (e.g., the round-robin processing does not have to be continued). Certain such embodiments are different from systems which utilize "one-time-use" TSSIDs or IDs.

In certain embodiments, the user 10 utilizes a second electronic device 30 to conduct the at least one interaction with the secured capability provided by the computer 50. For example, the second electronic device 30 can comprise a computer with a user browser running a browser window viewed on a display device or a mobile device (e.g., smartphone or tablet) running an application. In certain other embodiments, examples of which are described herein, the user 10 conducts the at least one interaction with the secured capability provided by the computer 50 without using a second electronic device 30. For example, the reusable identifier 214 can be encoded in a QR code on a printed sheet of paper 70 (e.g., a bill or invoice).

In certain embodiments, the reusable identifier 214 is displayed or presented in a manner in which the electronic device 20 is able to receive the reusable identifier 214 from the second electronic device 30. For example, the reusable identifier 214 can be presented (e.g., by the second electronic device 30 which received the reusable identifier 214 from the computer 50) as an reusable encoded visual or auditory identifier configured to be detected by the electronic device 20 and decoded by a program executed by the electronic device 20 to yield the reusable identifier 214. The visual or auditory identifiers can be predetermined (e.g., premade) based on the predetermined reusable identifiers 214, or each visual or auditory identifiers can be generated just before it is to be presented to and detected by the electronic device 20. Since they encode the reusable identifiers 214, the visual or auditory identifiers can also be reusable (e.g., used more than once and not for merely "one-time-use," not unique to one particular user or transaction, or both). In certain embodiments, the visual or auditory identifiers are each only valid for a finite and predetermined period of time (e.g., one or more minutes, one or more hours, one or more days) but can be used in multiple such periods of time. The visual or auditory identifiers can be stored in the verification server 60 (e.g., the storage device 230) and provided to the computer 50 as needed, or the visual or auditory identifiers can be stored on the computer 50 (e.g., a web server) to be used as needed. In certain embodiments, the visual or auditory identifiers are used sequentially, in a round robin fashion.

In certain embodiments, the visual or auditory identifier comprises visual signals (e.g., static images, color images, black and white images, striped images, flashing lights, animated images, videos) or auditory signals (e.g., tones, sounds, music) containing the reusable identifier 214 and that are decoded by a program executed by the first electronic device 20. For example, a visual identifier can be presented on a visual display device of the second electronic device 30 (e.g., by a user browser or on a printed page) and detected by a camera or light sensor of the first electronic device 20. For another example, an auditory identifier can be presented by a speaker of the second electronic device 30 and detected by a microphone of the first electronic device 20. In certain embodiments, instead of, or in conjunction with, the visual or auditory identifier, a radio signal can be used to encode the reusable identifier 214 with the electronic device 20 configured to receive and decode the radio signal.

In certain embodiments, the visual or auditory identifier comprises a QR code, which is a graphical static image that can be used to encode information and that can be detected by a camera and decoded by software. For example, a QR code containing the reusable identifier 214 can be presented (e.g., by the second electronic device 30 or on a printed page) and can be detected by the electronic device 20 (e.g., smartphone or tablet) and decoded by a program executed by the electronic device 20 to yield the reusable identifier 214. The QR code can be predetermined (e.g., premade) based on the predetermined reusable identifiers 214, or each QR code can be generated just before it is to be presented to and detected by the electronic device 20. Since they encode the reusable identifiers 214, the QR codes can also be reusable (e.g., used more than once and not for merely "one-time-use," not unique to one particular user or transaction, or both). In certain embodiments, the QR codes are each only valid for a finite and predetermined period of time (e.g., one or more minutes, one or more hours, one or more days) but can be used in multiple such periods of time. The QR codes can be stored in the verification server 60 (e.g., the storage device 230) and provided to the computer 50 as needed, or the QR codes can be stored on the computer 50 (e.g., a web server) to be used as needed. In certain embodiments, the QR codes are used sequentially, in a round robin fashion.

In certain embodiments, the first electronic device 20 comprises a device, such as a smartphone or a tablet, capable of detecting the visual or auditory identifier (e.g., QR Code) and communicating with the verification server 60 via a network or the internet. In certain embodiments, the second electronic device 30 comprises a display device (e.g., LED display, audio speaker, electric bulb or LED) capable of presenting the visual or auditory identifier (e.g., QR code) in a manner detectable by the first electronic device 20. In certain such embodiments, the display device is running a user browser connected to the computer 50 via the internet. In certain embodiments, the computer 50 comprises a processor running a web server and driving the display device (e.g., by transmitting HTML information to the user browser of the display device). The computer 50 may be integrated with or separated from the display device of the second electronic device 30. In certain embodiments, the verification server 60 comprises a processor configured to authorize a connection or a validation attempt by the user 10. For example, verification server 60 can be integrated with or separated from the computer 50. In certain embodiments described herein, the verification server 60 comprises one or more specific servers sitting on the internet and containing user verification information. In certain embodiments described herein, the first electronic device 20 comprises a mobile smartphone capable of scanning and decoding a QR code displayed by a user browser running on the second electronic device 30, with the QR code encoding the reusable identifier 214. The smartphone is also configured to communicate the decoded identifier, along with user verification information, to the verification server 60 via the network 40 (e.g., the internet).

In certain embodiments, the computer 50 transmits the first signal 212 to the verification server 60, which receives the first signal 212 from the computer 50 in the operational block 110. The first signal 212 comprises the first reusable identifier 214 and can be interpreted by the verification server 60 as the initiation of an authentication process. In certain embodiments, the computer 50 also transmits the second reusable identifier 214 to the second electronic device 30 to be presented (e.g., in a visual or auditory identifier, such as a QR code) in a form that can be detected and decoded by the first electronic device 20. This transmission of the second reusable identifier 214 to the second electronic device 30 can be concurrent or non-concurrent with the transmission of the first signal 212 to the verification server 60. In certain other embodiments, the second reusable identifier 214 is presented to the user 10 by a visual identifier in which the second reusable identifier 214 is encoded and which is printed on a page 70 (e.g., a bill or invoice).

The user 10 can use the first electronic device 20 to detect and decode the second reusable identifier being presented by the second electronic device 30 so as to generate a copy 224 of the second reusable identifier 214 which is the same as the second reusable identifier 214 (e.g., both the second reusable identifier 214 and the copy 224 do not contain user-specific or interaction-specific information). The first electronic device 20 transmits the second signal 222 to the verification server 60, which receives the second signal 222 from the first electronic device 20 in the operational block 120. The second signal 222 comprises the second reusable identifier 214 and the user verification information 226.

The user verification information 226 can be stored on, or can be otherwise accessible by, the first electronic device 20. In certain embodiments, the user verification information 226 comprises information that can be used to verify and authenticate the user (e.g., a verifiable "fingerprint" of the user and mobile device). For example, the user verification information 226 can comprise information regarding (e.g., specific to) the user (e.g., the user's first name, family name, email address, phone number), information regarding (e.g., specific to) the first electronic device 20 (e.g., a device identification character string, hardware-specific information such as manufacturer or operating system of the first electronic device 20), or both. In embodiments, the user verification information 226 can comprise information derivable from user-specific information (e.g., predetermined portions of the user-specific information that would not themselves contain private information) or information derivable from device-specific information (e.g., predetermined portions of the device-specific information that would not themselves contain private information). The user verification information 226 may or may not be encrypted.

The user verification information 226 corresponding to users that are authorized to access at least one secured capability can be stored in the storage device 230 in the second association 234 (e.g., in a database or look-up table) that keeps track of both the user verification information 226 and the authorized user which it denotes. In certain embodiments, the user verification information 226 is not made available to the computer 50. In certain embodiments, the second association 234 also includes information regarding which secured capabilities each of the users denoted by user verification information 226 is authorized to access. Use of such user verification information 226 (e.g., user-specific information, device-related information, or both) can provide a desired level of security to ensure that the user 10 attempting to access the secured capability is an authorized user.

After having received the first signal 212 and the second signal 222, the verification server 60 can evaluate (e.g., using the processor 240), based at least on the first signal 212 and the second signal 222, whether the user 10 is authorized to conduct the at least one interaction with the secured capability in the operational block 130. For example, the verification server 60 can correlate the first signal 212 with the corresponding second signal 222 by comparing the first reusable identifier 214 from the first signal 212 and the second reusable identifier 214 from the second signal 222. For a correlated first signal 212 and second signal 222, the first reusable identifier 214 and the second reusable identifier 214 will both correspond to the same secured capability (e.g., the first and second reusable identifiers 214 will match or the first and second reusable identifiers 214 will be related to one another with a known and predetermined relationship). The verification server 60 can also utilize at least one reusable identifier (e.g., at least one of the first and second reusable identifier 214) with the first association 232 of each secured capability with at least one corresponding reusable identifier 214 to identify the secured capability that the user 10 is attempting to access. For example, using the received at least one reusable identifier 214, the validation server 60 can access the first association 232 to determine (e.g., look up) which secured capability (or computer 50, or both) corresponds to the received at least one reusable identifier 214. The verification server 60 can also utilize the user verification information 226 and the second association 234 of the user verification information 226 with corresponding verified users 10 to evaluate, based at least on the user verification information 226, whether the user 10 of the first electronic device 20 is one of the verified users of the secured capability. For example, using the user verification information 226, the verification server 60 can access the second association 234 to determine (e.g., look up) which user corresponds to the user verification information 226. If the user verification information 226 received from the electronic device 20 does not match any of the entries of the second association 234, then the user is deemed to not be one of the verified users of the secured capability. Also, in certain embodiments in which the second association 234 also includes information regarding which secured capabilities the user denoted by the user verification information 226 is authorized to access, the verification server 60 can use the second association 234, the user verification information 226, and the at least one reusable identifier

214 to determine (e.g., look up) whether the user is authorized to access the particular secured capability that the user is seeking to access. In certain embodiments, the verification server 60 also checks whether the first electronic device 20 (e.g., mobile device, smartphone, tablet) is deactivated. For example, upon receipt of a notification (e.g., from the user or from a third party authorized to provide such notifications), the verification server 60 can either mark the user's first electronic device 20 as deactivated or place the user's first electronic device 20 on a stored list of deactivated first electronic devices 20 that have been deactivated from use by the verification server 60. Such notifications can be provided to the verification server 60 upon discovery that the user's first electronic device 20 is lost or stolen. Deactivated first electronic devices 20 (e.g., those on the stored list of deactivated devices) would not be authorized by the verification server 60. Certain such embodiments can provide a way for a user to deactivate a lost or stolen first electronic device 20 and to stop access by people other than the user.

In certain embodiments in which the reusable identifier 214 is only valid for a finite and predetermined period of time, the validation server 60 can determine a first time of receipt of the first signal 212 and a second time of receipt of the second signal 222, and can compare the time differential between the first time and the second time. If the time differential is less than or equal to the finite and predetermined period of time for the reusable identifier 214, the validation server 60 can evaluate that the user 10 is authorized to conduct the at least one interaction with the secured capability corresponding to the reusable identifier 214. If the time differential is greater than the finite and predetermined period of time for the reusable identifier 214, the validation server 60 can evaluate that the user 10 is not authorized to access the secured capability. In certain other embodiments in which the reusable identifier 214 is only valid for a finite and predetermined period of time, after the period of time has elapsed, the verification server 60 deletes the record corresponding to the reusable identifier 214 so it can be reused again. Certain such embodiments avoid performing any timestamp comparison. In certain other embodiments, the computer 50 can request from the verification server 60 to renew the reusable identifier 214 for another finite and predetermined period of time, before such period of time has elapsed.

Upon evaluating that the user 10 is authorized to access the secured capability, the verification server 60 can generate a third signal 252 comprising authorization information 254 and can transmit the third signal 252 to at least one of the first electronic device 20 and the computer 50, in the operational block 140. The authorization information 254 can comprise a flag indicating that the user 10 is authorized to conduct the at least one interaction with the secured capability, can comprise additional information regarding the conditions of the user 10 accessing the secured capability (e.g., number of interactions that are authorized, the type of interactions that are authorized), or both. For example, in certain embodiments, the authorization information 254 sent to the computer 50 in the third signal 252 can comprise an identifier that is unique to the user 10. The computer 50 can use this identifier to identify the user 10. For example, for a login to a secured account, the computer 50 can use this identifier to select which user's account to present to the browser running on the electronic device 30.

In certain embodiments in which the secured capability is a purchase of an ecommerce transaction and the third signal 252 comprising the authorization information 254 is transmitted to the first electronic device 20, the first signal 212 from the computer 50 can further comprise invoice information corresponding to the purchase, and the third signal 252 can also comprise the invoice information. In certain other embodiments, the invoice information is sent to the first electronic device 20 from a second output of the validation server 60.

The first electronic device 20 can respond to the third signal 252 by transmitting payment information to at least one of the computer 50 and the validation server 60. For example, the payment information can comprise a confirmation (e.g., in a fourth signal) that a payment by the user 10 was made, and the output 250 can be configured to transmit the confirmation to the computer 50. In certain embodiments, the payment information further comprises shipping information and/or billing information. For example, the first electronic device 20 can transmit to the computer 50 shipping information for delivery corresponding to the purchase. In certain embodiments, the user has previously entered one or more sets of payment information (e.g., shipping information, billing information, or both) into the first electronic device 20 and the transmitted payment information comprises a selected set of the previously-entered one or more sets of payment information. For example, the first electronic device 20 can contain information regarding multiple payment options (e.g., credit card accounts, debit card accounts, checking accounts, or other ACH/electronic payment options) available to the user. The user can be provided the opportunity to identify which of these payment options is to be used for the present transaction (e.g., to change the payment option or to allow a default payment option to be used), and an opportunity to select one of one or more billing or shipping addresses, and the information regarding the selected payment option can be transmitted by the first electronic device 20 in response to the third signal 252. In certain such embodiments, payment can be confirmed on the first electronic device 20 before the payment information is transmitted. For example, the confirmation of the payment can be done by the selection of the payment option to be used.

In certain embodiments, the payment or login information comprises one or more of the following: user information (e.g., one or more of the user's name, mailing address, email address, phone number), means of payment information (e.g., one or more credit card, debit card, checking or savings account information, or other payment account information), which can be stored on the electronic device 20 or can be stored and accessible elsewhere on the internet (e.g., "in the cloud"), shipping information (e.g., one or more user information data records indicating the address to be used for shipping; the shipping information field can be empty where there is no need for a physical product shipment, and one shipping information can be shared among one or more payment information fields), billing information (e.g., one or more user information data records indicating the address to be used for billing; the billing information field can be empty where there is no need for billing, and one billing information can be shared among one or more payment information fields), userID (e.g., a registered combination of alphanumeric, special characters, or both that may be optionally followed by a password input, as a separate input field, composed of alphanumeric, special characters, or both), and authorized Login URL (e.g., a special url, composed of a site login url and an authorized user identification).

In certain embodiments, the payment information available to be selected by the user and transmitted by the first electronic device 20 (e.g., credit or debit account information, bank account information) can be stored on the first electronic device 20 while in certain other embodiments, the payment information can be stored in the "cloud" in a manner that is accessible to the first electronic device 20. By storing the payment information on the first electronic device 20 and not the cloud, the financial incentive for hackers to break into a data storage can be removed since the relatively small amount of information (e.g., just a few credit card numbers) stored on the first electronic device 20 would not be worth the time, effort, and cost of breaking into an individual first electronic device 20.

In certain embodiments, the first electronic device 20 can respond to the third signal 252 by transmitting payment information to a payment gateway (e.g., a computer system with a processor configured to receive such payment information and to facilitate the transfer of funds) via the internet or a network. Certain such embodiments in which the first electronic device 20 transmits payment information to the payment gateway can advantageously reduce credit card theft or fraud, can significantly increase user security, can make compliance with Payment Card Industry (PCI) data security standards easier and less costly, and/or to make anonymous payments in which the user's name or credit card information are not provided to the merchant of the goods or services being purchased. Certain embodiments described herein also include the capability of performing anonymous secured or verified login.

In certain embodiments, the computer system can be configured to provide the option of charging different amounts (e.g., to the user or to the entity running the computer 50) for the different available payment options. For example, it may be cheaper for the computer 50 to process ACH payments, so a lower price may be offered to the user for using an ACH payment option. In certain other embodiments, the computer system can be configured to only allow one payment option to be used with a particular computer 50. For example, a computer 50 may only be able to process ACH payments, to the computer system may only allow the user to select that payment option when transacting with the computer 50. In certain embodiments, the information regarding available payment options and their corresponding costs can be provided by the computer 50 to at least one of the processor of the verification server 60 and the user (e.g., via the display of the second electronic device 30).

Figure 4:
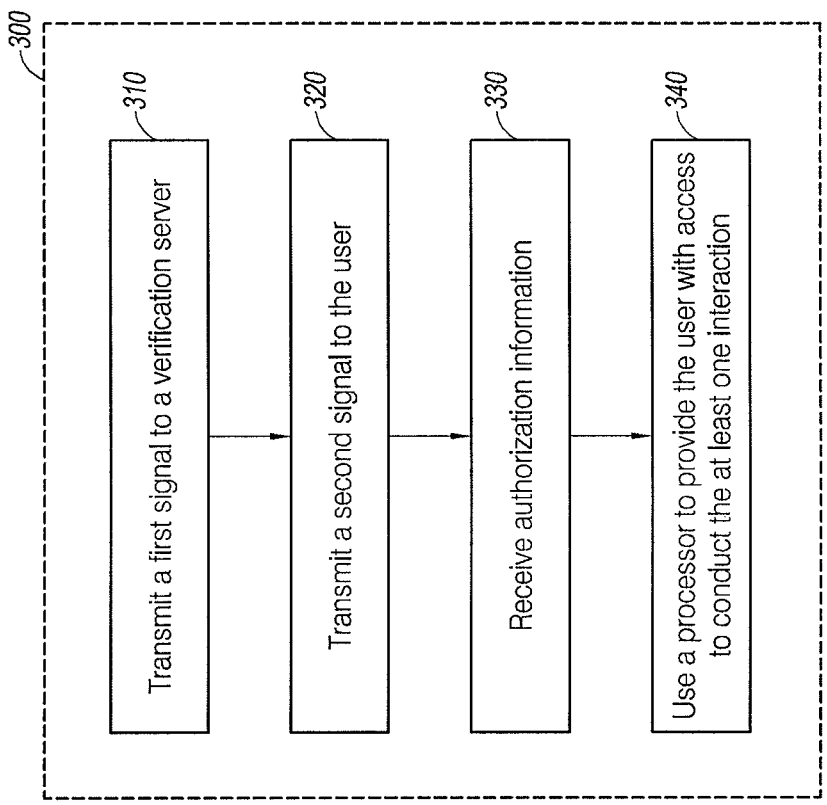
FIG. 4 is a flow diagram of an example method of authenticating users seeking to conduct at least one interaction (e.g., retrieval of information from a secured internet portal, a purchase, opening a lock selectively inhibiting physical entry to an enclosed region within a safe, building, or vehicle) with a secured capability in accordance with certain embodiments described herein.

FIG. 4 is a flow diagram of an example method 300 of authenticating users seeking to conduct at least one interaction (e.g., retrieval of information from a secured internet portal, a purchase, opening a lock selectively inhibiting physical entry to an enclosed region within a safe, building, or vehicle) with a secured capability in accordance with certain embodiments described herein. The example method 300 is described herein with regard to the aspects of an authorization process that are performed by a computer 50 (e.g., web server). The computer 50 (e.g., web server) can comprise a processor configured to perform the method 300. While the method 300 is described below by referencing certain structural components and signals, the method 300 may be performed using other structural components and signals.

In an operational block 310, the method 300 comprises transmitting a first signal to a verification server 60. The first signal comprises a reusable identifier 214 (e.g., not containing user-specific or interaction-specific information) corresponding to the secured capability. The verification server 60 is configured to receive validation data (e.g., user verification information 226) from an electronic device 20 (e.g., mobile device, mobile phone, smartphone, tablet) being used by the user and is further configured to evaluate, based at least on the validation data and the reusable identifier 214, whether the user is authorized to conduct the at least one interaction with the secured capability. In an operational block 320, the method 300 further comprises transmitting a second signal comprising the reusable identifier 214 to the user. In an operational block 330, the method 300 further comprises receiving authorization information 254 from at least one of the verification server 60 and the electronic device 20. In an operational block 340, the method 300 further comprises using a processor to provide the user with access to conduct the at least one interaction with the secured capability in response at least to the authorization information.

As described herein, in certain embodiments, transmitting the second signal to the user in the operational block 320 comprises transmitting the second signal to a second electronic device 30 being used by the user. For example, the second electronic device 30 can comprise a computer with a visual display, a speaker, or both, configured to present the reusable identifier 214 as an encoded visual or auditory identifier (e.g., a QR code or other visual signal, a radio frequency signal, an auditory signal) configured to be detected by the electronic device 20 and decoded by a program executed by the electronic device 20. For example, the second electronic device 30 can display a page (e.g., a checkout page) containing a button that, when selected (e.g., clicked) by the user, initiates a pop-out window that displays the QR code. The pop-out window can also include marketing content.

In certain embodiments in which the at least one interaction comprises a purchase, the first signal can further comprises invoice information corresponding to the purchase. The method 300 in certain such embodiments further comprises receiving (e.g., by the computer 50) a confirmation of a payment (e.g., whether successful or unsuccessful) or payment information corresponding to the purchase by the user.

As described more fully below, in certain embodiments, transmitting the second signal to the user in the operational block 320 comprises providing the user with a printed page 70 on which the reusable identifier 214 is displayed as a visual identifier. The visual identifier (e.g., QR code) can be configured to be detected by the electronic device 20 and decoded by a program executed by the electronic device 20.

Figure 5:
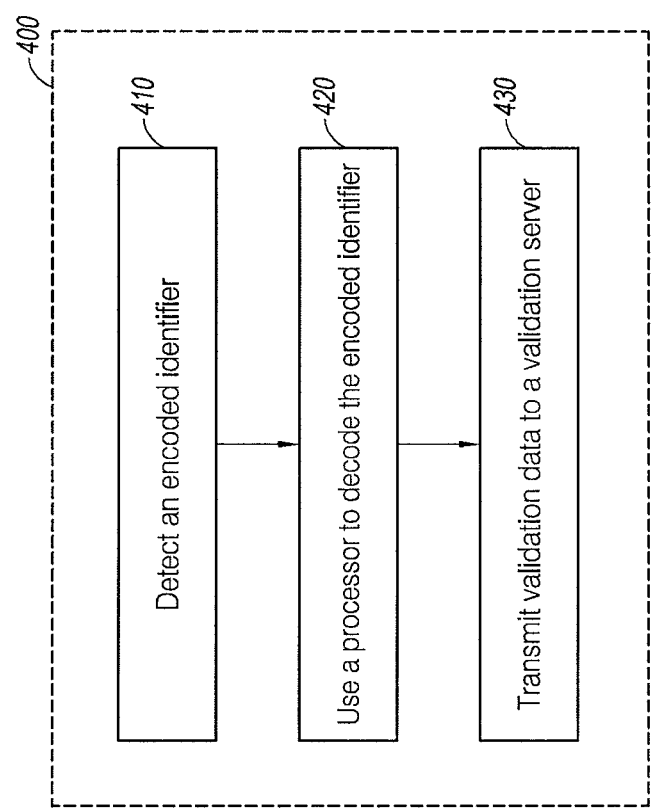
FIG. 5 is a flow diagram of an example method of authenticating users seeking to conduct at least one interaction with a secured capability in accordance with certain embodiments described herein.

FIG. 5 is a flow diagram of an example method 400 of authenticating users seeking to conduct at least one interaction with a secured capability in accordance with certain embodiments described herein. The example method 400 is described herein with regard to the aspects of an authorization process that are performed by an electronic device 20 (e.g., mobile device, mobile phone, smartphone, tablet). The electronic device 20 (e.g., mobile device, mobile phone, smartphone, tablet) can comprise a processor configured to perform the method 400. While the method 400 is described below by referencing certain structural components and signals, the method 400 may be performed using other structural components and signals.

In an operational block 410, the method 400 comprises detecting an encoded identifier comprising a reusable identifier 214 corresponding to the secured capability. In an operational block 420, the method 400 further comprises using a processor (e.g., of an electronic device 20 being used by the user, examples of which include but are not limited to a mobile device, a mobile phone, a smartphone, and a tablet) to decode the encoded identifier to extract the reusable identifier 214. In an operational block 430, the method 400 further comprises transmitting validation data (e.g., by the processor of the electronic device 20 being used by the user) to a validation server 60 configured to evaluate, based at least on the validation data and the reusable identifier 214, whether the user is authorized to access the secured capability. The validation data can comprise the extracted reusable identifier 214 and user verification information 226 (e.g., at least one of user-specific information and device-specific information).

As described herein, in certain embodiments, the encoded identifier is presented by a second electronic device 30 being used by the user. For example, the second electronic device 30 can comprise a computer with a visual display, a speaker, or both, configured to present the reusable identifier 214 as an encoded visual or auditory identifier (e.g., a QR code) configured to be detected by the electronic device 20 and decoded by a program executed by the electronic device 20. In certain such embodiments, detecting the encoded identifier in the operational block 410 can comprise using the electronic device 20 to detect the encoded identifier being presented by the second electronic device 30.

As described more fully below, in certain embodiments, the encoded identifier is presented on a printed page 70 (e.g., as a QR code) presented to the user, and detecting the encoded identifier in the operational block 410 comprises scanning the printed page 70 (e.g., using a camera of the electronic device 20). The visual identifier (e.g., QR code) can be configured to be detected by the electronic device 20 and decoded by a program executed by the electronic device 20.

Figure 6:
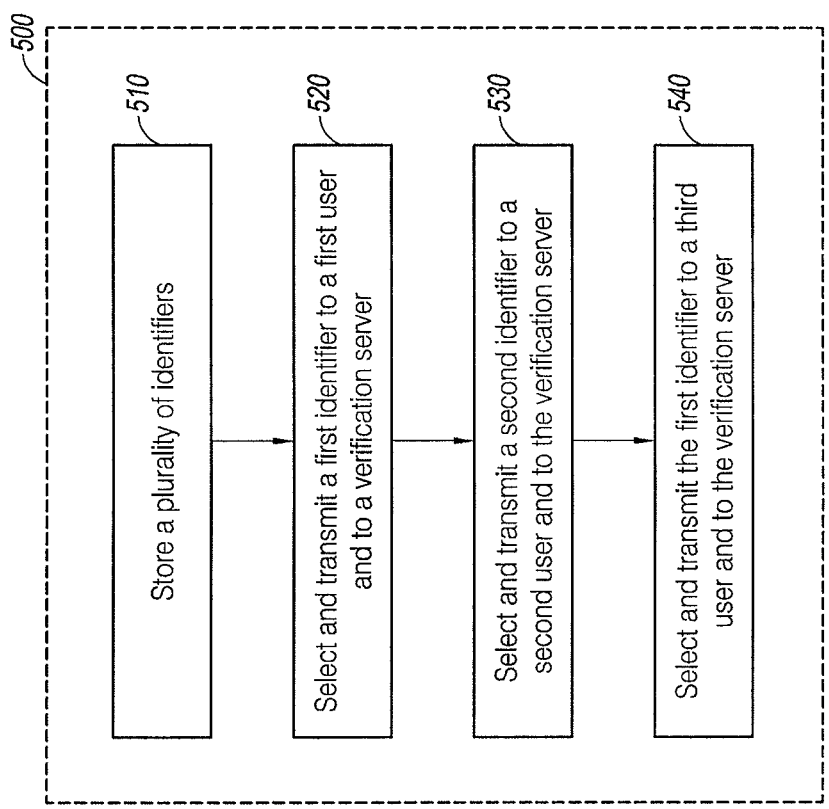
FIG. 6 is a flow diagram of an example method of authenticating users seeking to conduct at least one interaction with a secured capability in accordance with certain embodiments described herein.

FIG. 6 is a flow diagram of an example method 500 of authenticating users seeking to conduct at least one interaction with a secured capability in accordance with certain embodiments described herein. For example, the at least one interaction can comprise opening a lock selectively inhibiting physical entry to an enclosed region within a safe, building, or vehicle, retrieval of information from a secured internet portal, or transmission of information for completing a transaction with a secured internet portal. The example method 500 is described herein with regard to the aspects of an authorization process that are performed by a computer 50 (e.g., web server). The computer 50 (e.g., web server) can comprise a processor configured to perform the method 500. While the method 500 is described below by referencing certain structural components and signals, the method 500 may be performed using other structural components and signals.

In an operational block 510, the method 500 comprises storing a plurality of identifiers corresponding to the secured capability. In certain embodiments, each identifier of the plurality of identifiers does not contain user-specific or interaction-specific information. In an operational block 520, the method 500 further comprises selecting and transmitting a first identifier of the plurality of identifiers to a first user and to a verification server 60 to initiate a first interaction with the first user. The first identifier is configured to be presented in a first form to a first electronic device 20a being used by the first user. The verification server 60 is configured to receive the plurality of identifiers and to receive validation signals from electronic devices 20 being used by the users. The verification server 60 is further configured to evaluate, based at least on the received validation signals and identifiers, whether the users are authorized to conduct the at least one interaction with the secured capability. In an operational block 520, the method 500 further comprises selecting and transmitting a second identifier of the plurality of identifiers to a second user and to the verification server 60 to initiate a second interaction with the second user. The second identifier is configured to be presented in a second form to a second electronic device 20b being used by the second user. In an operational block 530, the method 500 further comprises selecting and transmitting the first identifier to a third user and to the verification server 60 to initiate a third interaction with the third user. The first identifier is configured to be presented in a third form to a third electronic device 20c being used by the third user.

In certain embodiments, at least one of the first form, the second form, and the third form comprises an encoded visual form (e.g., QR code) configured to be presented using a computer display, while in certain other embodiments, at least one of the first form, the second form, and the third form comprises an encoded auditory form configured to be presented using a computer speaker. At least one of the first form, the second form, and the third form can comprise an encoded visual form (e.g., QR code) on a printed page 70. At least one of the first form, the second form, and the third form can comprise a radio signal (e.g., a repeating encoded radio signal).

Example Authentication/Login Configurations with Reusable Identifiers

Various example configurations for authentication/login are described below in accordance with certain embodiments. While each of these descriptions provides an example sequence of steps, these sequences of steps should not be interpreted as limiting, since two or more of the steps can be performed in other sequences relative to one another or can be performed concurrently with one another.

Figure 7:
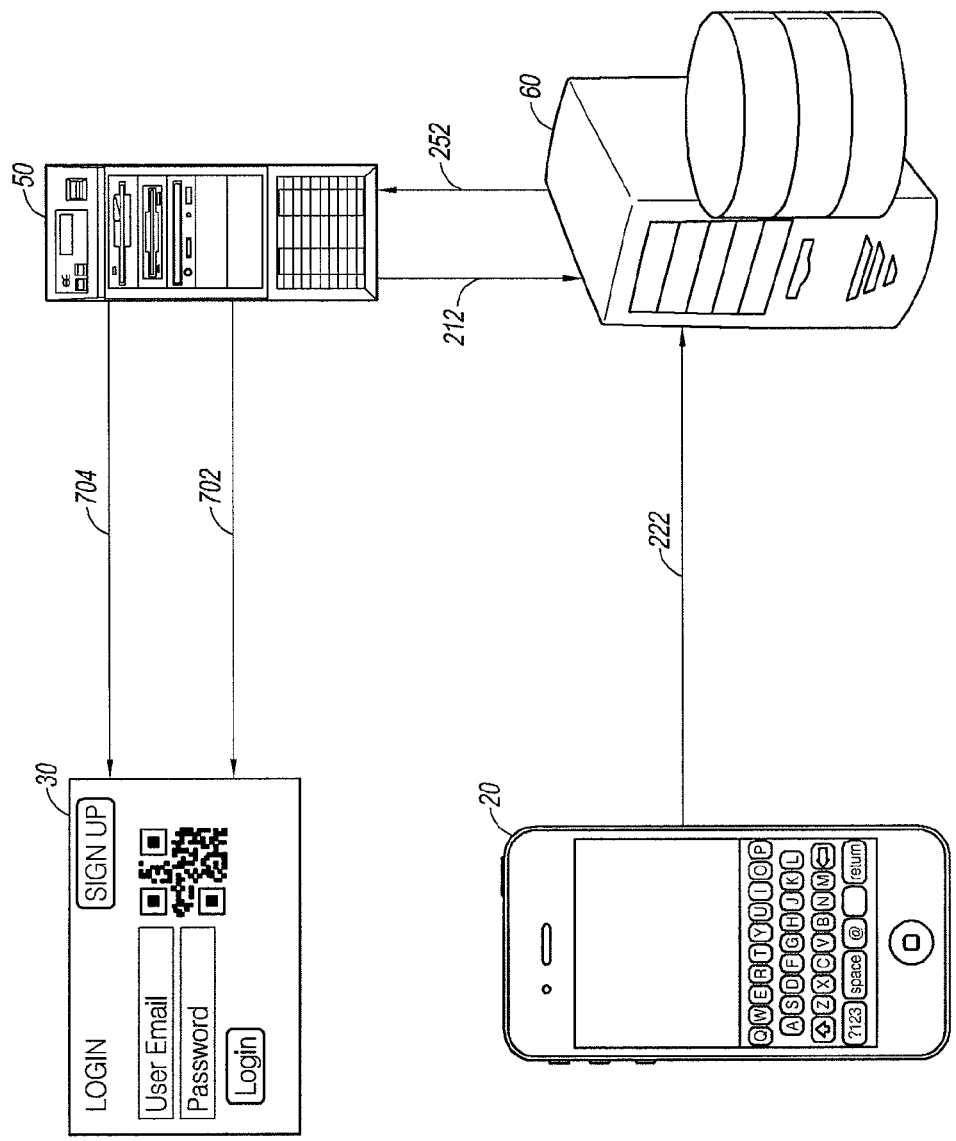
FIG. 7 schematically illustrates a first example configuration for providing a secured authentication/login in accordance with certain embodiments described herein.

FIG. 7 schematically illustrates a first example configuration for providing a secured authentication/login in accordance with certain embodiments described herein. In certain such embodiments, an electronic device 20 (e.g., a mobile device, mobile phone, smartphone, tablet) can be used to advantageously provide a significantly more secure and faster authentication/login than is conventionally available. The configuration of FIG. 7 shows a minimal number of steps, as compared to the example configurations of FIGS. 8-12, for implementing the authentication/login functionality.

The user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a verification process. The computer 50 can also send a login page signal 702 comprising the selected QR code to the user browser to be displayed to the user. This login page signal 702 can be sent before, concurrently with, or after the first signal 212 is sent.

Using the electronic device 20, the user can scan the QR code (e.g., using the camera of the smartphone) and can extract the reusable identifier 214 (e.g., using a program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., a valid/invalid flag or authentication information 254) from the validation server 60 to the computer 50.

The computer 50, upon receiving the authorization signal 252, can automatically log in the user and can send a homepage signal 704 to the user browser of the electronic device 30 to display a web page containing, or otherwise allowing access to, the information (e.g., the secured information or the sensitive information) sought to be accessed by the user. In certain embodiments in which the system and method are used to authorize access to a safe, lock or door, upon receiving the authorization signal 252, the safe, lock, or door will open.

Figure 8:
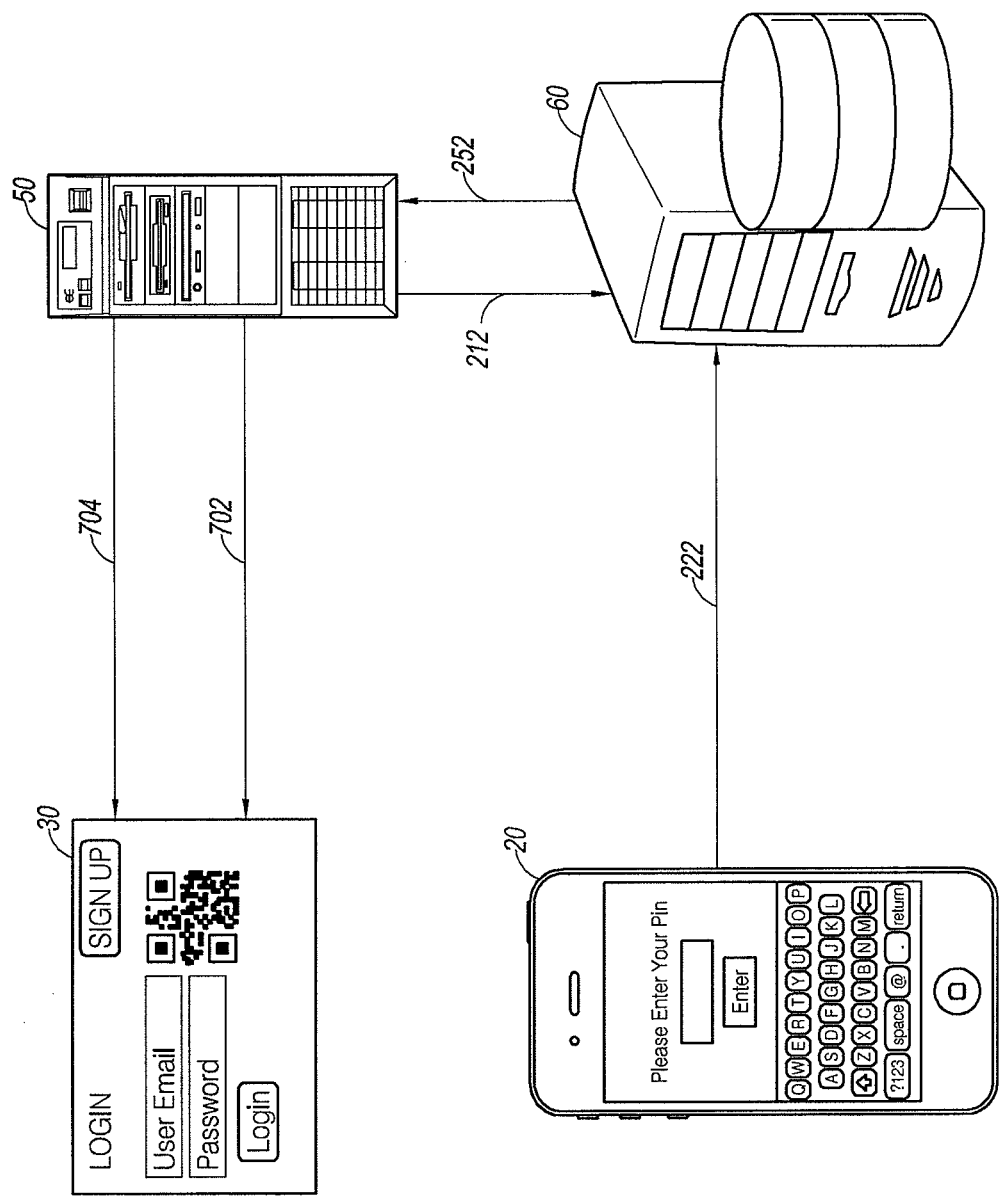
FIG. 8 schematically illustrates a second example configuration for providing a secured authentication/login in accordance with certain embodiments described herein.

FIG. 8 schematically illustrates a second example configuration for providing a secured authentication/login in accordance with certain embodiments described herein. In certain such embodiments, increased security for the authentication/login is provided by adding a user-specific authorization code (e.g., a "personal identification number" or "PIN") security check (e.g., requiring the user of the electronic device 20 to enter a PIN) to ensure that the authorized user is operating the electronic device 20 and is accessing the secured information. For example, the PIN may be composed of a sequence numbers, a sequence of text characters, or a sequence of images selected from a list of images. The PIN may be static (e.g., user enters the same PIN, until changed) or dynamic (e.g., different authentication questions are asked at different usage points, which may require different user inputs). In certain embodiments described herein, the PINs are user created numeric codes or passwords.

The user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a verification process. The computer 50 can also send a login page signal 702 comprising the selected QR code to the user browser to be displayed to the user. This login page signal 702 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., a valid/invalid flag or authentication information 254) from the validation server 60 to the computer 50.

The computer 50, upon receiving the authorization signal 252, can automatically log in the user and can send a homepage signal 704 to the user browser of the electronic device 30 to display a web page containing, or otherwise allowing access to, the information (e.g., the secured information or the sensitive information) sought to be accessed by the user. In certain embodiments in which the system and method are used to authorize access to a safe, lock or door, upon receiving the authorization signal 252, the safe, lock, or door will open.

Figure 9:
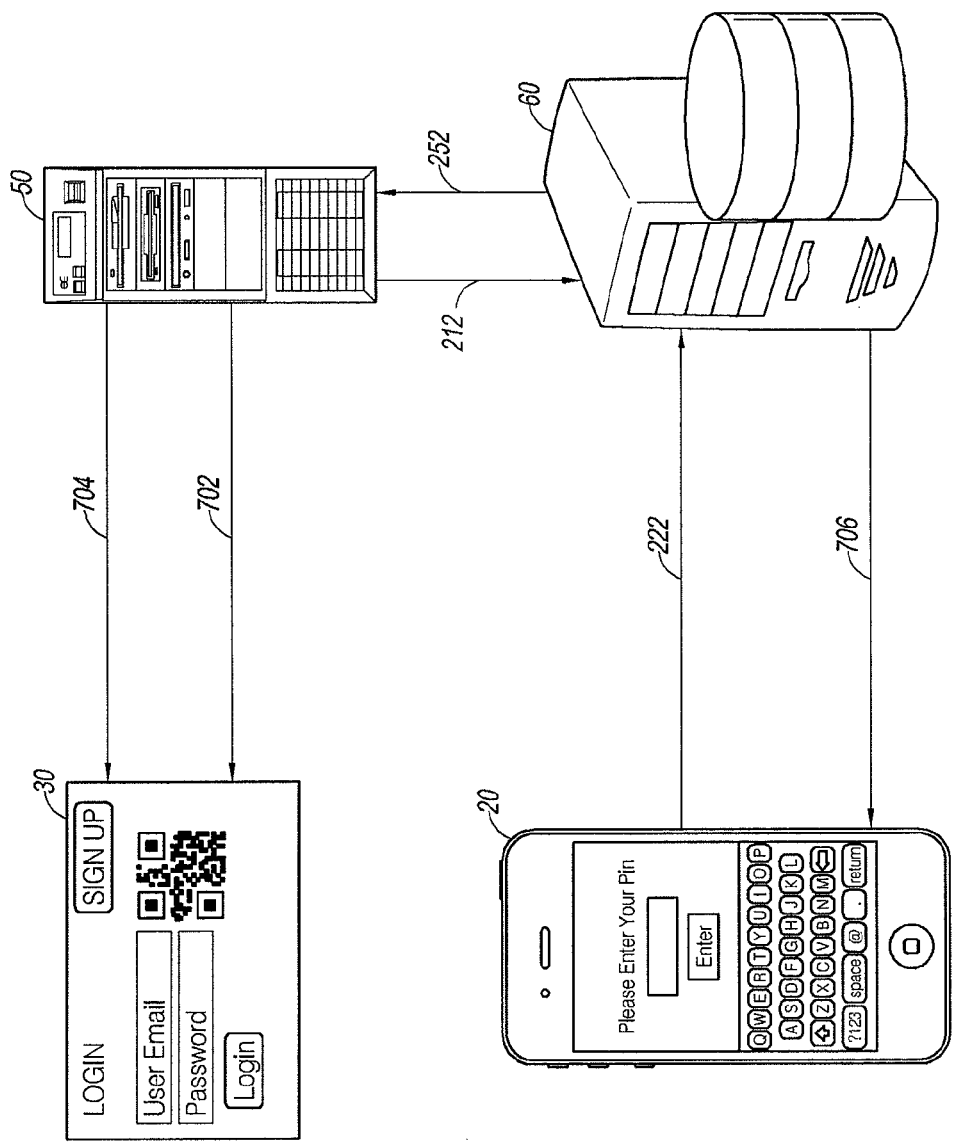
FIG. 9 schematically illustrates a third example configuration for providing a secured authentication/login in accordance with certain embodiments described herein.

FIG. 9 schematically illustrates a third example configuration for providing a secured authentication/login in accordance with certain embodiments described herein. Besides including the PIN functionality described above with regard to FIG. 8, the electronic device 20 can also receive an authorization signal 706 comprising authorization information 254 from the verification server 60, so that the electronic device 20 can display a successful authorization message to the user.

A user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a verification process. The computer 50 can also send a login page signal 702 comprising the selected QR code to the user browser to be displayed to the user. This login page signal 702 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., a valid/invalid flag or authentication information 254) from the validation server 60 to the computer 50.

The computer 50, upon receiving the authorization signal 252, can automatically log in the user and can send a homepage signal 704 to the user browser of the electronic device 30 to display a web page containing, or otherwise allowing access to, the information (e.g., the secured information or the sensitive information) sought to be accessed by the user. In certain embodiments in which the system and method are used to authorize access to a safe, lock or door, upon receiving the authorization signal 252, the safe, lock, or door will open. As schematically illustrated by FIG. 9, the verification server 60 can also send an authorization signal 706 comprising authorization information 254 to the electronic device 20.

Figure 10:
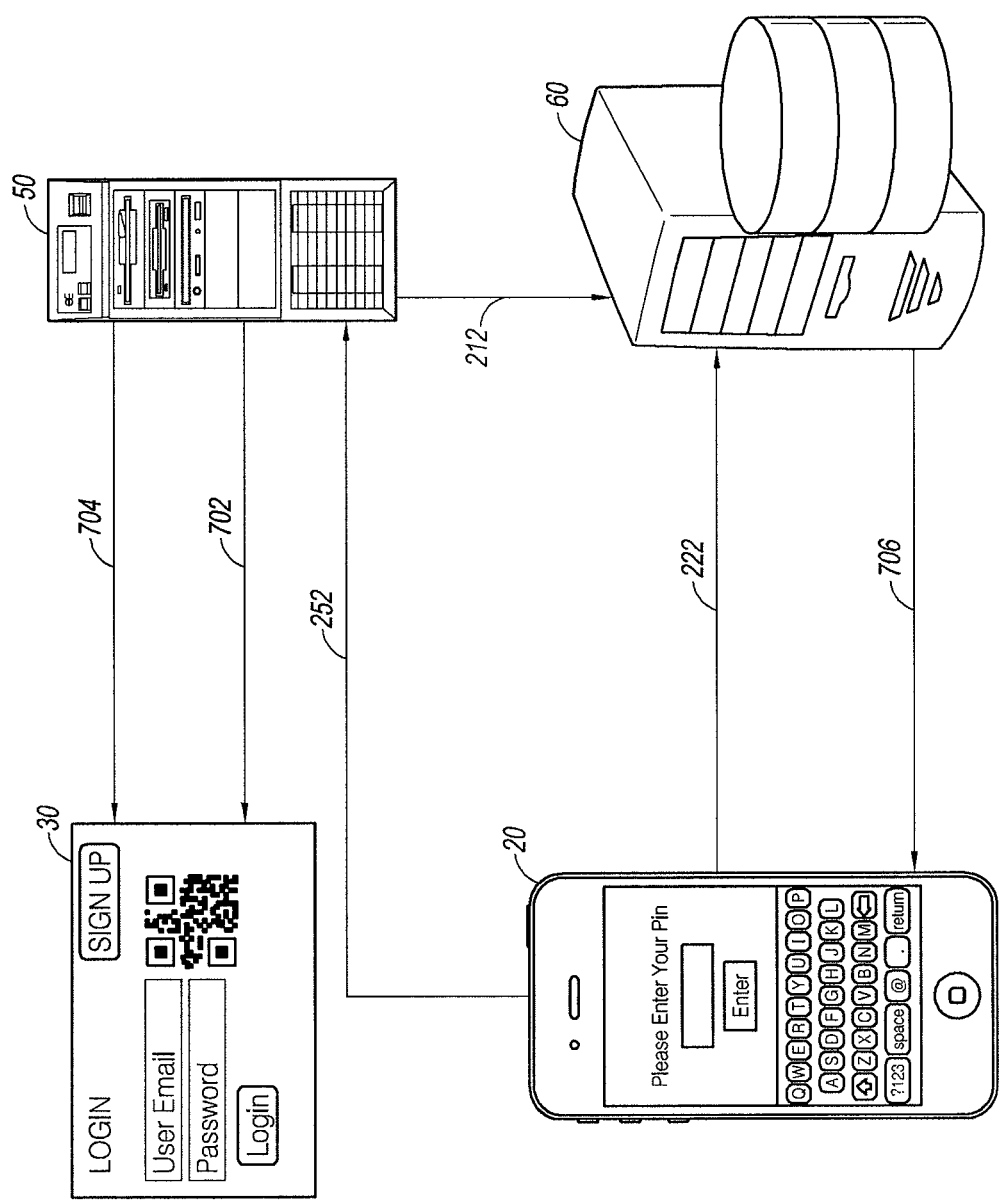
FIG. 10 schematically illustrates a fourth example configuration for providing a secured authentication/login in accordance with certain embodiments described herein.

FIG. 10 schematically illustrates a fourth example configuration for providing a secured authentication/login in accordance with certain embodiments described herein. While including the PIN functionality and the authorization signal 706 described above with regard to FIG. 9, the example configuration of FIG. 10 can have the electronic device 20 transmit the authorization signal 252 comprising the authorization information 254 to the computer 50, instead of the verification server 60 transmitting the authorization signal 252 comprising authorization information 254 to the computer 50. In certain such embodiments, the computer 50 can allow the electronic device 20 to send additional information directly to the computer 50. Alternatively, in certain other embodiments, the computer 50 can send additional information directly to the electronic device 20 (e.g., membership expiration date, urgent actions that need to take place, etc.).

A user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a verification process. The computer 50 can also send a login page signal 702 comprising the selected QR code to the user browser to be displayed to the user. This login page signal 702 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 706 (e.g., a valid/invalid flag or authentication information 254) from the validation server 60 to the electronic device 20. The electronic device 20 can then send an authorization signal 252 (e.g., a valid/invalid flag or authentication information 254) to the computer 50.

The computer 50, upon receiving the authorization signal 252, can automatically log in the user and can send a home-page signal 704 to the user browser of the electronic device 30 to display a web page containing, or otherwise allowing access to, the information (e.g., the secured information or the sensitive information) sought to be accessed by the user. In certain embodiments in which the system and method are used to authorize access to a safe, lock or door, upon receiving the authorization signal 252, the safe, lock, or door will open.

Figure 11:
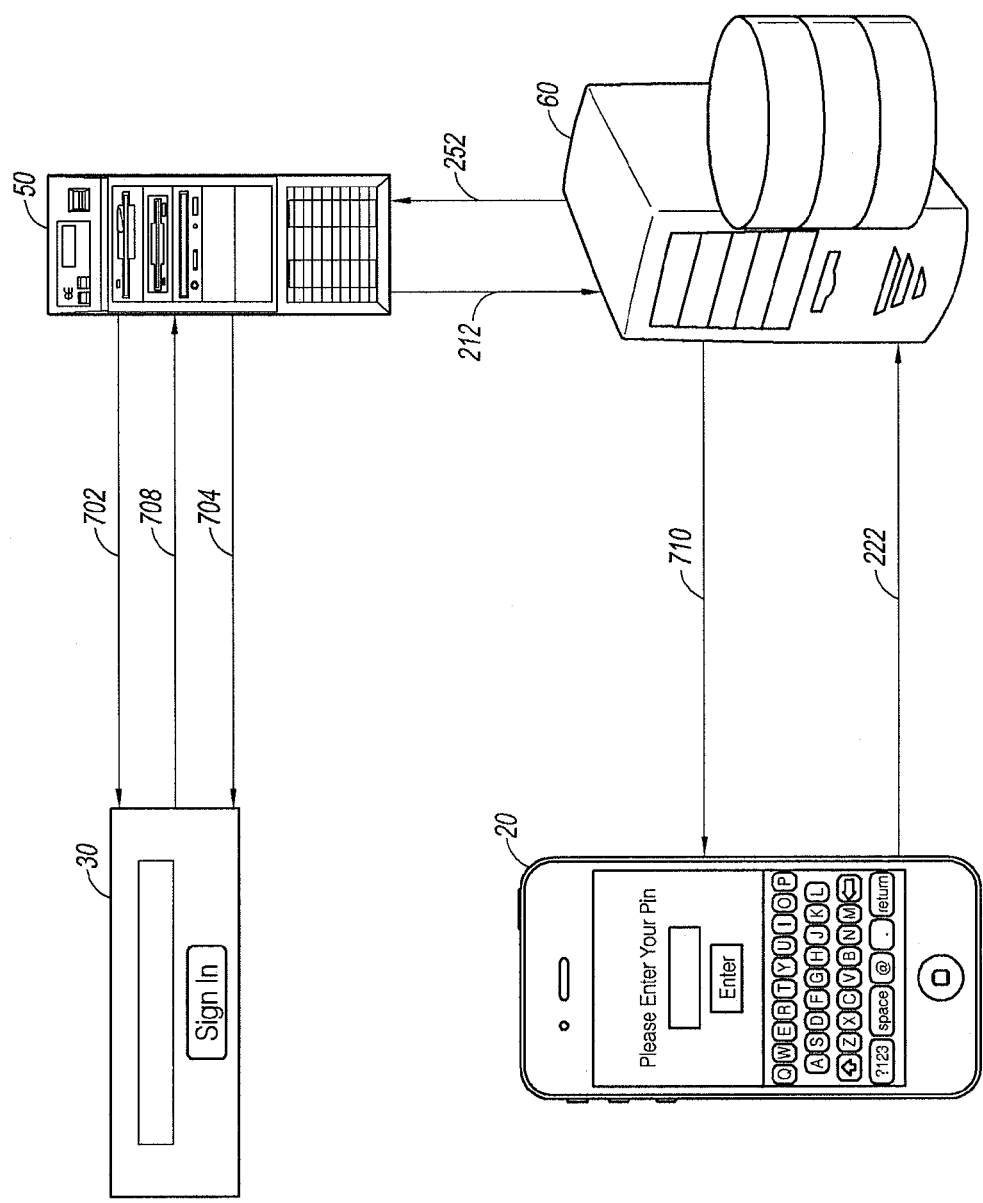
FIG. 11 schematically illustrates a fifth example configuration for providing a secured authentication/login in accordance with certain embodiments described herein.

FIG. 11 schematically illustrates a fifth example configuration for providing a secured authentication/login in accordance with certain embodiments described herein. While including the PIN functionality described above with regard to FIG. 8, the example configuration of FIG. 11 prompts the user to enter a userID on the electronic device 30 to identify themselves, so that the verification server 60 can send a signal to the appropriate electronic device 20 to ask the user to verify the authentication. This example configuration can be referred to as a "push" configuration since, as described below, a notification is "pushed" from the verification server 60 to the electronic device 20, in contrast to the example configurations of FIGS. 7-10 in which the electronic device 20 transmits a signal comprising the extracted identifier to the verification server 60. In certain such embodiments, the information pushed from the verification server 60 to the electronic device 20 includes information regarding the computer 50 providing the secured capability (e.g., the website URL or further authentication criteria).

A user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The computer 50 can then send a login page signal 702 to the user with a prompt (e.g., a field) to enter the userID of the user. The user can then enter the userID which is then sent by the electronic device 30 to the computer 50 in a signal 708. The userID can comprise of a sequence numbers, text or images selected from a list of images. The userID may be static (e.g., user enters the same userID, until changed) or dynamic (e.g., different authentication questions are asked at different usage points, which may require different user inputs). In certain embodiments described herein, the userIDs are user created numeric codes or passwords. In certain embodiments, the userID can be stored in a cookie on the browser of the electronic device 30, so the userID can be automatically presented to the computer 50.

The computer 50 can then select the next reusable identifier 214 (e.g., a TSSID which can be the next TSSID of a list of predetermined TSSIDs in a round robin queue). The computer 50 can send a first signal 212 containing the reusable identifier 214 and the userID to the verification server 60, and which can indicate the potential beginning of a verification process.

The verification server 60 uses the userID to determine which electronic device 20 corresponds to the userID (e.g., using a stored database or look-up table that correlates the userIDs with corresponding electronic devices 20) and the verification server 60 sends (e.g., "pushes") a signal 710 comprising the reusable identifier 214 (or a reusable identifier related to the reusable identifier 214 with a known and predetermined relationship) to the electronic device 20 corresponding to the userID. In response to the signal 710, the electronic device 20 can prompt the user to enter a PIN, which the electronic device 20 can verify (e.g., by checking it against a previously setup PIN). If the PIN is correct, the electronic device 20 can send a second signal 222 comprising the reusable identifier 214 and the user verification information 226 to the verification server 60. The verification server 60 can check the reusable identifier 214 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., a valid/invalid flag or authentication information 254) from the validation server 60 to the computer 50. In certain embodiments, the verification server 60 can also send an authorization signal 706 comprising authorization information 254 to the electronic device 20.

The computer 50, upon receiving the authorization signal 252, can automatically log in the user and can send a homepage signal 704 to the user browser of the electronic device 30 to display a web page containing, or otherwise allowing access to, the information (e.g., the secured information or the sensitive information) sought to be accessed by the user. In certain embodiments in which the system and method are used to authorize access to a safe, lock or door, upon receiving the authorization signal 252, the safe, lock, or door will open.

Figure 12:
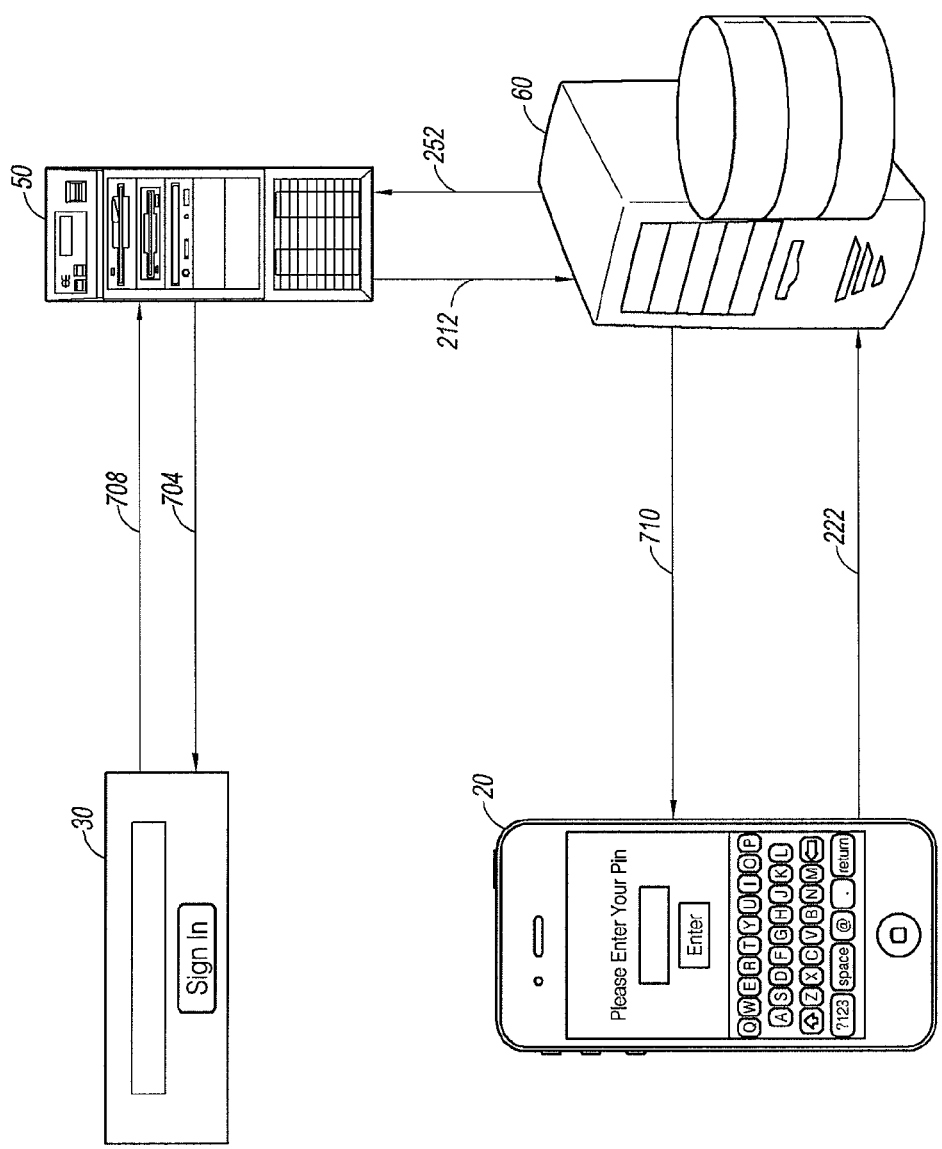
FIG. 12 schematically illustrates a sixth example configuration for providing a secured authentication/login in accordance with certain embodiments described herein.

FIG. 12 schematically illustrates a sixth example configuration for providing a secured authentication/login in accordance with certain embodiments described herein. While including the PIN functionality described above with regard to FIG. 8, the example configuration of FIG. 12 prompts the user to enter a userID on the electronic device 30 to identify themselves, and the verification server 60 awaits a signal from a securely authenticated user using the electronic device 20 identifying which website to connect to.

A user can use an electronic device 30 running a user browser with the intention of entering into a secure environment (e.g., to access secure information or sensitive information) hosted by the computer 50 (e.g., a web server). For example, the user can type a secured website uniform resource locator (URL) in a computer browser, although other techniques (e.g., selecting the website from a list of "favorites") can be used.

The webpage reached by the user can include a prompt (e.g., a field) for the user to enter the userID of the user. The user can then enter the userID which is then sent by the electronic device 30 to the computer 50 in a signal 708. The userID can comprise of a sequence numbers, text or images selected from a list of images. The userID may be static (e.g., user enters the same userID, until changed) or dynamic (e.g., different authentication questions are asked at different usage points, which may require different user inputs). In certain embodiments described herein, the userIDs are user created numeric codes or passwords. In certain embodiments, the userID can be stored in a cookie on the browser of the electronic device 30, so the userID can be automatically presented to the website.

The computer 50 can then select the next reusable identifier 214 (e.g., a TSSID which can be the next TSSID of a list of predetermined TSSIDs in a round robin queue). The computer 50 can send a first signal 212 containing the reusable identifier 214 and the userID to the verification server 60, and which can indicate the potential beginning of a verification process.

The verification server 60 uses the userID to determine which electronic device 20 corresponds to the userID (e.g., using a stored database or look-up table that correlates the userIDs with corresponding electronic devices 20) and the verification server 60 sends (e.g., "pushes") a signal 710 comprising the reusable identifier 214 (or a reusable identifier related to the reusable identifier 214 with a known and predetermined relationship) to the electronic device 20 corresponding to the userID. In response to the signal 710, the electronic device 20 can prompt the user to enter a PIN, which the electronic device 20 can verify (e.g., by checking it against a previously setup PIN). If the PIN is correct, the user can then use the electronic device 20 to select a website to login (e.g., from a previously-created site list on the electronic device 20). The electronic device 20 can then send a second signal 222 comprising the address of the selected website, the reusable identifier 214, and the user verification information 226 to the verification server 60. The verification server 60 can check the reusable identifier 214 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., a valid/invalid flag or authentication information 254) to the computer 50. In addition, the verification server 60 can then create an "Authorized Login URL" for the authorized user and can send the "Authorized Login URL" to the computer 50. The verification server 60 also may send an authorization signal (e.g., a valid/invalid flag or authentication information 254) to the computer 50. The computer 50, upon receiving the authorization signal 252 and the "Authorized Login URL", can automatically display the "Authorized Login URL" web page containing the user's information (e.g., the secured information or the sensitive information).

Example Ecommerce Payment Configurations with Reusable Identifiers

Various example configurations for ecommerce payments are described below in accordance with certain embodiments. While each of these descriptions provides an example sequence of steps, these sequences of steps should not be interpreted as limiting, since two or more of the steps can be performed in other sequences relative to one another or can be performed concurrently with one another.

Figure 13:
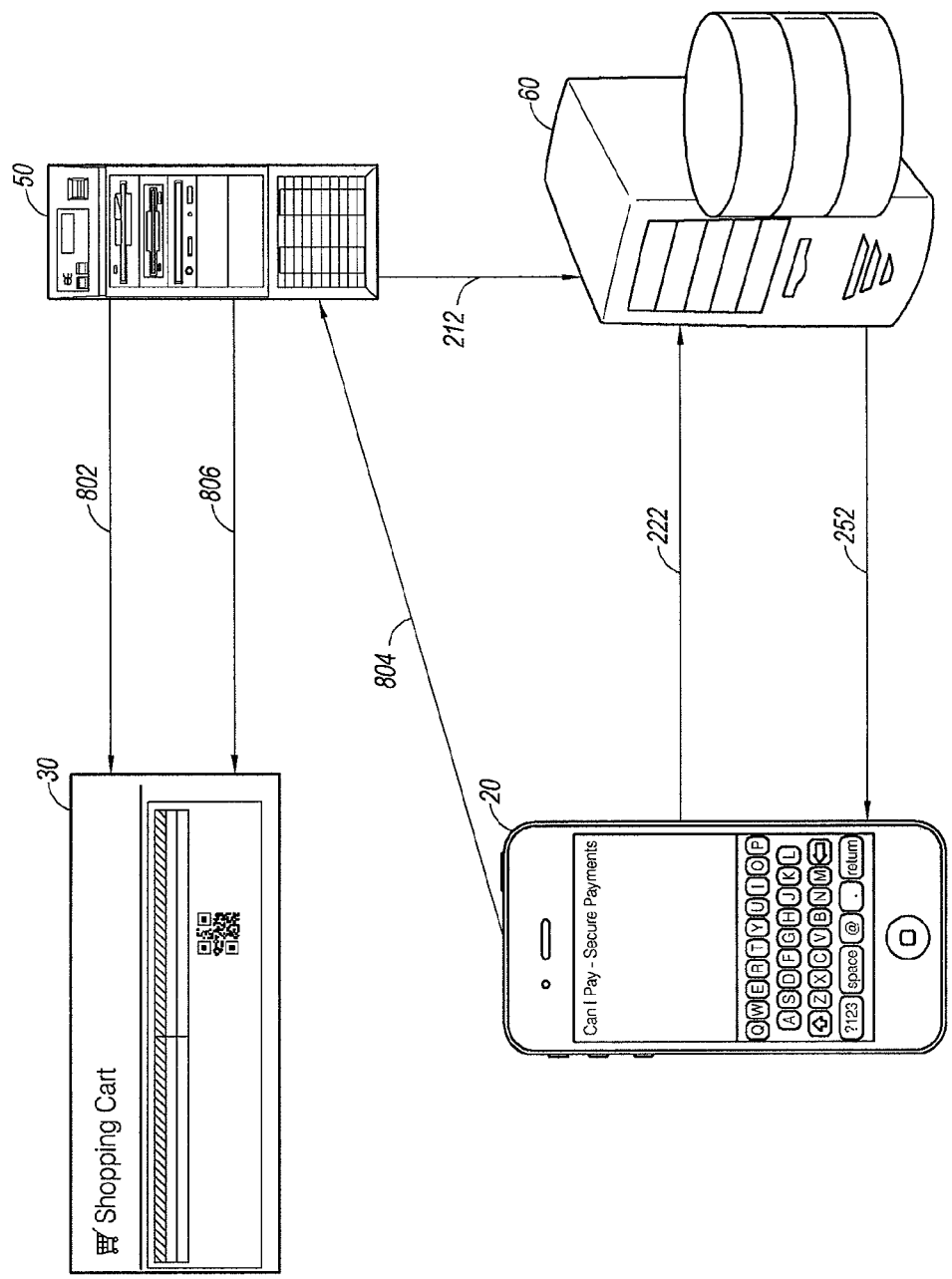
FIG. 13 schematically illustrates a first example configuration for providing a secured electronic payment capability in accordance with certain embodiments described herein.

FIG. 13 schematically illustrates a first example configuration for providing a secured electronic payment capability in accordance with certain embodiments described herein. In certain such embodiments, an electronic device 20 (e.g., a mobile device, mobile phone, smartphone, tablet) can be used to advantageously provide a significantly more secure and faster online electronic payment capability than is conventionally available. While described below with reference to websites, the example configurations described below can be used on any payment terminal or a point of sale system for fast and safe payments. The configuration of FIG. 13 shows a minimal number of steps, as compared to the example configurations of FIGS. 14-16, for implementing the electronic payment functionality.

The user can use an electronic device 30 running a user browser with the intention of making a payment. For example, the payment may be made at the end of an online shopping session hosted by the computer 50 (e.g., a web server). The payment process can be initiated by a user clicking on a "checkout" button on a webpage, although other techniques may be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a payment process. In certain embodiments, in addition to the first signal 212, the computer 50 also sends information regarding the company, price and shopping cart details to the verification server 60. The computer 50 can also send a shopping cart page signal 802 comprising the selected QR code to the user browser to be displayed to the user. This shopping cart page signal 802 can be sent before, concurrently with, or after the first signal 212 is sent.

Using the electronic device 20, the user can scan the QR code (e.g., using the camera of the smartphone) and can extract the reusable identifier 214 (e.g., using a program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, shopping cart information, and information regarding the amount that is to be paid.

The electronic device 20, upon receiving the authorization signal 252, can automatically send a payment signal 804 to the computer 50 to provide payment and shipping information to the computer 50. In certain embodiments, the electronic device 20 can also send an authorization signal (e.g., a valid/invalid flag or authentication information 254) to the computer 50 as well. The computer 50, upon receiving the payment signal 804, can process the payment and can display a receipt page (e.g., by sending a receipt signal 806 to the electronic device 30).

Figure 14:
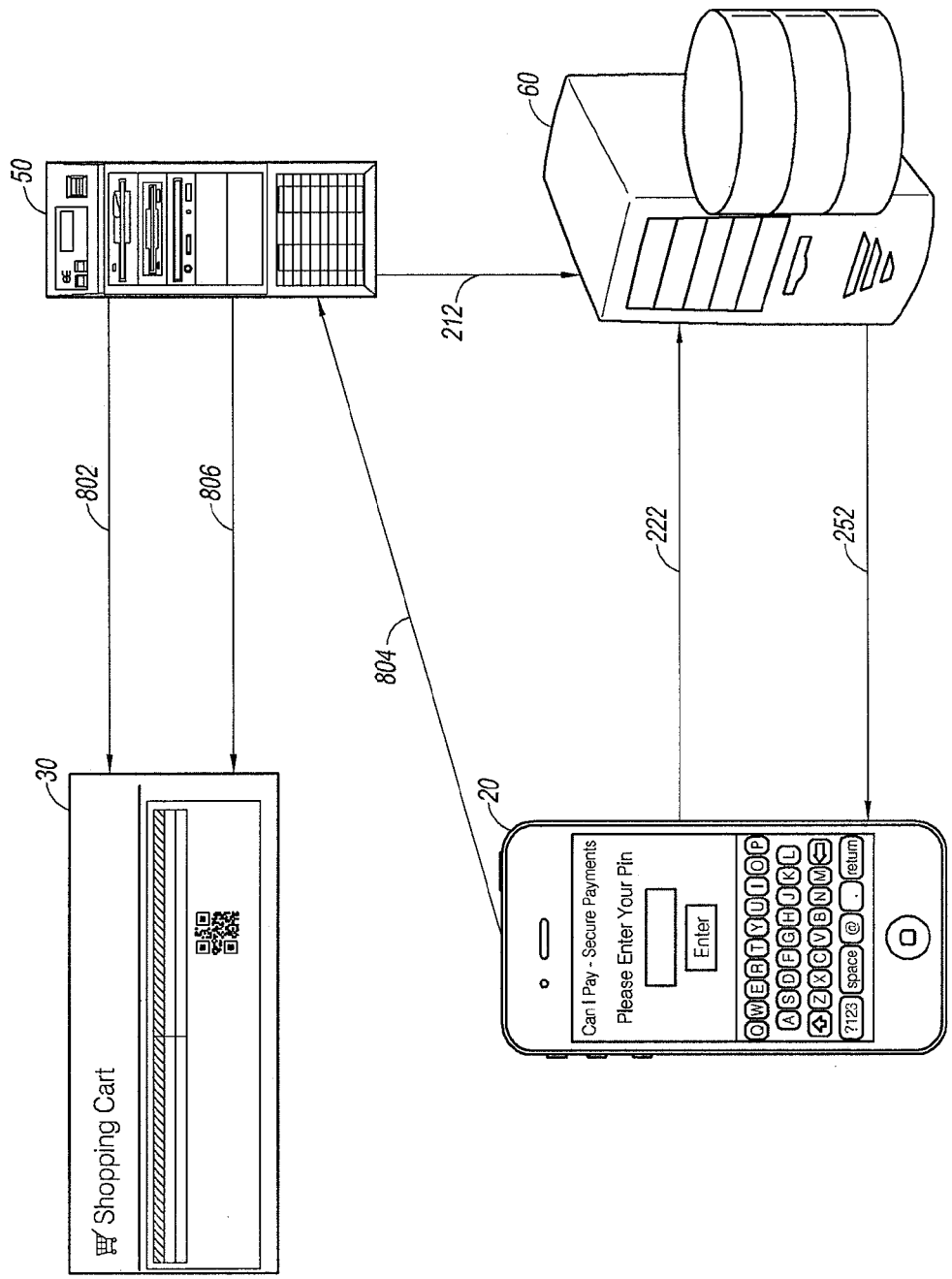
FIG. 14 schematically illustrates a second example configuration for providing a secured electronic payment capability in accordance with certain embodiments described herein.

FIG. 14 schematically illustrates a second example configuration for providing a secured electronic payment capability in accordance with certain embodiments described herein. In certain such embodiments, increased security for the payment is provided by adding a user-specific authorization code (e.g., a "personal identification number" or "PIN") security check (e.g., requiring the user of the electronic device 20 to enter a PIN) to ensure that the authorized user is operating the electronic device 20 and is completing the transaction. For example, the PIN may be composed of a sequence numbers, text or images selected from a list of images. The PIN may be static (e.g., user enters the same PIN, until changed) or dynamic (e.g., different authentication questions are asked at different usage points, which may require different user inputs). In certain embodiments described herein, the PINs are user created numeric codes or passwords.

The user can use an electronic device 30 running a user browser with the intention of making a payment. For example, the payment may be made at the end of an online shopping session hosted by the computer 50 (e.g., a web server). The payment process can be initiated by a user clicking on a "checkout" button on a webpage, although other techniques may be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a payment process. In certain embodiments, in addition to the first signal 212, the computer 50 also sends information regarding the company, price and shopping cart details to the verification server 60. The computer 50 can also send a shopping cart page signal 802 comprising the selected QR code to the user browser to be displayed to the user. This shopping cart page signal 802 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, shopping cart information, and information regarding the amount that is to be paid.

The electronic device 20, upon receiving the authorization signal 252, can automatically send a payment signal 804 to the computer 50 to provide payment and shipping information to the computer 50. In certain embodiments, the electronic device 20 can also send an authorization signal (e.g., a valid/invalid flag or authentication information 254) to the computer 50 as well. The computer 50, upon receiving the payment signal 804, can process the payment and can display a receipt page (e.g., by sending a receipt signal 806 to the electronic device 30).

Figure 15:
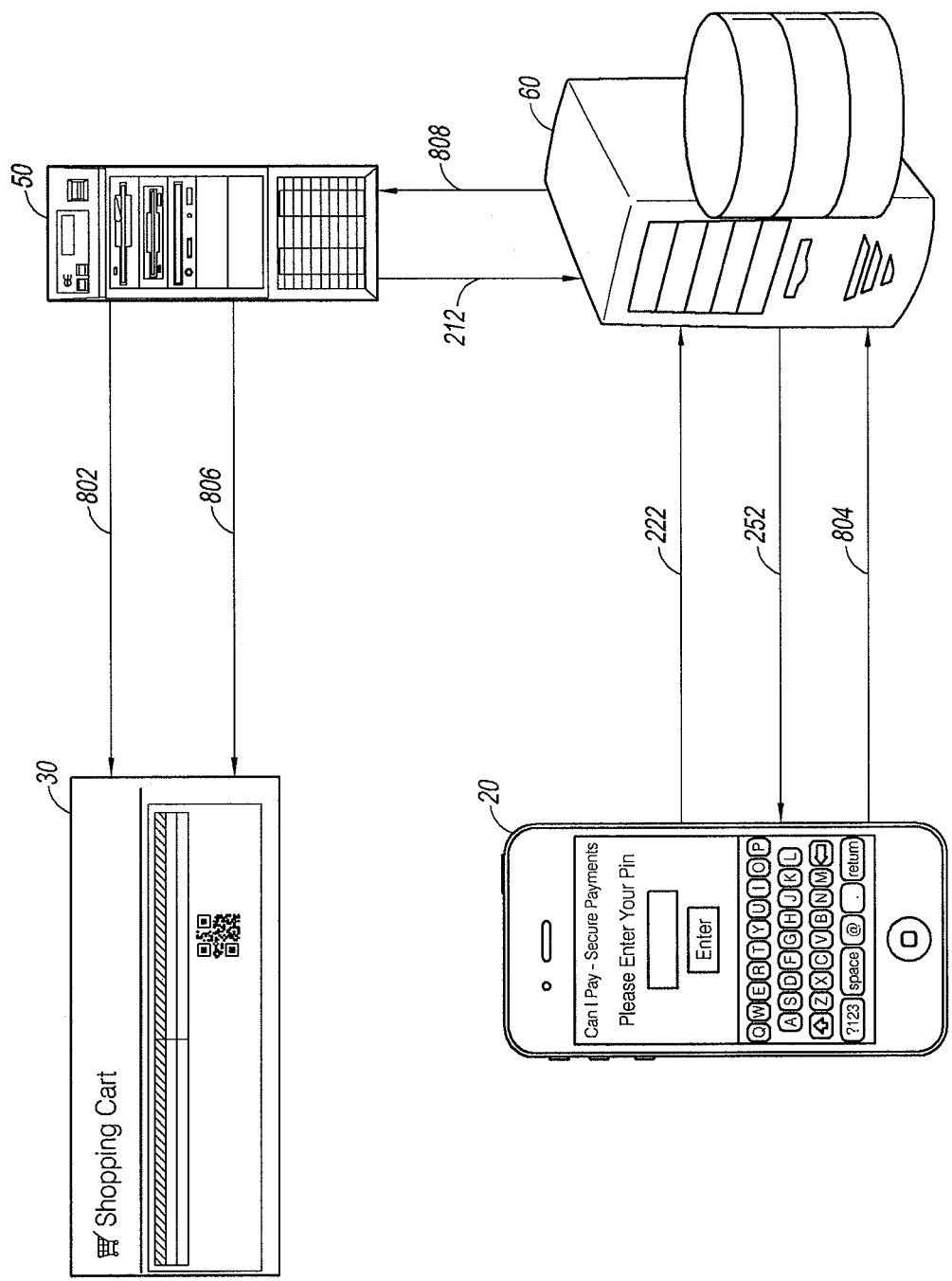
FIG. 15 schematically illustrates a third example configuration for providing a secured electronic payment capability in accordance with certain embodiments described herein.

FIG. 15 schematically illustrates a third example configuration for providing a secured electronic payment capability in accordance with certain embodiments described herein. Besides including the PIN functionality described above with regard to FIG. 14, the example configuration of FIG. 15 can provide an additional safety for the user by not sending the sensitive credit card or bank account information to an ecommerce provider (e.g., the computer 50). Instead, the verification server 60 processes the payment and sends a payment confirmation signal (e.g., flag) to the computer 50, along with the shipping information. In this way, a user can purchase from an unknown online vendor without risking his credit card or bank account information.

The user can use an electronic device 30 running a user browser with the intention of making a payment. For example, the payment may be made at the end of an online shopping session hosted by the computer 50 (e.g., a web server). The payment process can be initiated by a user clicking on a "checkout" button on a webpage, although other techniques may be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a payment process. In certain embodiments, in addition to the first signal 212, the computer 50 also sends information regarding the company, price and shopping cart details to the verification server 60. The computer 50 can also send a shopping cart page signal 802 comprising the selected QR code to the user browser to be displayed to the user. This shopping cart page signal 802 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, shopping cart information, and information regarding the amount that is to be paid.

The electronic device 20, upon receiving the authorization signal 252, can automatically send a payment signal 804 (e.g., containing payment information, which can include shipping information and/or billing information) to the verification server 60 which process the payment for the ecommerce site. In certain embodiments, the electronic device 20 can also send an authorization signal (e.g., a valid/invalid flag or authentication information 254) to the verification server 60 as well (e.g., after successfully sending the payment information directly to a payment gateway, causing a payment). The verification server 60, upon receiving the payment signal 804, can send a payment confirmation signal 808 (e.g., flag) and the shipping information to the computer 50. In certain embodiments, the verification server 60 can also send the copy 224 to the computer 50 as well. The computer 50, upon receiving the payment confirmation signal and the shipping information, can display a receipt page (e.g., by sending a receipt signal 806 to the electronic device 30).

Figure 16:
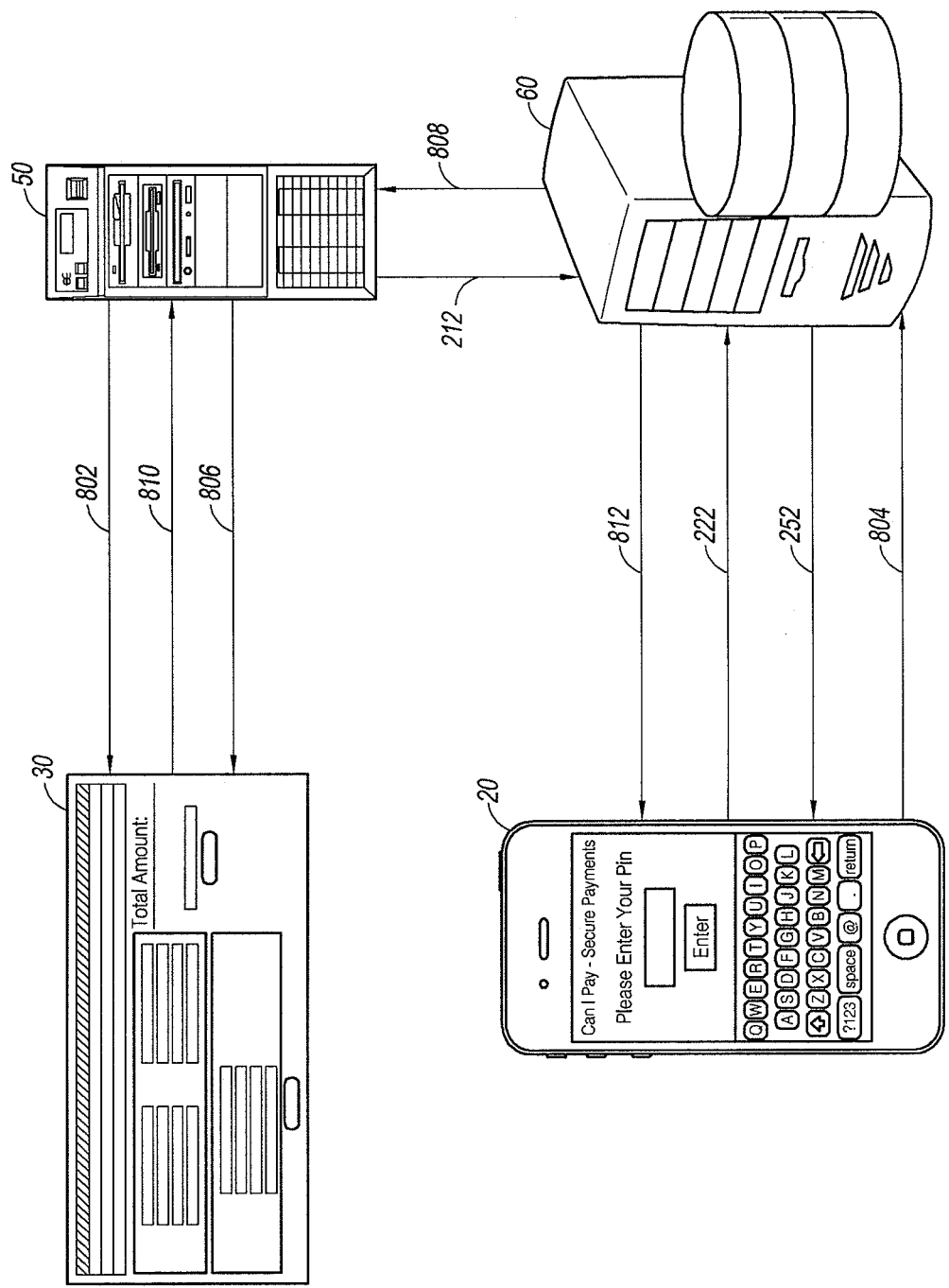
FIG. 16 schematically illustrates a fourth example configuration for providing a secured electronic payment capability in accordance with certain embodiments described herein.

FIG. 16 schematically illustrates a fourth example configuration for providing a secured electronic payment capability in accordance with certain embodiments described herein. While including the PIN functionality described above with regard to FIG. 14, the example configuration of FIG. 16 prompts the user to enter a userID on the electronic device 30 to identify themselves, so that the verification server 60 can send a signal to the appropriate electronic device 20 to ask the user to verify the payment. This example configuration can be referred to as a "push" configuration since, as described below, a notification is "pushed" from the verification server 60 to the electronic device 20, in contrast to the example configurations of FIGS. 13-15 in which the electronic device 20 transmits a signal comprising the extracted identifier to the verification server 60. In certain such embodiments, the information pushed from the verification server 60 to the electronic device 20 includes payment request information (e.g., whether the payment is a one-time payment or a recurring or installment payment).

The user can use an electronic device 30 running a user browser with the intention of making a payment. For example, the payment may be made at the end of an online shopping session hosted by the computer 50 (e.g., a web server). The payment process can be initiated by a user clicking on a "checkout" button on a webpage, although other techniques may be used.

The computer 50 can then send a checkout or shopping cart page signal 802 to the user with a prompt (e.g., a field) to enter the userID of the user. The user can then enter the userID which is then sent by the electronic device 30 to the computer 50 in a signal 810. The userID can comprise of a sequence numbers, text or images selected from a list of images. The userID may be static (e.g., user enters the same userID, until changed) or dynamic (e.g., different authentication questions are asked at different usage points, which may require different user inputs). In certain embodiments described herein, the userIDs are user created numeric codes or passwords. In certain embodiments, the userID can be stored in a cookie on the browser of the electronic device 30, so the user ID can be automatically presented to the computer 50.

The computer 50 can then select the next reusable identifier 214 (e.g., a TSSID which can be the next TSSID of a list of predetermined TSSIDs in a round robin queue). The computer 50 can send a first signal 212 containing the reusable identifier 214 and the userID to the verification server 60, and which can indicate the potential beginning of a purchase. In certain embodiments, in addition to the first signal 212, the computer 50 also sends information regarding the company, price and other details to the verification server 60.

The verification server 60 uses the userID to determine which electronic device 20 corresponds to the userID (e.g., using a stored database or look-up table that correlates the userIDs with corresponding electronic devices 20) and the verification server 60 sends (e.g., "pushes") a signal 812 comprising the reusable identifier 214 (or a reusable identifier related to the reusable identifier 214 with a known and predetermined relationship) to the electronic device 20 corresponding to the userID. In response to the signal 812, the electronic device 20 can prompt the user to enter a PIN, which the electronic device 20 can verify (e.g., by checking it against a previously setup PIN). If the PIN is correct, the electronic device 20 can send a second signal 222 comprising the reusable identifier 214 and the user verification information 226 to the verification server 60. The verification server 60 can check the reusable identifier 214 and the user verification information 226 it receives from the electronic device 20 against its database (e.g., the first association 232 and the second association 234) to determine whether to authorize the user (e.g., authenticate or login the user). For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, shopping cart information, and information regarding the amount that is to be paid. In certain embodiments, the verification server 60 can also send an authorization signal 808 comprising authorization information 254 to the computer 50.

The electronic device 20, upon receiving the authorization signal 252, can automatically send a payment signal 804 (e.g., containing payment information, which can include shipping information and/or billing information) to the verification server 60 which process the payment for the ecommerce site. In certain embodiments, the electronic device 20 can also send an authorization signal (e.g., a valid/invalid flag or authentication information 254) to the verification server 60 as well (e.g., after successfully sending the payment information directly to a payment gateway, causing a payment). The verification server 60, upon receiving the payment signal 804, can send a payment confirmation signal 808 (e.g., flag) and the shipping information to the computer 50. In certain embodiments, the verification server 60 can also send the copy 224 to the computer 50 as well. The computer 50, upon receiving the payment confirmation signal 808 and the shipping information, can display a receipt page (e.g., by sending a receipt signal 806 to the electronic device 30).

Figure 17:
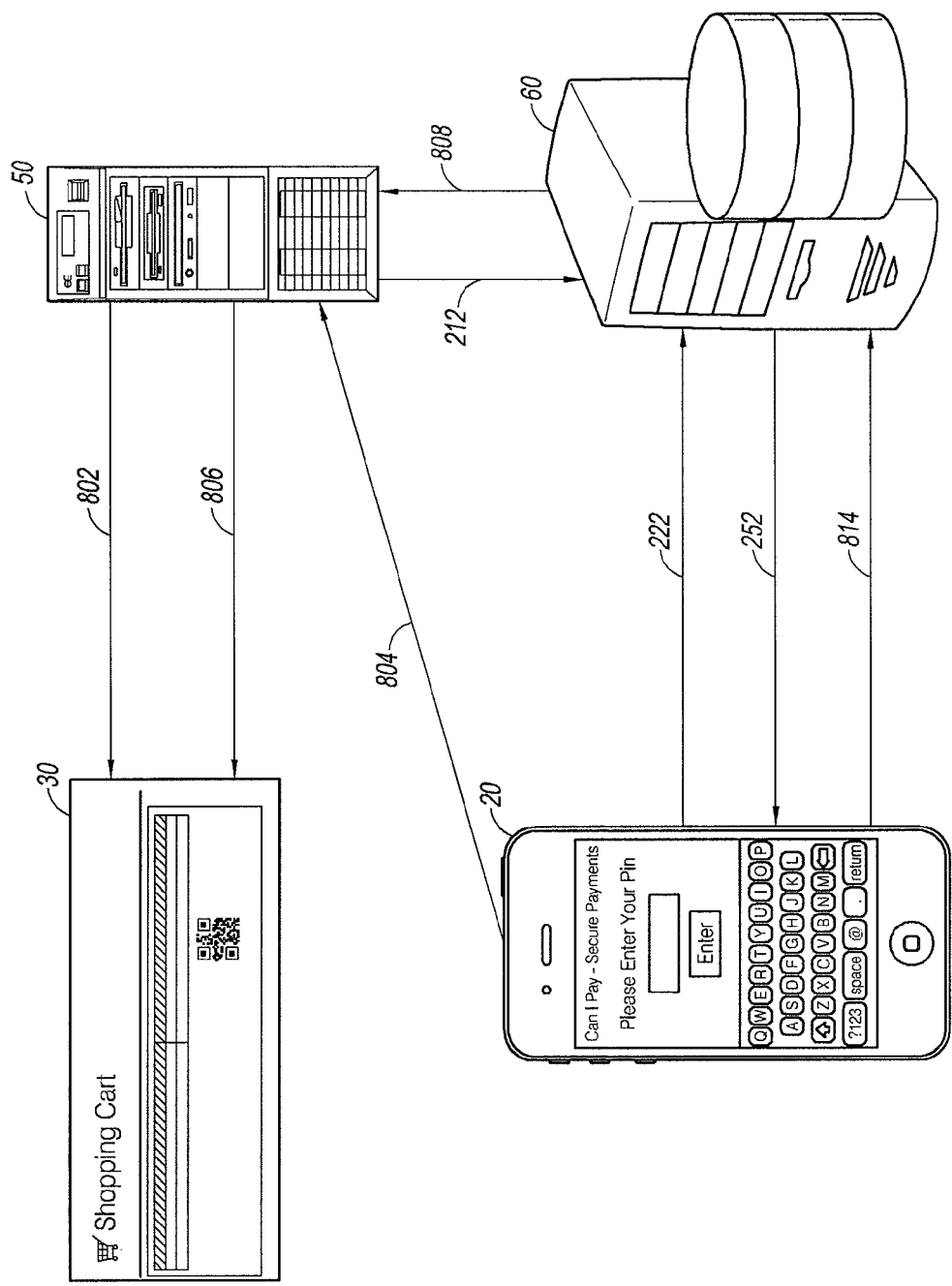
FIG. 17 schematically illustrates a fifth example configuration for providing a secured electronic payment capability in accordance with certain embodiments described herein.

FIG. 17 schematically illustrates a fifth example configuration for providing a secured electronic payment capability in accordance with certain embodiments described herein. While including the PIN functionality described above with regard to FIG. 14, the example configuration of FIG. 17 sends user validation information 226 to the verification server 60 and payment account information either to the computer 50 or a payment gateway.

The user can use an electronic device 30 running a user browser with the intention of making a payment. For example, the payment may be made at the end of an online shopping session hosted by the computer 50 (e.g., a web server). The payment process can be initiated by a user clicking on a "checkout" button on a webpage, although other techniques may be used.

The computer 50 can then select the next reusable identifier 214 (e.g., a TSSID which can be the next TSSID of a list of predetermined TSSIDs in a round robin queue) and the corresponding predetermined (e.g., premade) visual or auditory identifier (e.g., a QR code) in which the reusable identifier 214 is encoded. The computer 50 can send a first signal 212 containing the reusable identifier 214 to the verification server 60, and which can indicate the potential beginning of a payment process. In certain embodiments, in addition to the first signal 212, the computer 50 also sends information regarding the company, price and shopping cart details to the verification server 60. The computer 50 can also send a shopping cart page signal 802 comprising the selected QR code to the user browser to be displayed to the user. This shopping cart page signal 802 can be sent before, concurrently with, or after the first signal 212 is sent.

Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, shopping cart information, and information regarding the amount that is to be paid. In addition, the authorization signal 252 can comprise a payment template to provide information to the electronic device 20 whether payment information is to be sent to the computer 50 or to a separate payment gateway.

The electronic device 20, upon receiving the authorization signal 252, can automatically send a payment signal 804 either to the computer 50 or to the separate payment gateway, depending on the payment template provided by the verification server 60, to provide payment and shipping information. FIG. 17 shows an example in which the payment signal 804 is sent to the computer 50. In certain embodiments, the electronic device 20 can also send a payment confirmation signal 814 (e.g., a valid/invalid flag or authentication information 254) to the verification server 60. In certain embodiments, the payment confirmation signal 814 comprises shipping information. The verification server 60, upon receiving the payment confirmation signal 814, can transmit a payment confirmation signal 808 with the payment confirmation and shipping information to the computer 50. The computer 50 can then display a receipt page (e.g., by sending a receipt signal 806 to the electronic device 30).

Example Invoice Payment Configurations with Reusable Identifiers

Various example configurations for payments of printed invoices are described below in accordance with certain embodiments. While each of these descriptions provides an example sequence of steps, these sequences of steps should not be interpreted as limiting, since two or more of the steps can be performed in other sequences relative to one another or can be performed concurrently with one another.

Figure 18:
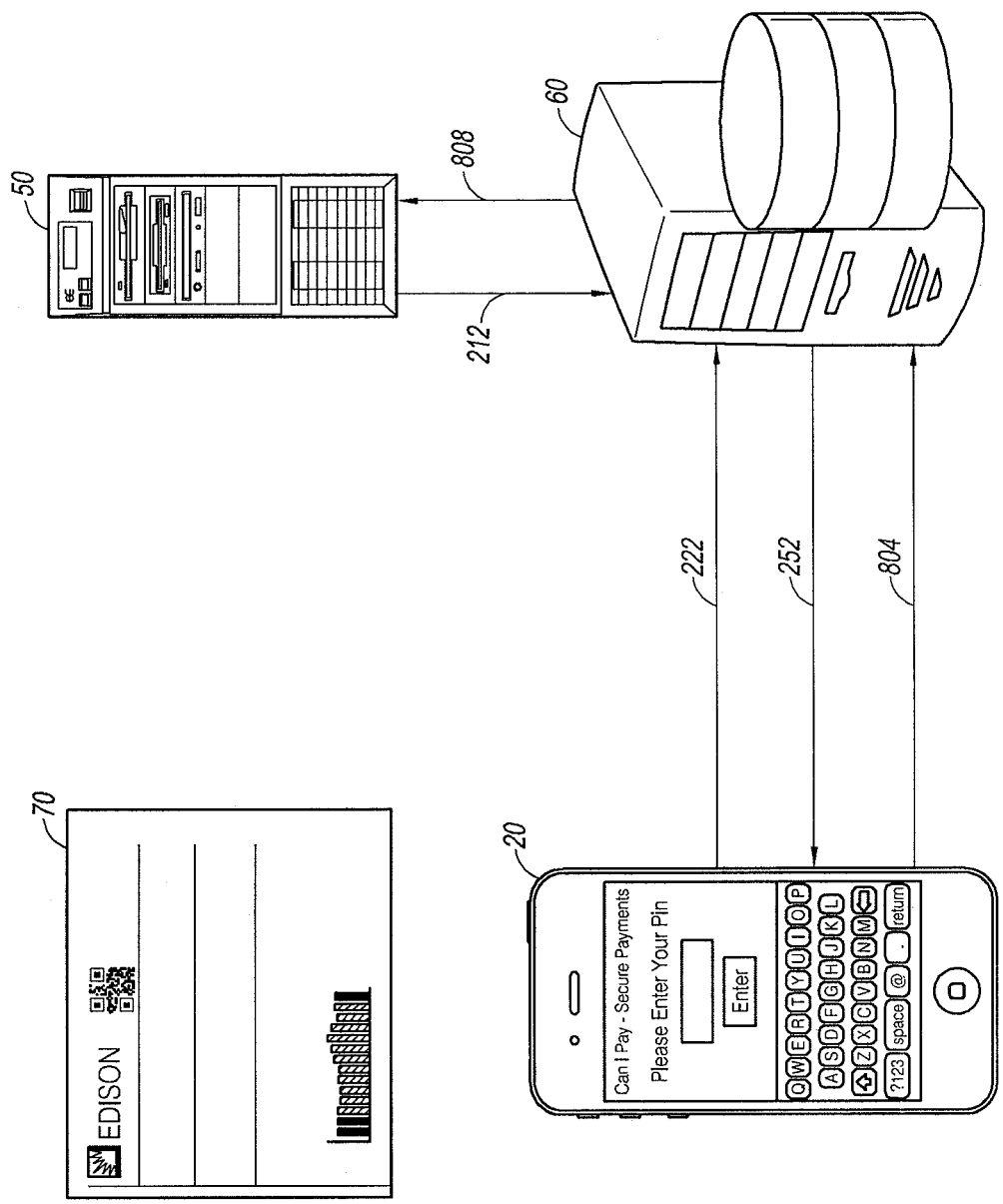
FIG. 18 schematically illustrates a sixth example configuration for providing a secured electronic payment capability in accordance with certain embodiments described herein.

FIG. 18 schematically illustrates a sixth example configuration for providing a secured electronic payment capability in accordance with certain embodiments described herein. Besides including the PIN functionality described above with regard to FIG. 14, the example configuration of FIG. 18 can provide processing and payment of printed bills, statements, and invoices.

A user can open a bill, statement, or invoice 70, with the intention of making a payment. For example, the invoice 70 can be printed out by the computer 50 and sent to the user. When preparing the invoice 70, the computer 50 can then select the next reusable identifier 214 (e.g., a TSSID which can be the next TSSID of a list of predetermined TSSIDs in a round robin queue) and the corresponding predetermined (e.g., premade) visual identifier (e.g., a QR code) in which the reusable identifier 214 is encoded. By printing the QR code onto the invoice 70 which is to be sent to the user, the computer 50 sends the reusable identifier 214 to the user in a form that can be scanned by the electronic device 20. In addition, the computer 50 can send a first signal 212 containing the reusable identifier 214 to the verification server 60, and which can indicate the potential beginning of a payment process. In certain embodiments, in addition to the first signal 212, the computer 50 also sends information regarding the company, price and other details to the verification server 60.

The payment process proceeds when the user uses the electronic device 20 to scan the visual identifier (e.g., QR code) printed on the invoice 70. Upon the user initiating a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, transaction identification, and information regarding the amount that is to be paid.

The electronic device 20, upon receiving the authorization signal 252, can automatically send a payment signal 804 (e.g., containing payment information, which can include shipping information and/or billing information) to the verification server 60 which process the payment for the ecommerce site. In certain embodiments, the electronic device 20 can also send an authorization signal (e.g., a valid/invalid flag or authentication information 254) to the verification server 60 as well. The verification server 60, upon receiving the payment signal 804, can send a payment confirmation signal 808 (e.g., flag) and the shipping information to the computer 50. In certain embodiments, the verification server 60 can also send the copy 224 to the computer 50 as well.

Figure 19:
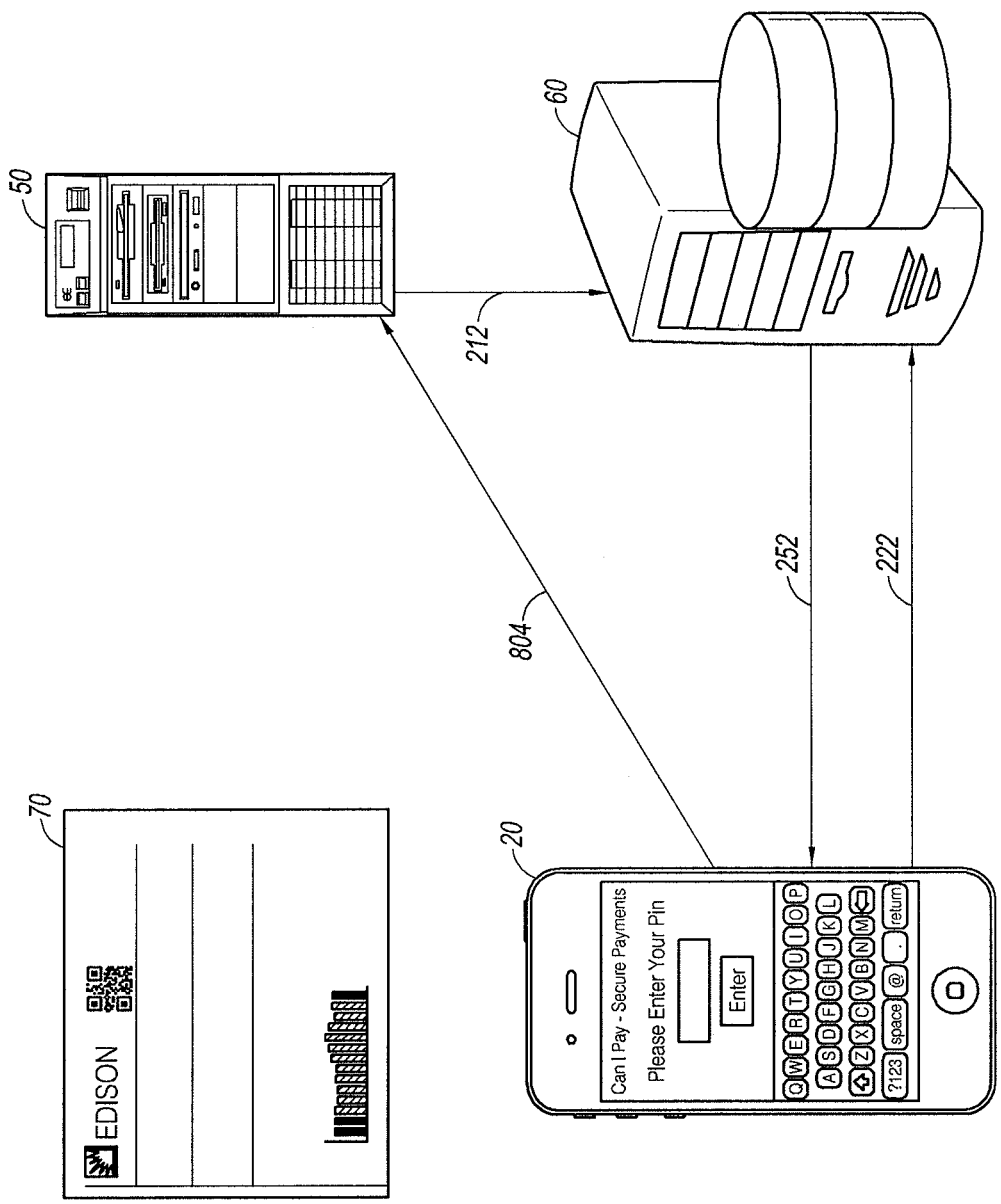
FIG. 19 schematically illustrates a seventh example configuration for providing a secured electronic payment capability in accordance with certain embodiments described herein.

FIG. 19 schematically illustrates a seventh example configuration for providing a secured electronic payment capability in accordance with certain embodiments described herein. Besides including the PIN functionality described above with regard to FIG. 14, the example configuration of FIG. 19 can provide processing and payment of printed bills with payment sent directly to the computer 50.

A user can open a bill, statement, or invoice 70, with the intention of making a payment. For example, the invoice 70 can be printed out by the computer 50 and sent to the user. When preparing the invoice 70, the computer 50 can then select the next reusable identifier 214 (e.g., a TSSID which can be the next TSSID of a list of predetermined TSSIDs in a round robin queue) and the corresponding predetermined (e.g., premade) visual identifier (e.g., a QR code) in which the reusable identifier 214 is encoded. By printing the QR code onto the invoice 70 which is to be sent to the user, the computer 50 sends the reusable identifier 214 to the user in a form that can be scanned by the electronic device 20. In addition, the computer 50 can send a first signal 212 containing the reusable identifier 214 to the verification server 60, and which can indicate the potential beginning of a payment process. In certain embodiments, in addition to the first signal 212, the computer 50 also sends information regarding the company, price and other details to the verification server 60.

The payment process proceeds when the user uses the electronic device 20 to scan the visual identifier (e.g., QR code) printed on the invoice 70. Upon the user initiating, a program running on the electronic device 20, the electronic device 20 can prompt the user to enter a PIN, which the electronic device 20 can verify (e.g., by checking it against a previously setup PIN). If the PIN is correct, the user can then use the electronic device 20 to scan the QR code (e.g., using the camera of the smartphone) and can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, transaction identification, and information regarding the amount that is to be paid.

The electronic device 20, upon receiving the authorization signal 252, can automatically send a payment signal 804 (e.g., containing payment information, which can include shipping information and/or billing information) to the computer 50 for processing the payment. In certain embodiments, the electronic device 20 can also send an authorization signal (e.g., a valid/invalid flag or authentication information 254) to the verification server 60 as well.

Figure 20:
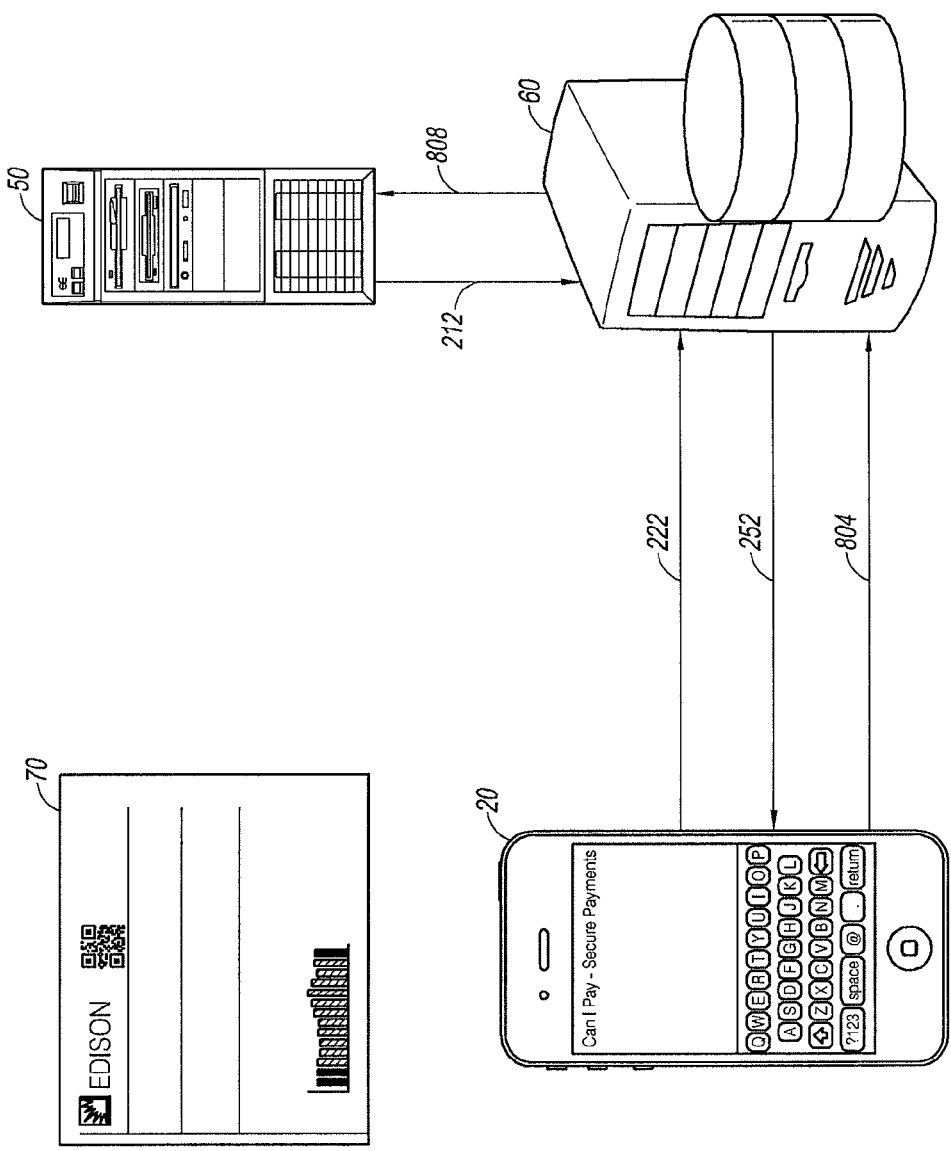
FIG. 20 schematically illustrates an eighth example configuration for providing a secured electronic payment capability in accordance with certain embodiments described herein.

FIG. 20 schematically illustrates an eighth example configuration for providing a secured electronic payment capability in accordance with certain embodiments described herein. The example configuration of FIG. 20 is similar to that of FIG. 18 in that it can provide processing and payment of printed bills, statements, and invoices, but it does not utilize the PIN code entry on the electronic device 20 by the user.

A user can open a bill, statement, or invoice 70, with the intention of making a payment. For example, the invoice 70 can be printed out by the computer 50 and sent to the user. When preparing the invoice 70, the computer 50 can then select the next reusable identifier 214 (e.g., a TSSID which can be the next TSSID of a list of predetermined TSSIDs in a round robin queue) and the corresponding predetermined (e.g., premade) visual identifier (e.g., a QR code) in which the reusable identifier 214 is encoded. By printing the QR code onto the invoice 70 which is to be sent to the user, the computer 50 sends the reusable identifier 214 to the user in a form that can be scanned by the electronic device 20. In addition, the computer 50 can send a first signal 212 containing the reusable identifier 214 to the verification server 60, and which can indicate the potential beginning of a payment process. In certain embodiments, in addition to the first signal 212, the computer 50 also sends information regarding the company, price and other details to the verification server 60.

The payment process proceeds when the user uses the electronic device 20 to scan the visual identifier (e.g., QR code) printed on the invoice 70. By using the electronic device 20 to scan the QR code (e.g., using the camera of the smartphone), the electronic device 20 can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 (e.g., authentication information 254, a valid/invalid flag, Boolean true/false, zero/IP address or url of computer 50) from the validation server 60 to the electronic device 20. In certain embodiments, the authorization signal 252 comprises at least one of company information, transaction identification, and information regarding the amount that is to be paid.

The electronic device 20, upon receiving the authorization signal 252, can automatically send a payment signal 804 (e.g., containing payment information, which can include shipping information and/or billing information) to the verification server 60 which process the payment for the ecommerce site. In certain embodiments, the electronic device 20 can also send an authorization signal (e.g., a valid/invalid flag or authentication information 254) to the verification server 60 as well. The verification server 60, upon receiving the payment signal 804, can send a payment confirmation signal 808 (e.g., flag) and the shipping information to the computer 50. In certain embodiments, the verification server 60 can also send the copy 224 to the computer 50 as well.

Figure 21:
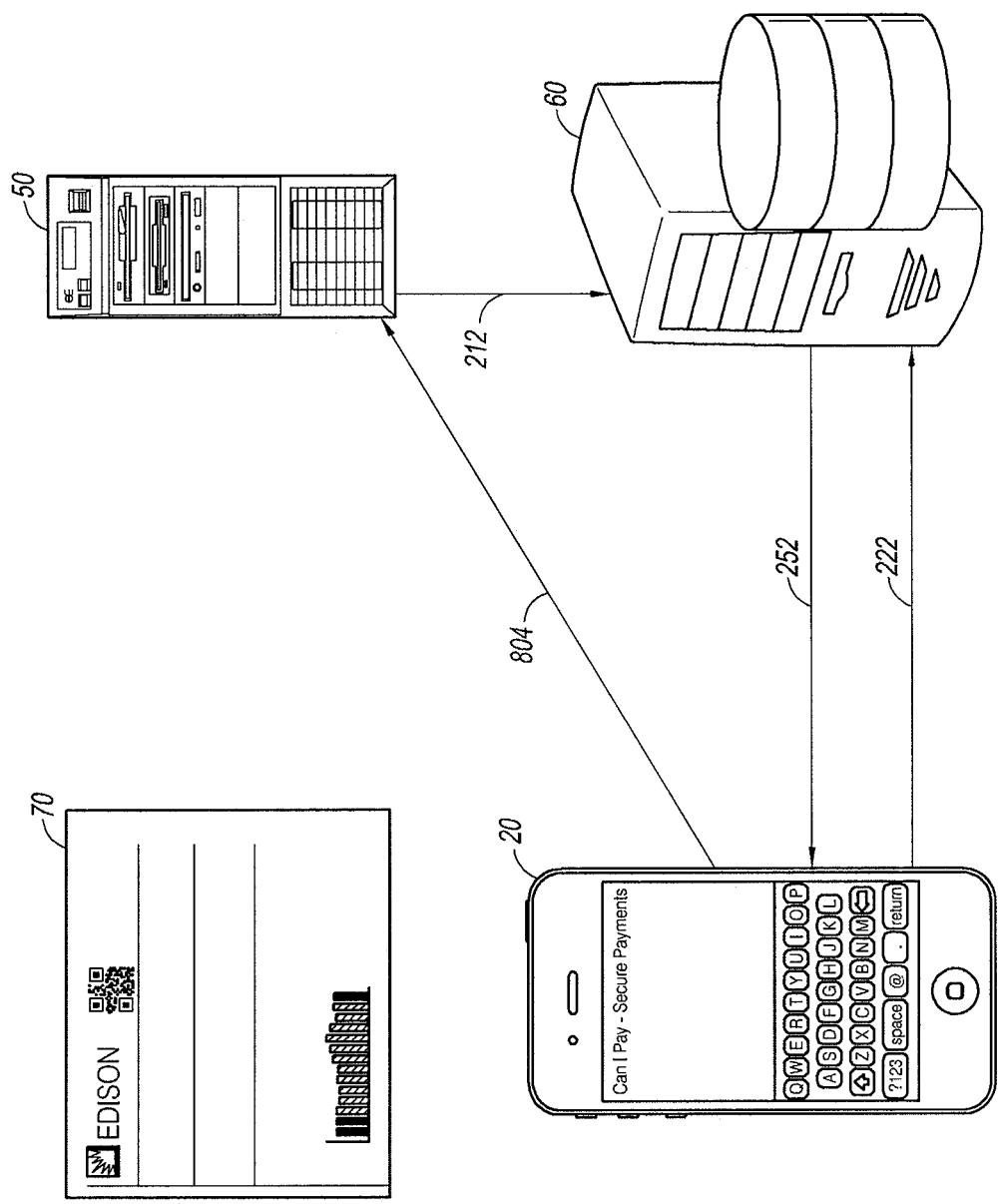
FIG. 21 schematically illustrates a nineth example configuration for providing a secured electronic payment capability in accordance with certain embodiments described herein.

FIG. 21 schematically illustrates a nineth example configuration for providing a secured electronic payment capability in accordance with certain embodiments described herein. The example configuration of FIG. 21 is similar to that of FIG. 19 in that it can provide processing and payment of printed bills, statements, and invoices with payment sent directly to the computer 50, but it does not utilize the PIN code entry on the electronic device 20 by the user.

A user can open a bill, statement, or invoice 70, with the intention of making a payment. For example, the invoice 70 can be printed out by the computer 50 and sent to the user. When preparing the invoice 70, the computer 50 can then select the next reusable identifier 214 (e.g., a TSSID which can be the next TSSID of a list of predetermined TSSIDs in a round robin queue) and the corresponding predetermined (e.g., premade) visual identifier (e.g., a QR code) in which the reusable identifier 214 is encoded. By printing the QR code onto the invoice 70 which is to be sent to the user, the computer 50 sends the reusable identifier 214 to the user in a form that can be scanned by the electronic device 20. In addition, the computer 50 can send a first signal 212 containing the reusable identifier 214 to the verification server 60, and which can indicate the potential beginning of a payment process. In certain embodiments, in addition to the first signal 212, the computer 50 also sends information regarding the company, price and other details to the verification server 60.

The payment process proceeds when the user uses the electronic device 20 to scan the visual identifier (e.g., QR code) printed on the invoice 70. By using the electronic device 20 to scan the QR code (e.g., using the camera of the smartphone), the electronic device 20 can extract the reusable identifier 214 (e.g., using the program or application running on the smartphone) to generate a copy 224 of the reusable identifier 214. The electronic device 20 can send a second signal 222 comprising the copy 224 and the user verification information 226 to the verification server 60. The verification server 60 can check the copy 224 and the user verification information 226 it receives from the electronic device 20 against its database (e.g., the first association 232 and the second association 234) to determine whether to authorize the user. For example, authorizing the user can comprise sending an authorization signal 252 e.g., authentication information 254, a valid/invalid flag, Boolean true/false, zero/IP address or url of computer 50) from the validation server 60 to the electronic device 20. In certain embodiments, the authorization signal 252 comprises at least one of company information, transaction identification, and information regarding the amount that is to be paid.

The electronic device 20, upon receiving the authorization signal 252, can automatically send a payment signal 804 (e.g., containing payment information, which can include shipping information and/or billing information) to the computer 50 for processing the payment. In certain embodiments, the electronic device 20 can also send an authorization signal (e.g., a valid/invalid flag or authentication information 254) to the verification server 60 as well.

By using reusable identifiers that do not include user specific or transaction specific information, certain embodiments described herein can advantageously provide a universal login or universal payment application that can work on every website and can provide an exceptional user experience. For example, one smartphone app can be used to log into every website a user wants to access and the user does not have to remember a multitude of passwords for these websites, with different password requirements. This can also save companies a significant amount of money, which would otherwise be spent on customer support services for lost and forgotten passwords. In addition, by utilizing the user verification information that is derived from user-specific or device-specific information, certain embodiments described herein provide a level of safety over a million times greater than systems that utilize just a login and password. Furthermore, in certain embodiments described herein, all the supporting websites will immediately work with the new PIN when a user changes the PIN on his smartphone, and the user does not need to notify any other website, as would be needed for systems that utilize passwords.

Other Example Configurations

Unlike certain embodiments described above in which a user accesses web pages using a second electronic device 30, in certain other embodiments described herein, the user 10 can access the internet (e.g., including web pages provided by the computer 50) using the first electronic device 20. Furthermore, unlike certain embodiments described above which utilize reusable identifiers, in certain other embodiments described herein, the identifiers may be "one-time-use," as described more fully below.

Figure 22:
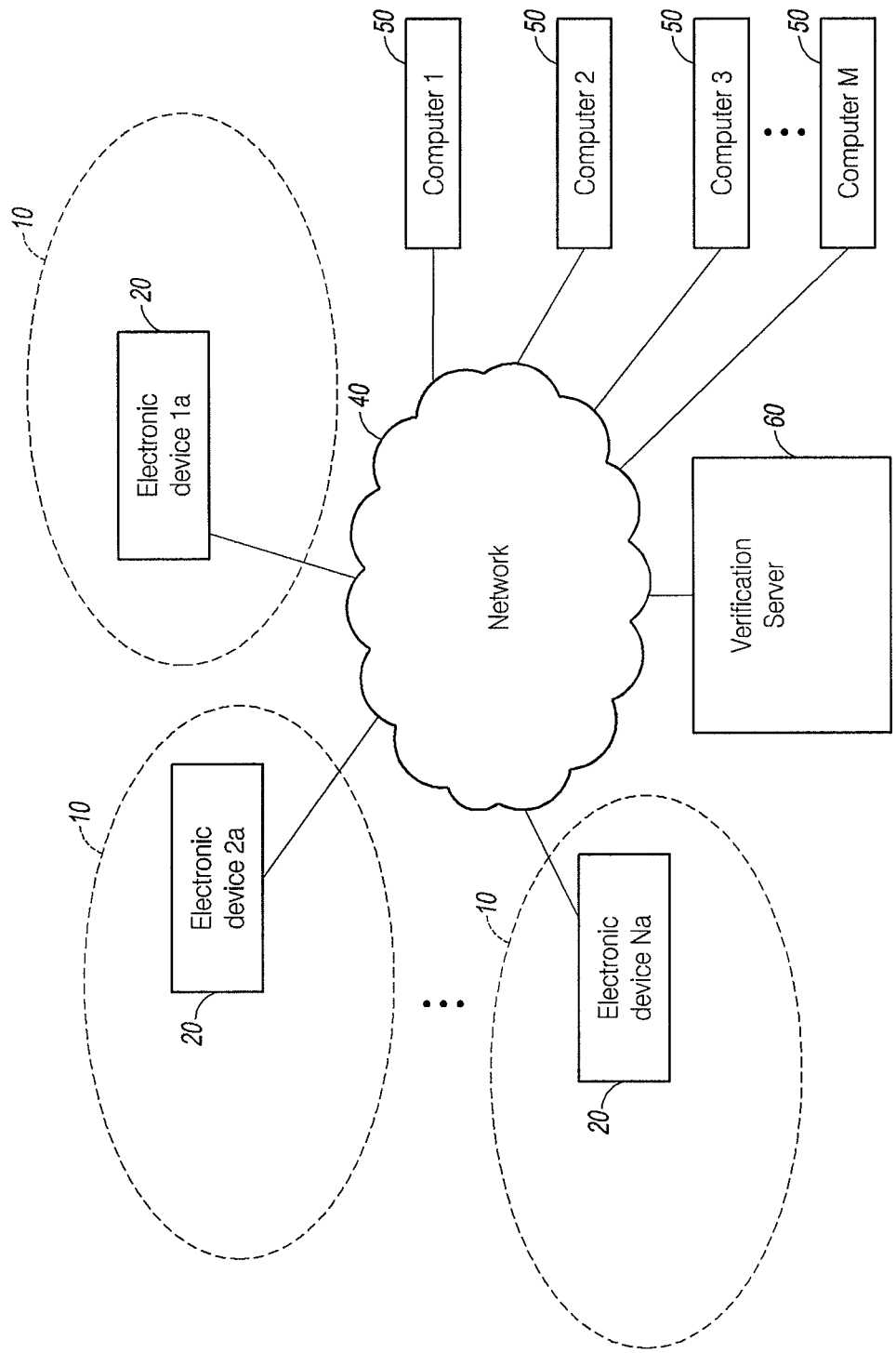
FIG. 22 schematically illustrates an example configuration in which certain embodiments described herein can be used.

FIG. 22 schematically illustrates an example configuration in which certain further embodiments described herein can be used. A plurality of users 10 (e.g., user 1, user 2, . . . , user N) are each utilizing an electronic device 20 (e.g., device 1, device 2, . . . , device N) operatively coupled to a network 40 (e.g., the internet). For example, the electronic device 20 can be a mobile device (e.g., mobile phone, smartphone, or tablet) that is running an application that accesses or visits websites hosted by one or more computers 50 (e.g., computer 1, computer 2, computer 3, . . . , computer M) via the network 40. The computers 50 (e.g., web servers) can each provide at least one secured capability (e.g., access to secured information, access to conduct a secure transaction) with which authorized users visiting the website are to conduct at least one interaction. In the example configuration of FIG. 22, the user 10 does not access web pages using a second electronic device 30. Instead, as discussed more fully below, the user 10 can access web pages using the first electronic device 20.

A verification server 60 (e.g., a computing device that can authorize a connection or a validation attempt) is also operatively coupled to the network 40 as is described more fully herein. While FIG. 22 shows an example configuration in which the verification server 60 is separate from the one or more computers 50 (e.g., as a specific server operatively coupled to the network), in other example configurations, the verification server 60 is integrated with one or more of the computers 50. In certain embodiments, two or more verification servers 60 may be used to increase scalability and performance. The functionality of the verification server 60 described herein can be parsed among two or more servers which communicate with one another. For example, the at least one verification server 60 can comprise at least one first server that is in communication with the computers 50, that manages the distribution of the identifiers to the computers 50, and that informs a computer 50 that a user has been authorized. The at least one first server (e.g., a "software-as-a-service" or "SaaS" server) thus interacts with the one or more computers 50 (e.g., one or more web servers). Such a SaaS server can provide implementation convenience by providing functionality (e.g., handling the pool of identifiers, selecting the next identifier for the next transaction) that might otherwise be handled by the computers 50. By placing this functionality in a common server rather than having the same functionality implemented by each of the computers 50, integration of the various embodiments described herein can be much easier to achieve and in a shorter amount of time. The at least one verification server 60 can further comprise at least one second server that is in communication with the at least one first server and with the electronic devices 20, that receives validation data from the electronic devices 20, and that performs the evaluation of whether the user is authorized to access the secured capability. In certain embodiments in which the at least one verification server 60 comprises two or more servers which communicate with one another, one server can be responsible for synchronizing information across the multiple servers by causing them to update and synchronize their data. While in this example, the at least one first server is considered to be part of the at least one verification server 60, it can operate as a proxy for the one or more computers 50 so the at least one first server can be considered to be part of the one or more computers 50.

An example verification server 60 compatible with certain embodiments described herein is shown schematically in FIG. 3B. As described above with regard to FIG. 3B; the computer system 200 (e.g., a verification server 60) can comprise a first input 210, a second input 220, a storage device 230, a processor 240, and an output 250. While the components of the verification server 60 are described above with regard to configurations in which reusable identifiers are to be used, one or more of these components can be configured to be used with "one-time-use" identifiers, or to provide further capabilities (e.g., to push identifiers to the electronic devices 20) so as to operate in accordance with the methods described more fully below. For example, the first input 210 can be configured to receive a plurality of first signals 212 from a plurality of computers 50. Each first signal 212 of the plurality of first signals 212 comprises a first identifier 214a (e.g., a reusable identifier or a "one-time-use" identifier, depending on the method to be performed by the computer system) corresponding to a secured capability of the plurality of secured capabilities. Similarly, the second input 220 can be configured to receive a plurality of second signals 222 from a plurality of electronic devices 20 being used by the users 10, with each second signal 222 of the plurality of second signals 222 comprises a second identifier 214b (e.g., a reusable identifier or a "one-time-use" identifier, depending on the method to be performed by the computer system) and user verification information 226. Each second identifier 214b can match a first identifier 214a or can be related to the first identifier 214a with a known and predetermined relationship. The storage device 230 can comprise a first association 232 of each secured capability of the plurality of secured capabilities with at least one corresponding identifier 214. The storage device 230 can further comprise a second association 234 of the user verification information 226 with corresponding verified users 10 authorized to access at least one secured capability of the plurality of secured capabilities. The processor 240 can be configured to evaluate, based at least on a first signal 212 received from a computer 50 of the plurality of computers 50 and a second signal 222 received from an electronic device 20 of the plurality of electronic devices 20, whether a user 10 of the electronic device 20 is authorized to conduct at least one interaction with a secured capability corresponding to the identifier 214. The output 250 can be configured to transmit a third signal 252 comprising authorization information 254 to at least one of the electronic device 20 and the computer 50 providing the secured capability corresponding to the identifier 214, if the user 10 of the electronic device 20 is authorized to conduct the at least one interaction with the secured capability corresponding to the identifier 214. In certain embodiments, the output 250 can be configured to push an identifier to the electronic device 20, as described more fully below.

The first input 210, the second input 220, and the output 250 can each be configured to be operationally coupled to the network 40 (e.g., the internet). In certain embodiments, two or more of the first input 210, the second input 220, and the output 250 can integrated together in a network portal, or can be distributed among one, two, or more network portals. The first input 210, the second input 220, and the output 250 are also configured to communicate with one or both of the storage device 230 and the processor 240 of the computer system 200.

Figure 23:
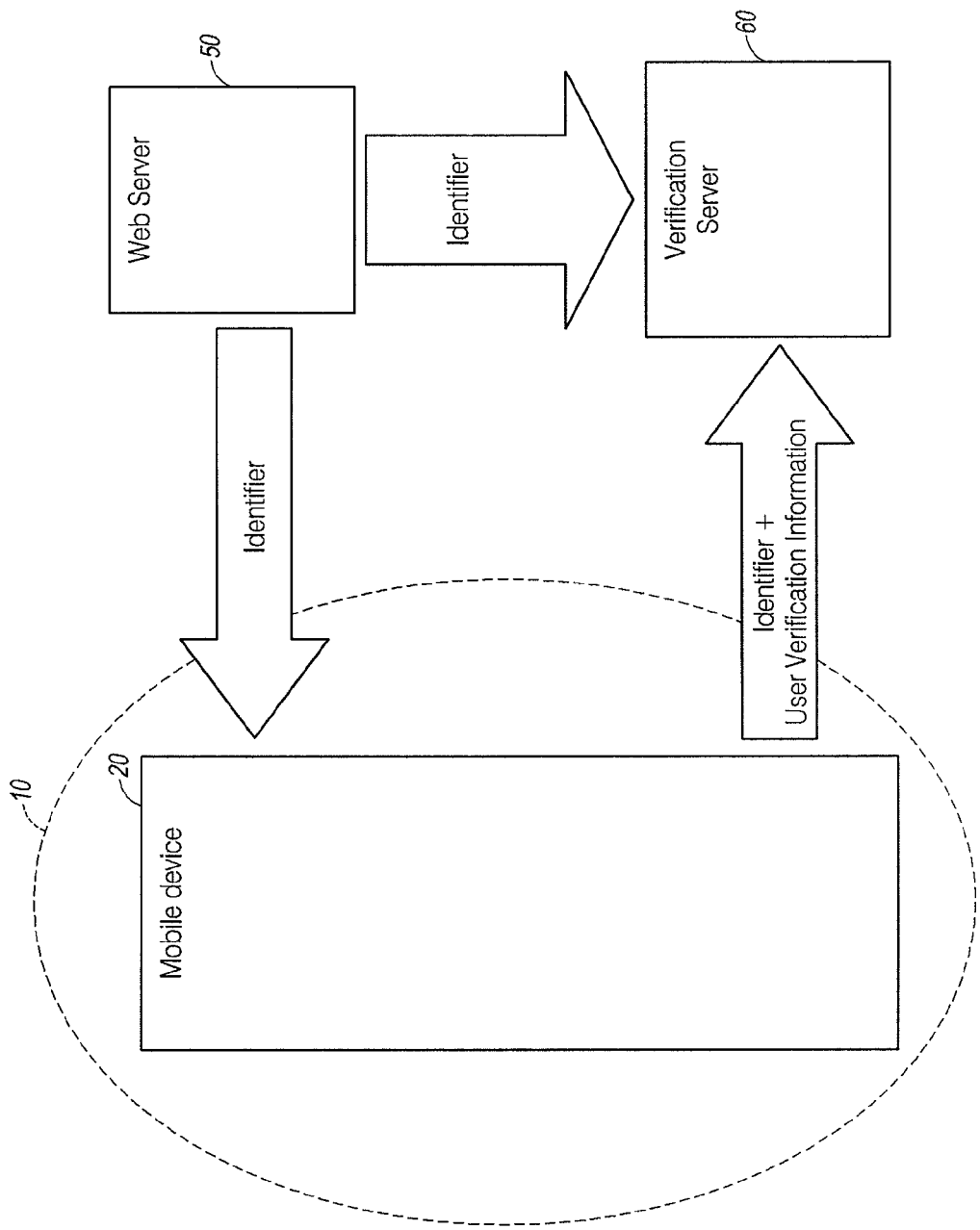
FIG. 23 schematically illustrates an example subset of the configuration of FIG. 22 showing an aspect of communication among components of the configuration in accordance with certain embodiments described herein.

FIG. 23 schematically illustrates an example subset of the configuration of FIG. 22 showing an aspect of communication among components of the configuration in accordance with certain embodiments described herein. In the example communication scheme of FIG. 23, the user 10 utilizes an electronic device 20 (e.g., a mobile device, a mobile phone, a smartphone, a tablet) in an authorization (e.g., authentication, verification) process. While the description herein includes numerous communication schemes, the example communication scheme of FIG. 23 can be helpful for understanding the general context in which certain embodiments described herein can be used. In the example configuration of FIG. 23, a user 10 can use the electronic device 20 (e.g., a mobile device with a user browser running a browser window) to view content provided by the computer 50 (e.g., web server) with the intention of conducting an interaction with a secured capability of the computer, such as entering into a secure environment or website (e.g., to access secure information or sensitive information) or making a payment as part of an ecommerce transaction. The computer 50 of the example configuration of FIG. 23 provides an identifier both to the electronic device 20 and to the verification server 60 (e.g., a computing device that can authorize an interaction) with the identifier serving as a start signal for the authentication process. For example, the computer 50 can provide a first identifier to the electronic device 20 and a second identifier to the verification server 60 (e.g., with the first identifier being provided by the computer 50 to the electronic device 20 before, after, or concurrently with the second identifier being provided by the computer 50 to the verification server 60). Both the first identifier and the second identifier correspond to the secured capability (e.g., the second identifier can be the same as the first identifier or can be related to the first identifier with a known and predetermined relationship).

In certain embodiments, the verification server 60 is configured to remotely disable the ability to use the electronic device 20 in an authorization process. For example, a separate website or push message may be used to communicate to the verification server 60 that the security of the electronic device 20 has been compromised (e.g., the electronic device 20 has been stolen), so communications with the electronic device 20 should no longer be used. In certain embodiments, information or data relevant to the authorization process can be remotely deleted from the electronic device 20 (e.g., via a push message) in the event that the security of the electronic device 20 has been compromised.

In certain embodiments, the secured capability can comprise a structure (e.g., a locked door, fence, gate, elevator) that is operatively coupled to the computer 50 and that is configured to selectively inhibit physical access to a region (e.g., interior of a safe, building, house, vehicle, automobile, snack dispensing machine) or operation of a machine (e.g., automobile, elevator) to only authorized users, and the at least one interaction can comprise access to the restricted region (e.g., opening a lock thereby allowing entry to or exit from the restricted region) or turning the machine on or off. In certain embodiments, the secured capability can comprise a security module that is run by or operatively coupled to the computer 50 and that is configured to selectively restrict access to a memory region (e.g., a database, a secured internet portal) to only authorized users, and the at least one interaction can comprise access to the restricted memory region (e.g., retrieval of information from the secured internet portal, writing to or reading from the restricted memory region). In certain embodiments, the secured capability can comprise an electronic payment module that is run by or operatively coupled to the computer 50 and that is configured to selectively restrict access to an electronic payment as part of an ecommerce transaction (e.g., purchase) with the user that initiated the transaction, and the at least one interaction can comprise a transfer of funds (e.g., from the user to a merchant) to conduct the ecommerce transaction.

In certain embodiments, the identifier corresponds to a particular secured capability and serves as a "transaction start indicator" or "TSSID" that denotes the beginning of a process. The identifier may include data, such as information about the company providing the secured capability, the particular secured capability that corresponds to the TSSID, or both. For example, the identifier can include a short sequence of numbers, letters, or characters that identifies the company providing the secured capability, the secured capability, or both. In certain embodiments having two or more verification servers 60, the identifier can comprise information identifying which of the verification servers 60 is to be used. The verification server 60 can use this information to direct the incoming signals to the appropriate verification server 60. In certain embodiments, the identifier does not contain information about the company providing the secured capability. In certain embodiments, the identifier includes only numbers, not alphabetic characters. In certain embodiments, the identifier does not comprise data that is to be kept confidential, so the data of the identifier may or may not be encrypted.

In certain embodiments, the identifier can be reusable while in certain other embodiments, the identifier is not reusable (e.g., the identifier is "one-time-use"). In certain embodiments, the identifier (e.g., a reusable TSSID, a "one-time-use" TSSID) signals the beginning of a transaction. The identifier may or may not contain user-specific or transaction-specific information and may or may not be reused for multiple users and multiple transactions. While certain embodiments described above use the reusable identifier in conjunction with two electronic devices being used by the user (e.g., a mobile electronic device and a desktop), the identifier used in certain embodiments described herein are used in conjunction with a single electronic device 20 that both displays the webpage presenting the secured capability and is running the app that performs the authentication.

In certain embodiments, the electronic device 20 comprises a device, such as a mobile phone, a smartphone, or a tablet, capable of communicating with the verification server 60 via a network or the internet. In certain embodiments, the electronic device 20 comprises a display device capable of presenting a link (e.g., a specially-formatted URL or other graphical image or alphanumeric "link") to the user. In certain such embodiments, the display device is running a user browser connected to the computer 50 via the internet. In certain embodiments, the computer 50 comprises a processor running a web server and driving the display device (e.g., by transmitting HTML information to the browser of the display device). In certain embodiments, the verification server 60 comprises a processor configured to authorize a connection or a validation attempt by the user 10. For example, verification server 60 can be integrated with or separated from the computer 50. In certain embodiments described herein, the verification server 60 comprises one or more specific servers sitting on the internet and containing user verification information. In certain embodiments described herein, the electronic device 20 comprises a mobile phone, a mobile smartphone, or a tablet configured to communicate the identifier, along with user verification information, to the verification server 60 via the network 40 (e.g., the internet).

Using a Specially-Formatted URL

Certain embodiments described herein use a link (e.g., a specially-formatted URL, or other graphical image or alphanumeric "link") in a manner that provides one or more advantages over previously-existing systems and methods. For example, certain embodiments described herein can clear up one of the biggest mobile purchase bottlenecks in the marketplace. A product can be purchased by shopping on a smartphone upon finding the product on the internet. Rather than entering the credit card and address information at that time, which can be a major pain using the tiny keyboards of such devices, certain embodiments described herein allow purchasing online without typing, thereby eliminating the foremost problem stopping people from buying more using their phones. For example, by pressing a button on a mobile shopping site, shoppers can purchase in seconds, e.g., with one click, after entering their PIN to pay through their phones. Certain embodiments described herein also include the capability of performing anonymous secured or verified login or anonymous payments where confidential purchases remain confidential. In addition, certain embodiments described herein can make access to secured information portals or other secured capabilities easier by authenticating a user for access to the secured information portal without excessive typing (e.g., by pressing one button).

In certain embodiments, the electronic device 20 can be configured to display a page (e.g., a shopping cart, access page) containing a link (e.g., specially-formatted URL in the form of a user-selectable button, or other graphical image or alphanumeric "link") that, upon being selected by the user, launches a computer program application or "app" on the electronic device 20. For example, both Android and iPhone mobile devices have the capability to invoke an app when a specially-formatted URL (e.g., a "Custom URI Scheme") is clicked on the phone's browser, and this specially-formatted URL can be configured to invoke or launch the app described herein. Where certain embodiments described above present examples of a system and method in which reusable identifiers are scanned (e.g., in the form of QR codes), certain other embodiments described herein avoid using the QR code scanning process since by virtue of the link (e.g., the specially-formatted URL or other graphical image or alphanumeric "link"), the electronic device 20 already has the identifier (e.g., received from the computer 50). In certain embodiments, the information received from the computer 50 to the electronic device 20 includes the identifier and at least one of information regarding the computer 50 providing the secured capability (e.g., the website URL or further authentication criteria) for accessing the secured capability, information regarding the user's registration, and payment request information (e.g., payment amount, whether the payment is a one-time payment or a recurring or installment payment) for ecommerce transactions.

In certain embodiments, the app causes the electronic device 20 to transmit user verification information and the first identifier to the verification server 60. In certain embodiments, the app causes the electronic device 20 to transmit user verification information and an identifier related to the first identifier with a known and predetermined relationship to the verification server 60. In response at least to one or both of the second identifier received from the computer 50 and the identifier received from the electronic device 20, and the user verification information received from the electronic device 20, the verification server 60 determines whether the user 10 is authorized to conduct the interaction with the secured capability. If the user is authorized, the verification server 60 can send an authorization signal to at least one of the electronic device 20 and the computer 50, and the computer 50 can then provide the access to the user 10.

Figure 24A:
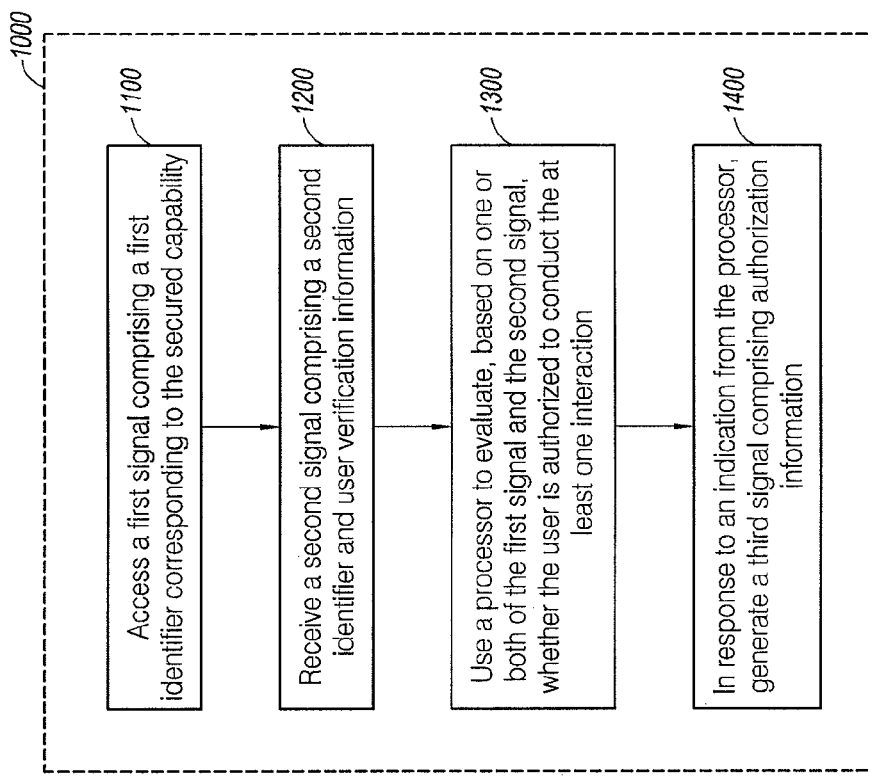
FIG. 24A is a flow diagram of an example method of authenticating a user seeking to conduct at least one interaction with a secured capability provided by a computer, in accordance with certain embodiments described herein.

FIG. 24A is a flow diagram of an example method 1000 of authenticating a user 10 seeking to conduct at least one interaction with a secured capability provided by a computer 50, in accordance with certain embodiments described herein. The example method 1000 is described herein with regard to the aspects of an authorization process that are performed by a computer system 200 (e.g., one or more verification servers 60). Other aspects of an authorization process are performed by a computer providing the secured capability (e.g., a computer 50) and the electronic device 20, as described herein. While the method 1000 is discussed herein in terms of elements (e.g., signals, identifiers) labeled by ordinal adjectives (e.g., first, second, etc.), use of the ordinal adjective are used merely as labels to distinguish one element from another (e.g., one signal from another or one identifier from another) within the method 1000, and the ordinal adjective is not used to denote an order of these elements or of their use and may be different from the ordinal adjective used to label the element in another method.

In an operational block 1100, the method 1000 comprises accessing a first signal 212 from the computer 50 providing the secured capability. The first signal 212 comprises a first identifier 214a corresponding to the secured capability. In an operational block 1200, the method 1000 further comprises receiving a second signal 222 from an electronic device 20 being used by the user 10. The second signal 222 comprises a second identifier 214b corresponding to the secured capability (e.g., which matches the first identifier 214a of the first signal 212 or which is related to the first identifier 214a with a known and predetermined relationship) and user verification information 226. In an operational block 1300, the method 100 further comprises using a processor 240 to evaluate, based at least on the first signal 212 and the second signal 222, whether the user 10 is authorized to conduct the at least one interaction with the secured capability. In an operational block 1400, the method 1000 further comprises, in response to an indication from the processor 240 that the user 10 is authorized to conduct the at least one interaction with the secured capability, generating a third signal 252 comprising authorization information 254 (e.g., the verification sever 60 generating the third signal 252). In certain embodiments, the method further comprises providing the third signal to at least one of the electronic device 20 and the computer 50.

An example computer system 200 (e.g., a verification server 60) in accordance with certain embodiments described herein for performing the method 1000 is shown schematically in FIG. 3B. While the method 1000 is described herein by referencing the structural components shown in FIG. 3B, the method 1000 may be performed by other structural components. In the discussion herein, the identifier 214 can be embodied in different expressions, each of which corresponds to the secured capability. For example, the identifier 214 can be embodied by a first identifier 214a, a second identifier 214b, or other identifiers that are related to one another by known and predetermined relationships.

In certain embodiments (e.g., in which the computer 50 stores a pool of identifiers to select from), the computer 50 provides (e.g., transmits) the first signal 212 to the verification server 60, and the verification server 60 accesses (e.g., receives) the first signal 212 from the computer 50 in the operational block 1100. The first signal 212 comprises the first identifier 214a and can be interpreted by the verification server 60 as the initiation of an authentication process. In certain embodiments, in addition to the first signal 212, the computer 50 can also send information regarding the company, price, and shopping cart details to the verification server 60. The computer 50 can also provide an identifier corresponding to the secured capability to the electronic device 20. As described above, a SaaS server (e.g., which can be considered to be part of the plurality of computers 50) can store the pool of identifiers and can select an identifier for each transaction, which can allow a larger pool of identifiers to be more efficiently maintained. In certain such embodiments, the computer 50 requests an identifier from the SaaS server with the identifier to correspond to (e.g., assigned to be used by) the secured capability of the computer 50. In turn, the SaaS server accesses an identifier from the pool of identifiers and provides the identifier to the computer 50. Thus if the SaaS server is considered part of the plurality of computers, the computers 50 provide a signal comprising an identifier to the verification server 60 which then accesses the signal.

In certain other embodiments (e.g., in which the verification server 60 stores the pool of identifiers), the selection of an identifier can be performed by the verification server 60. As described above, a SaaS server (e.g., which can be considered to be part of the at least one verification server 60) can store the pool of identifiers and can select an identifier for each transaction, which can allow a larger pool of identifiers to be more efficiently maintained. In certain such embodiments, the computer 50 communicates a request to the SaaS server for a first identifier, with the first identifier to correspond to (e.g., assigned to be used by) the secured capability of the computer 50. In turn, the SaaS server accesses a first signal comprising the first identifier from the pool of identifiers and provides the first identifier to the computer 50. Thus, if the SaaS server is considered part of the at least one verification server 60, in response to the request from the computer 50, the verification server 60 accesses a first signal comprising an identifier corresponding to (e.g., assigned to be used by) the secured capability, and provides the identifier to the computer 50. As described herein, in certain embodiments, the identifier is assigned to be used by the secured capability for a finite period of time.

The electronic device 20 transmits the second signal 222 to the verification server 60, which receives the second signal 222 from the electronic device 20 in the operational block 1200. The second signal 222 comprises the second identifier 214b and the user verification information 226. For example, the electronic device 20 can receive the second identifier 214b from the computer 50 and the computer 50 can provide a link (e.g., a specially-formatted URL, or other graphical image or alphanumeric "link") to the electronic device 20. Upon being selected (e.g., clicked on) by the user, the link invokes (e.g., launches) an app on the electronic device 20 which transmits the second signal 222 to the verification server 60. This transmission of the second signal 222 to the verification server 60 can be concurrent or non-concurrent (e.g., before or after) with the transmission of the first signal 212 to the verification server 60.

The user verification information 226 can be stored on, or can be otherwise accessible by, the electronic device 20. In certain embodiments, the user verification information 226 comprises information that can be used to verify and authenticate the user (e.g., a verifiable "fingerprint" of the user and mobile device). For example, the user verification information 226 can comprise information regarding (e.g., specific to) the user (e.g., the user's first name, family name, email address, phone number), information regarding (e.g., specific to) the electronic device 20 (e.g., a device identification character string, hardware-specific information such as manufacturer or operating system of the electronic device 20), or both. In certain embodiments, the user verification information 226 can comprise information derivable from user-specific information (e.g., predetermined portions of the user-specific information that would not themselves contain private information) or information derivable from device-specific information (e.g., predetermined portions of the device-specific information that would not themselves contain private information). The user verification information 226 may or may not be encrypted.

The user verification information 226 corresponding to users that are authorized to access at least one secured capability can be stored in the storage device 230 in the second association 234 (e.g., in a database or look-up table) that keeps track of both the user verification information 226 and the authorized user which it denotes. In certain embodiments, the user verification information 226 is not made available to the computer 50. In certain embodiments, the second association 234 also includes information regarding which secured capabilities each of the users denoted by user verification information 226 is authorized to access. Use of such user verification information 226 (e.g., user-specific information, device-related information, or both) can provide a desired level of security to ensure that the user 10 attempting to access the secured capability is an authorized user.

After having received the first signal 212 and the second signal 222, the verification server 60 can evaluate (e.g., using the processor 240), based at least on the first signal 212 and the second signal 222, whether the user 10 is authorized to conduct the at least one interaction with the secured capability in the operational block 1300. For example, the verification server 60 can correlate the first signal 212 with the corresponding second signal 222 by comparing the first identifier 214a from the first signal 212 and the second identifier 214b from the second signal 222. For a correlated first signal 212 and second signal 222, the identifiers 214a, 214b will both correspond to the same secured capability (e.g., will correspond in a predetermined manner with one another or will match one another). The verification server 60 can also utilize the identifier 214 with the first association 232 of each secured capability with at least one corresponding identifier 214 to identify the secured capability that the user 10 is attempting to access. For example, using the received identifier 214 (e.g., one or both of the first identifier 214a and the second identifier 214b), the validation server 60 can access the first association 232 to determine (e.g., look up) which secured capability (or computer 50, or both) corresponds to the received identifier 214. The verification server 60 can also utilize the user verification information 226 and the second association 234 of the user verification information 226 with corresponding verified users 10 to evaluate, based at least on the user verification information 226, whether the user 10 of the electronic device 20 is one of the verified users of the secured capability. For example, using the user verification information 226, the verification server 60 can access the second association 234 to determine (e.g., look up) which user corresponds to the user verification information 226. If the user verification information 226 received from the electronic device 20 does not match any of the entries of the second association 234, then the user is deemed to not be one of the verified users of the secured capability. Also, in certain embodiments in which the second association 234 also includes information regarding which secured capabilities the user denoted by the user verification information 226 is authorized to access, the verification server 60 can use the second association 234; the user verification information 226, and the identifier 214 to determine (e.g., look up) whether the user is authorized to access the particular secured capability that the user is seeking to access.

In certain embodiments, the verification server 60 also checks whether the electronic device 20 (e.g., mobile device, mobile phone, smartphone, tablet) is deactivated. For example, upon receipt of a notification (e.g., from the user or from a third party authorized to provide such notifications), the verification server 60 can either mark the user's electronic device 20 as deactivated or place the user's electronic device 20 on a stored list of deactivated electronic devices 20 that have been deactivated from use by the verification server 60. Such notifications can be provided to the verification server 60 upon discovery that the user's electronic device 20 is lost or stolen. Deactivated electronic devices 20 (e.g., those on the stored list of deactivated devices) would not be authorized by the verification server 60. Certain such embodiments can provide a way for a user to deactivate a lost or stolen electronic device 20 and to stop access by people other than the user.

In certain embodiments in which the identifier 214 is only valid for a finite and predetermined period of time, the validation server 60 can determine a first time of receipt of the first signal 212 and a second time of receipt of the second signal 222, and can compare the time differential between the first time and the second time. If the time differential is less than or equal to the finite and predetermined period of time for the identifier 214, the validation server 60 can evaluate that the user 10 is authorized to conduct the at least one interaction with the secured capability corresponding to the identifier 214. If the time differential is greater than the finite and predetermined period of time for the identifier 214, the validation server 60 can evaluate that the user 10 is not authorized to access the secured capability. In certain other embodiments in which the identifier 214 is only valid for a finite and predetermined period of time, after the period of time has elapsed, the verification server 60 deletes the record corresponding to the identifier 214. Certain such embodiments avoid performing any timestamp comparison. In certain other embodiments, the computer 50 can request from the verification server 60 to renew the identifier 214 for another finite and predetermined period of time, before such period of time has elapsed.

The authorization information can comprise a flag indicating that the user 10 is authorized to conduct the at least one interaction with the secured capability, can comprise additional information regarding the conditions of the user 10 accessing the secured capability (e.g., number of interactions that are authorized, the type of interactions that are authorized), or both. For example, in certain embodiments, the authorization information sent to the computer 50 in the third signal 252 can comprise an identifier that is unique to the user 10. The computer 50 can use this identifier to identify the user 10. For example, for a login to a secured account, the computer 50 can use this identifier to select which user's account to present to the browser running on the electronic device 30.

In certain embodiments in which the secured capability is a purchase of an ecommerce transaction and the third signal 252 comprising the authorization information is transmitted to the electronic device 20, the first signal 212 from the computer 50 can further comprise invoice information corresponding to the purchase, and the third signal 252 can also comprise the invoice information. In certain other embodiments, the invoice information is sent to the electronic device 20 from a second output of the validation server 60.

The electronic device 20 can respond to the third signal 252 by transmitting payment information to at least one of the computer 50, the validation server 60, or a payment processing gateway. For example, the payment information can comprise a confirmation (e.g., in a fourth signal) that a payment by the user 10 was made, and the output can be configured to transmit the confirmation to the computer 50. In certain embodiments, the payment information further comprises shipping information and/or billing information. For example, the electronic device 20 can transmit to the computer 50 shipping information for delivery corresponding to the purchase. In other embodiments, the payment information, with or without shipping information and/or billing information, is transmitted to the validation server 60 (e.g., by signal 804), and in turn is transmitted to the computer 50 by the validation server 60 (e.g., by signal 808).

In certain embodiments, the user has previously entered one or more sets of payment information (e.g., shipping information, billing information, or both) into the first electronic device 20 and the transmitted payment information comprises a selected set of the previously-entered one or more sets of payment information. For example, the electronic device 20 can contain information regarding multiple payment options (e.g., credit card accounts, debit card accounts, checking accounts, or other ACH/electronic payment options) available to the user. The user can enter the one or more sets of payment information into electronic device 20 as part of the setup procedure of the app configuration or as part of an update of information available to the app. During or prior to conducting a transaction, the user can be provided the opportunity to identify which of these payment options is to be used for the present transaction (e.g., to change the payment option or to allow a default payment option to be used), and the information regarding the selected payment option can be transmitted by the electronic device 20 in response to the third signal 252. In certain such embodiments, payment can be confirmed on the electronic device 20 before the payment information is transmitted. For example, the confirmation of the payment can be done by the selection of the payment option to be used.

In certain embodiments, the payment or login information comprises one or more of the following: user information (e.g., one or more of the user's name, mailing address, email address, phone number), means of payment information (e.g., one or more credit card, debit card, checking or savings account information, or other payment account information), which can be stored on the electronic device 20 or can be stored and accessible elsewhere on the internet (e.g., "in the cloud"), shipping information (e.g., one or more user information data records indicating the address to be used for shipping; the shipping information field can be empty where there is no need for a physical product shipment, and one shipping information can be shared among one or more payment information fields), billing information (e.g., one or more user information data records indicating the address to be used for billing; the billing information field can be empty where there is no need for billing, and one billing information can be shared among one or more payment information fields), userID (e.g., a registered combination of alphanumeric, special characters, or both that may be optionally followed by a password input, as a separate input field, composed of alphanumeric, special characters, or both), and authorized Login URL (e.g., a special url, composed of a site login url and an authorized user identification).

In certain embodiments, the electronic device 20 can respond to the third signal 252 by transmitting payment information to a payment gateway (e.g., a computer system with a processor configured to receive such payment information and to facilitate the transfer of funds) via the internet or a network. Certain such embodiments in which the electronic device 20 transmits payment information to the payment gateway can advantageously reduce credit card theft or fraud, can significantly increase user security, can make compliance with Payment Card Industry (PCI) data security standards easier and less costly, and/or to make anonymous payments in which the user's name or credit card information are not provided to the merchant of the goods or services being purchased. Certain embodiments described herein also include the capability of performing anonymous secured or verified login.

In certain embodiments, the payment information available to be selected by the user and transmitted by the electronic device 20 (e.g., credit or debit account information, bank account information) can be stored on the electronic device 20 while in certain other embodiments, the payment information can be stored in the "cloud" in a manner that is accessible to the electronic device 20. By storing the payment information on the electronic device 20 and not the cloud, the financial incentive for hackers to break into a data storage can be removed since the relatively small amount of information (e.g., just a few credit card numbers) stored on the electronic device 20 would not be worth the time, effort, and cost of breaking into an individual electronic device 20.

In certain embodiments, the computer system can be configured to provide the option of charging different amounts (e.g., to the user or to the entity running the computer 50) for the different available payment options. For example, it may be cheaper for the computer 50 to process ACH payments, so a lower price may be offered to the user for using an ACH payment option. In certain other embodiments, the computer system can be configured to only allow one or more payment options to be used with a particular computer 50. For example, a computer 50 may only be able to process ACH payments, to the computer system may only allow the user to select that payment option when transacting with the computer 50. In certain embodiments, the information regarding available payment options and their corresponding payment amounts can be provided by the computer 50 to at least one of the processor of the verification server 60 and the user (e.g., via the electronic device 20).

Figure 24B:
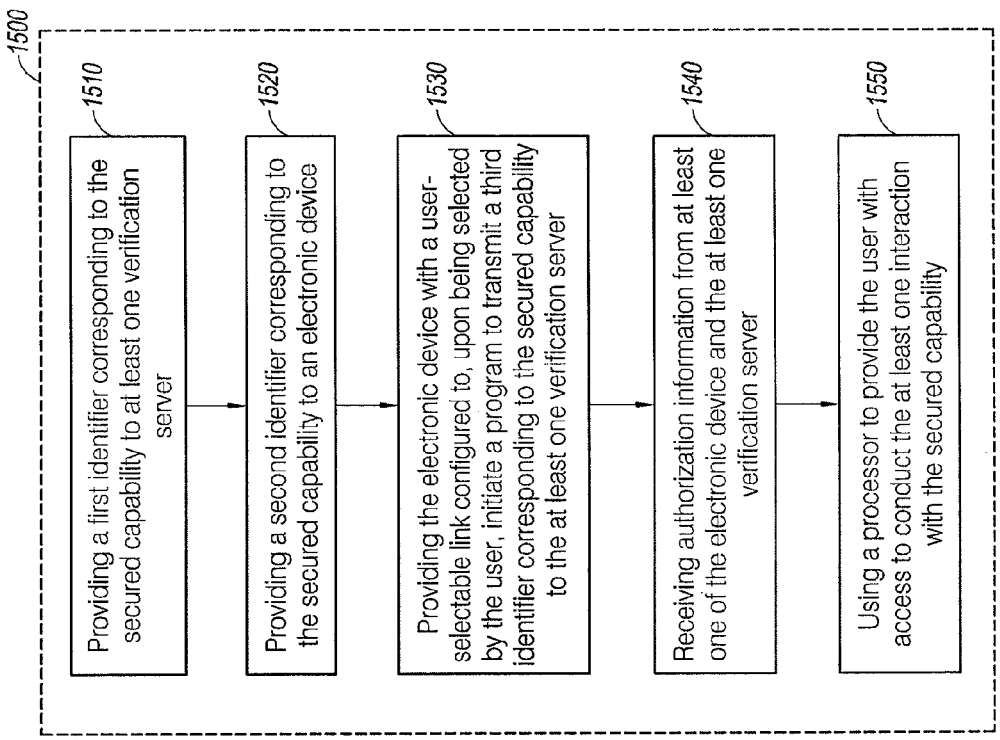
FIG. 24B is a flow diagram of an example method of authenticating a user seeking to conduct at least one interaction with a secured capability provided by a computer, in accordance with certain embodiments described herein.

FIG. 24B is a flow diagram of an example method 1500 of authenticating a user 10 seeking to conduct at least one interaction with a secured capability provided by a computer 50, in accordance with certain embodiments described herein. The example method 1500 is described herein with regard to the aspects of an authorization process that are performed by the computer 50. While the method 1500 is discussed herein in terms of elements (e.g., signals, identifiers) labeled by ordinal adjectives (e.g., first, second, etc.), use of the ordinal adjective are used merely as labels to distinguish one element from another (e.g., one signal from another or one identifier from another) within the method 1000, and the ordinal adjective is not used to denote an order of these elements or of their use and may be different from the ordinal adjective used to label the element in another method.

In an operational block 1510, the method 1500 comprises providing a first identifier to at least one verification server 60 (e.g., a verification server of a plurality of verification servers). The first identifier corresponds to the secured capability. In an operational block 1520, the method 1500 further comprises providing a second identifier to an electronic device 20 being used by the user 10. The second identifier corresponds to the secured capability (e.g., matches the first identifier or is related to the first identifier with a known and predetermined relationship). In an operational block 1530, the method 1500 further comprises providing the electronic device 20 with a user-selectable link, configured to, upon being selected by the user 10, initiate a program to run on the electronic device 20. The program is configured to transmit a third identifier to the at least one verification server 60. The third identifier corresponds to the secured capability (e.g., matches one or both of the first identifier and the second identifier or is related to one or both of the first identifier and the second identifier with a known and predetermined relationship). In an operational block 1540, the method 1500 further comprises receiving authorization information from at least one of the electronic device 20 and the at least one verification server 60. In an operational block 1550, the method 1500 further comprises using a processor (e.g., a processor of the computer 50) to provide the user 10 with access to conduct the at least one interaction with the secured capability in response at least to the authorization information.

Example Ecommerce Payment Configurations

An example configuration for ecommerce payments is described below in accordance with certain embodiments. While this description provides an example sequence of steps, this sequence of steps should not be interpreted as limiting, since two or more of the steps can be performed in other sequences relative to one another or can be performed concurrently with one another. In addition, while this example addresses an ecommerce payment context, certain embodiments described herein can be used in conjunction with other secured capabilities, such as secured infatuation portals and secured structures (e.g., a locked door, fence, gate, elevator) that are operatively coupled to the computer 50 and that are configured to selectively inhibit physical access to a region (e.g., interior of a safe, building, house, vehicle, automobile, snack dispensing machine) or operation of a machine (e.g., automobile, elevator) to only authorized users.

Figure 25:
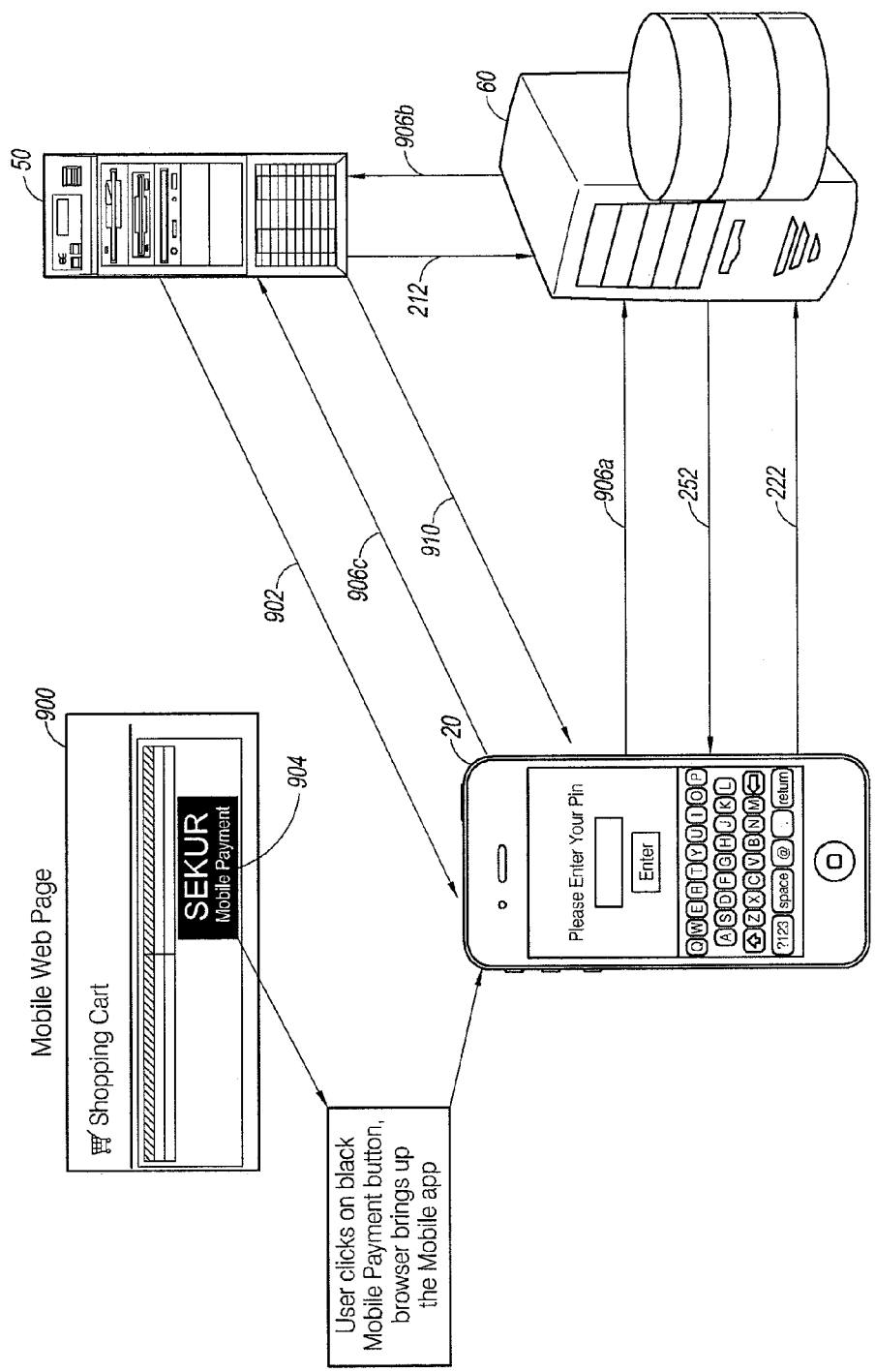
FIG. 25 schematically illustrates an example configuration for providing a secured ecommerce transaction in accordance with certain embodiments described herein.

FIG. 25 schematically illustrates an example configuration for providing a secured electronic payment capability in accordance with certain embodiments described herein. In certain such embodiments, an electronic device 20 (e.g., a mobile device, mobile phone, smartphone, tablet) can be used to advantageously provide a significantly more secure and faster online electronic payment capability than is conventionally available. While described below with reference to websites, the example configurations described below can be used on any payment terminal or a point of sale system for fast and safe payments.

The user 10 can use an electronic device 20 running a user browser with the intention of making a payment. For example, the payment may be made at the end of an online shopping session hosted by the computer 50 (e.g., a web server as shown in FIG. 25). For example, as shown in FIG. 25, a mobile web page being displayed on the electronic device 20 can be a "shopping cart" page 900 used in the payment process (or in the context of a secured information portal, an access page). The computer 50 can transmit a first signal 212 (e.g., a start signal) comprising an identifier 214 (e.g., a TSSID) to the validation server 60 which can indicate the potential beginning of a payment process. In certain embodiments, in addition to the first signal 212, the computer 50 also sends information regarding the company providing the secured capability, price, and shopping cart details to the verification server 60. The computer 50 can also provide the identifier 214 to the electronic device 20 along with a signal 902 to display a link 904 (e.g., a specially-formatted URL or other graphical image or alphanumeric "link") on the shopping cart page 900. In certain embodiments, the computer 50 can also provide the electronic device 20 with information regarding the company providing the secured capability, price, and shopping cart details. The link 904 can be displayed on the electronic device 20 in a form to be selected by the user 10. For example, in FIG. 25, the link 904 is displayed as a block "button" labeled "SEKUR Mobile Payment." The user 10 can initiate payment by clicking on the button, although other techniques may be used. The first signal 212 can be sent to the verification server 60 before, concurrently with, or after the signal 902 and the identifier 214 are sent to the electronic device 20.

Using the electronic device 20, once the user 10 initiates payment (e.g., by clicking or otherwise selecting the button), the browser running on the electronic device 20 can bring up the app, as indicated in FIG. 25 and the electronic device 20 can respond by invoking the app. In certain embodiments, the user 10 can enter a PIN or other identifier into the app, and the electronic device 20 can validate the user entry. The app running on the electronic device 20 can obtain the identifier 214 that the electronic device 20 received from the computer 50 and upon validating the PIN, the electronic device 20 can transmit the validation data, including the identifier 214 and user verification information 226, to the validation server 60 in the second signal 222.

The verification server 60 can check the identifier 214 and the user verification information 226 it receives from the electronic device 20 against its database (e.g., the first association 232 and the second association 234) to determine whether to authorize the user. For example, authorizing the user can comprise sending an authorization signal 252 (e.g., authentication information, a valid/invalid flag, Boolean true/false, zero/IP address or url of computer 50) from the validation server 60 to the electronic device 20. In certain embodiments, the authorization signal 252 comprises information regarding at least one of: the company providing the secured capability, the shopping cart, and the amount that is to be paid.

In certain embodiments, the electronic device 20, upon receiving the authorization signal 252, can automatically send a payment signal 906a to the validation server 60 to provide payment and shipping information to the computer 50, and the validation server 60 can send this information to the computer 50 (e.g., via signal 906b). In certain other embodiments, a payment signal 906c can instead be sent from the electronic device 20 to the computer 50 without passing through the validation server 60. The payment signal 906a, 906b, 906c can also be sent to a different server (e.g., a dedicated payment processing server) instead of, or in addition to, sending the payment signal 906b, 906c to the computer 50. In certain embodiments, the electronic device 20 can also send an authorization signal (e.g., a valid/invalid flag or authentication information) to the computer 50 as well. The computer 50, upon receiving the payment signal 906b, 906c, can process the payment and can display a receipt page (e.g., by sending a receipt signal 910 to the electronic device 20).

While the description above with regard to FIG. 25 is discussed in relation to an example ecommerce configuration, an example secure login configuration is also in accordance with certain embodiments described herein, as described below. While this description provides an example sequence of steps, this sequence of steps should not be interpreted as limiting, since two or more of the steps can be performed in other sequences relative to one another or can be performed concurrently with one another. In addition, while this example addresses a secured information portal context, certain embodiments described herein can be used in conjunction with other secured capabilities, such as secured structures (e.g., a locked door, fence, gate, elevator) that are operatively coupled to the computer 50 and that are configured to selectively inhibit physical access to a region (e.g., interior of a safe, building, house, vehicle, automobile, snack dispensing machine) or operation of a machine (e.g., automobile, elevator) to only authorized users.

In certain embodiments, an electronic device 20 (e.g., a mobile device, mobile phone, smartphone, tablet) can be used to advantageously provide a significantly more secure authorization and faster access capability than is conventionally available. While described below with reference to websites, the example configurations described below can be used on any secured access environment.

The user 10 can use an electronic device 20 miming a mobile browser with the intention of getting access to a secure environment. For example, the user may login to a bank's secure portal to access the user's account, hosted by the computer 50 (e.g., a web server). For example, a mobile web page being displayed on the electronic device 20 can be an access page. The computer 50 can transmit a first signal 212 (e.g., a start signal) comprising an identifier 214 (e.g., a TSSID) to the validation server 60 which can indicate the potential beginning of an authorization process. In certain embodiments, in addition to the first signal 212, the computer 50 also sends information regarding the company providing the secured capability and regarding the secured internet portal (e.g., website details) to the verification server 60. The computer 50 can also provide the identifier 214 to the electronic device 20 along with a signal 902 to display a link 904 (e.g., a specially-formatted URL or other graphical image or alphanumeric "link") on the login page. In certain embodiments, the computer 50 can also provide the electronic device 20 with information regarding the company providing the secured capability and regarding the secured internet portal (e.g., website details). The link 904 can be displayed on the electronic device 20 in a form to be selected by the user 10. For example, the link 904 can be displayed as a "button" labeled "SEKUR Login." The user 10 can initiate authorization by clicking on the button, although other techniques may be used. The first signal 212 can be sent to the verification server 60 before, concurrently with, or after the signal 902 and the identifier 214 are sent to the electronic device 20.

Using the electronic device 20, once the user 10 initiates authorization (e.g., by clicking or otherwise selecting the button), the browser running on the electronic device 20 can bring up the app, and the electronic device 20 can respond by invoking the app. In certain embodiments, the user 10 can enter a PIN or other identifier into the app, and the electronic device 20 can validate the user entry. The app running on the electronic device, 20 can obtain the identifier 214 that the electronic device 20 received from the computer 50 and upon validating the PIN, the electronic device 20 can transmit the validation data, including the identifier 214 and user verification information 226, to the validation server 60 in the second signal 222.

The verification server 60 can check the identifier 214 and the user verification information 226 it receives from the electronic device 20 against its database (e.g., the first association 232 and the second association 234) to determine whether to authorize the user. For example, authorizing the user can comprise sending an authorization signal 252 (e.g., authentication information, a valid/invalid flag, Boolean true/false, zero/IP address or url of computer 50) from the validation server 60 to the electronic device 20.

Using a Pushed Identifier

Certain embodiments described herein use a "push" feature to transmit an identifier corresponding to the secured capability to the user. In certain embodiments, the identifier is pushed by the computer 50 providing the secured capability to the electronic device 20 being used by the user, while in certain other embodiments, the identifier is pushed by the verification server 60 to the electronic device 20 being used by the user.

Figure 26A:
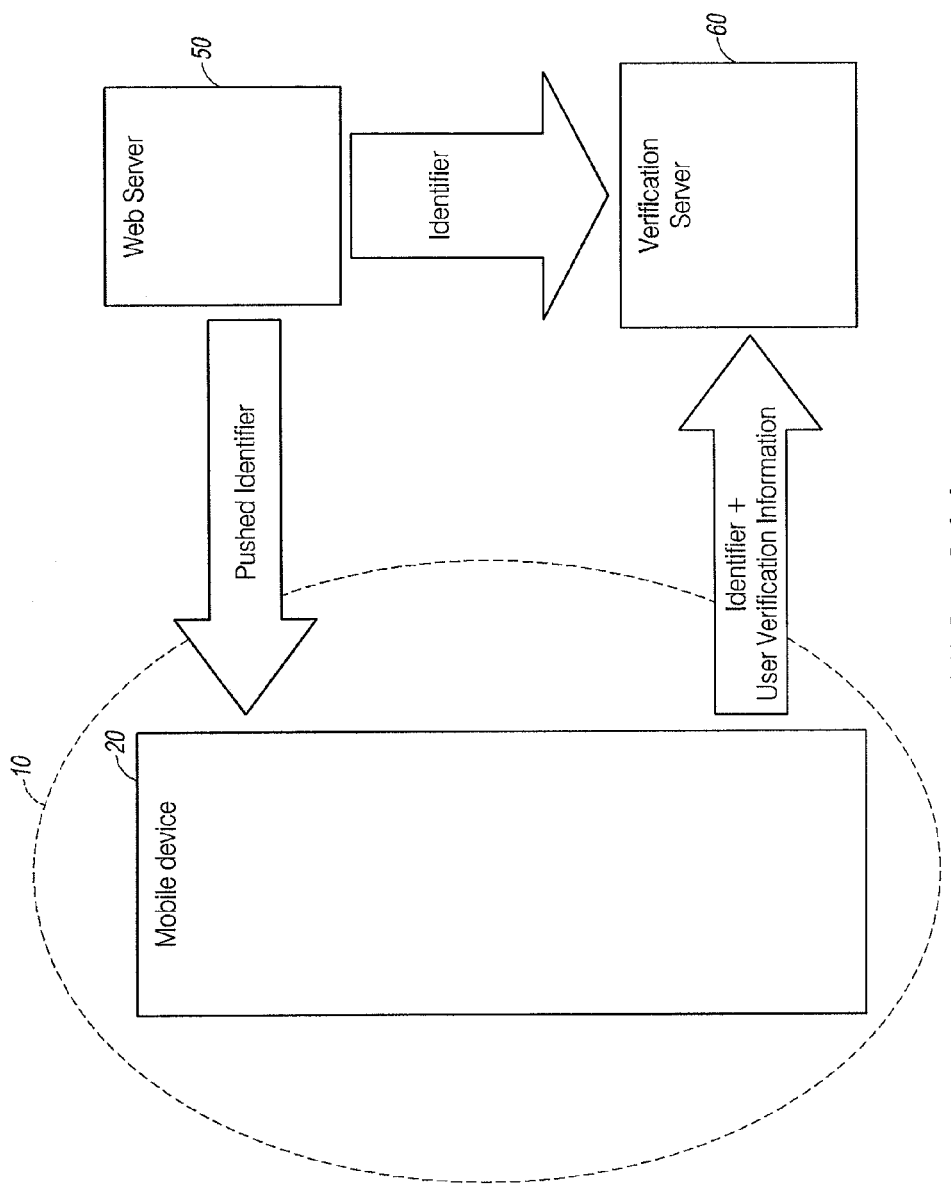
FIGS. 26A and 26B schematically illustrate an example subset of the configuration of FIG. 22 showing two example aspects of communication among components of the configuration in accordance with certain embodiments described herein.
Figure 26B:
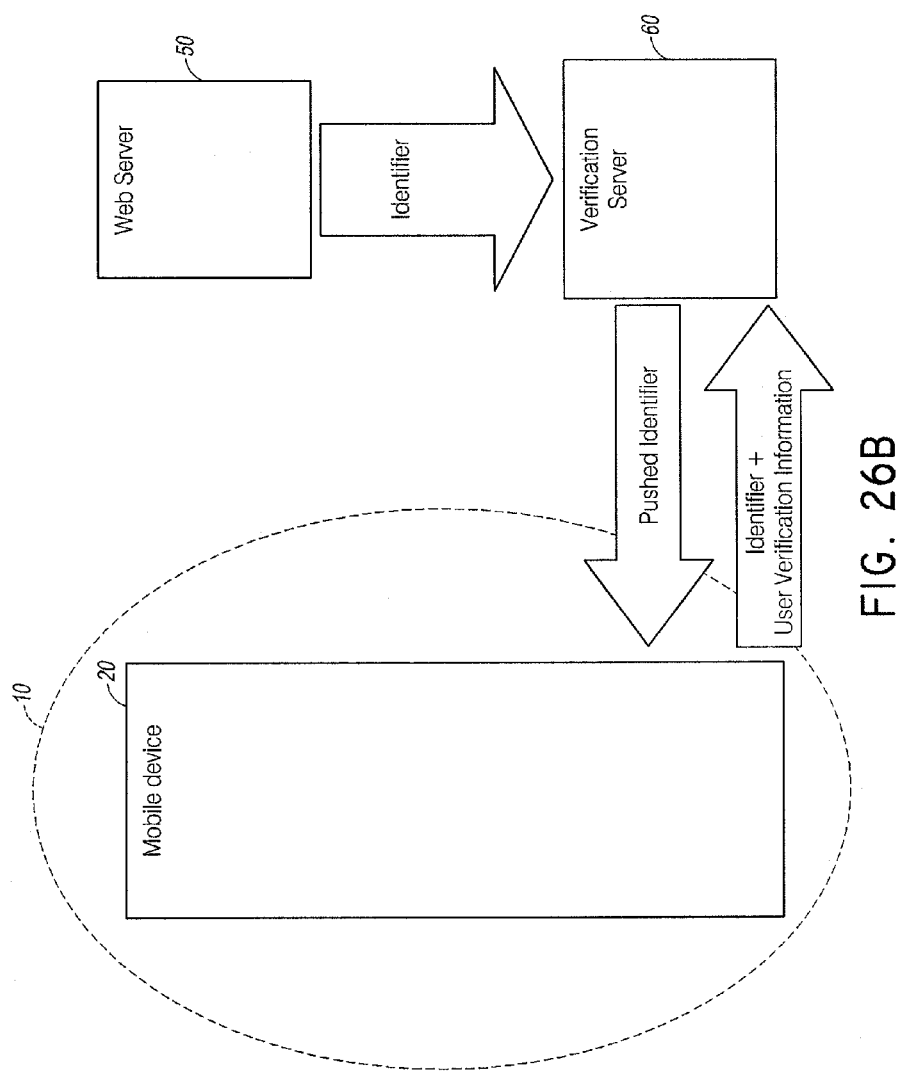

FIGS. 26A and 26B schematically illustrate an example subset of the configuration of FIG. 22 showing two example aspects of communication among components of the configuration in accordance with certain embodiments described herein. While the description herein includes numerous communication schemes, the example communication schemes of FIGS. 26A and 26B can be helpful for understanding the general context in which certain embodiments described herein can be used.

In the example communication scheme of FIG. 26A, the user 10 utilizes an electronic device 20 (e.g., a mobile device, a mobile phone, a smartphone, a tablet) in an authorization (e.g., authentication, verification) process in a manner similar to that described above with regard to FIG. 23. The computer 50 of the example configuration of FIG. 26A provides identifiers both to the electronic device 20 and to the verification server 60 by pushing an identifier to the electronic device 20 and providing an identifier to the verification server 60 (e.g., with the identifier being pushed by the computer 50 to the electronic device 20 before, after, or concurrently with the identifier being provided by the computer 50 to the verification server 60). Both identifiers correspond to the secured capability (e.g., they can be the same as one another or can be related to one another with a known and predetermined relationship).

In the example communication scheme of FIG. 26B, the user 10 utilizes an electronic device 20 (e.g., a mobile device, a mobile phone, a smartphone, a tablet) in an authorization (e.g., authentication, verification) process, but instead of the computer 50 pushing the identifier to the electronic device 20 as in FIG. 26A, the verification server 60 pushes the identifier to the electronic device 20. For example, the computer 50 can provide an identifier to the verification server 60 and the verification server 60 can subsequently push an identifier to the electronic device 20. Both identifiers correspond to the secured capability (e.g., the identifiers can be the same as one another or can be related to one another with a known and predetermined relationship).

Figure 27:
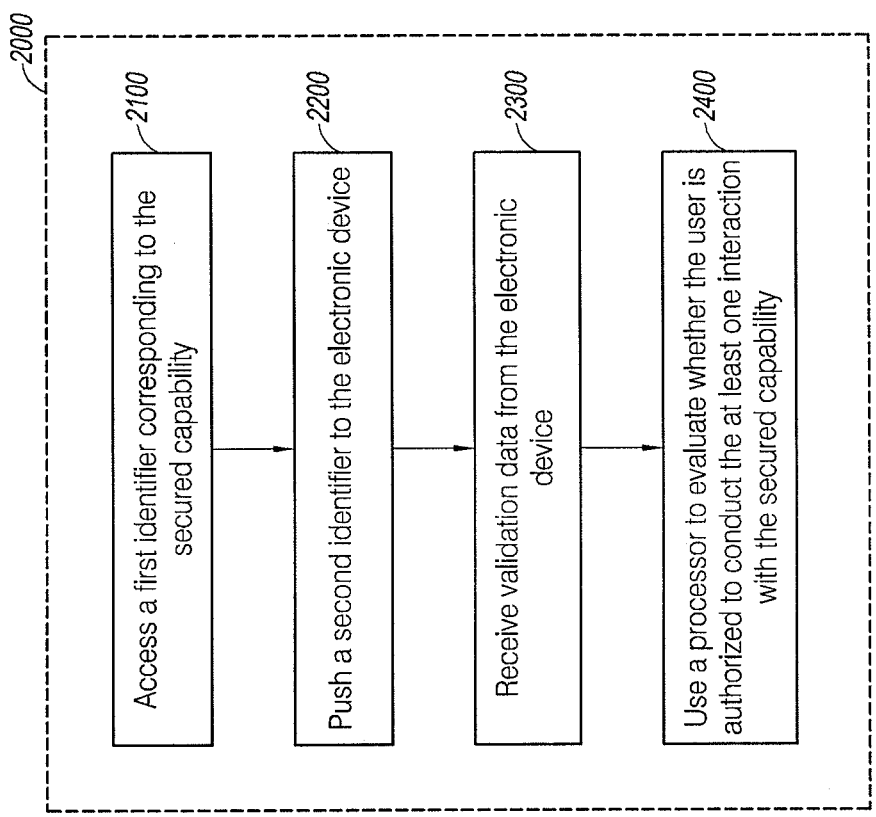
FIG. 27 is a flow diagram of another example method of authenticating a user seeking to conduct at least one interaction with a secured capability provided by a computer, in accordance with certain embodiments described herein.

FIG. 27 is a flow diagram of an example method 2000 of authenticating a user 10 seeking to conduct at least one interaction with a secured capability provided by a computer 50, in accordance with certain embodiments described herein. The example method 2000 is described herein with regard to the aspects of an authorization process that are performed by the verification server 60, with the verification server 60 pushing the identifier to the electronic device 20 (see, e.g., FIG. 26B).

In certain other embodiments, rather than the verification server 60 performing the push of the identifier to the electronic device 20, the computer 50 providing the secured capability performs the push of the identifier to the electronic device 20 (see, e.g., FIG. 26A). Other aspects of an authorization process are performed by a computer providing the secured capability (e.g., a computer 50) and the electronic device 20, as described herein.

In an operational block 2100, the method 2000 comprises accessing a first identifier 214a corresponding to the secured capability. For example, in certain embodiments (e.g., in which the computer 50 stores the pool of identifiers), the verification server 60 can access (e.g., receive) the first identifier 214a from the computer 50 providing the secured capability. The first identifier 214a can be interpreted by the verification server 60 as the initiation of an authentication process. As described above, a SaaS server (e.g., which can be considered to be part of the plurality of computers 50) can store the pol of identifiers and can select an identifier for each transaction, which can allow a larger pool of identifiers to be more efficiently maintained. In certain such embodiments, the computer 50 requests an identifier from the SaaS server with the identifier to correspond to (e.g., assigned to be used by) the secured capability of the computer 50. In turn, the SaaS server accesses an identifier from the pool of identifiers and provides the identifier to the computer 50. Thus if the SaaS server is considered part of the plurality of computers 50, the computers 50 provide a signal comprising an identifier to the verification server 60 which then accesses the signal. In certain other embodiments (e.g., in which the verification server 60 stores the pool of identifiers), the selection of an identifier can be performed by the verification server 60. As described above, a SaaS server (e.g., which can be considered to be part of the at least one verification server 60) can store the pool of identifiers and can select an identifier for each transaction, which can allow a larger pool of identifiers to be more efficiently maintained. In certain such embodiments, the computer 50 communicates a request to the SaaS server for a first identifier, with the first identifier to correspond to (e.g., assigned to be used by) the secured capability of the computer 50. In turn, the SaaS server accesses a first identifier from the pool of identifiers and provides the first identifier to the computer 50. Thus, if the SaaS server is considered part of the at least one verification server 60, in response to the request from the computer 50, the verification server 60 accesses an identifier corresponding to (e.g., assigned to be used by) the secured capability, and provides the identifier to the computer 50. As described herein, in certain embodiments, the identifier is assigned to be used by the secured capability for a finite period of time.

In an operational block 2200, the method 2000 further comprises pushing a second identifier 214b to the electronic device 20. For example, the verification server 60 can push the second identifier 214b to the electronic device 20 in response to having accessed (e.g., received) the first identifier 214a. The second identifier 214b corresponds to the secured capability (e.g., the second identifier 214b matches the first identifier 214a or is related to the first identifier 214a with a known and predetermined relationship). In certain embodiments, rather than having the verification server 60 push the second identifier 214b to the electronic device 20, the computer 50 providing the secured capability pushes the second identifier 214b to the electronic device 20.

In an operational block 2300, the method 2000 further comprises receiving validation data (e.g., user verification information 226) from the electronic device 20. For example, the verification server 60 can receive the validation data from the electronic device 20 along with a third identifier 214c transmitted by the electronic device 20 (e.g., concurrently or non-concurrently with the validation data). The third identifier 214c, corresponding to a secured capability of the plurality of secured capabilities, can match a first identifier 214a or a second identifier 214b, or can be related to a first identifier 214a or a second identifier 214b with a known and predetermined relationship.

In an operational block 2400, the method 2000 further comprises using a processor to evaluate, based at least on the validation data and at least one of the first identifier 214a, the second identifier 214b, and the third identifier 214c, whether the user is authorized to conduct the at least one interaction with the secured capability. The method 2000 can further comprise providing (e.g., transmitting) an authorization signal to at least one of the electronic device 20 and the computer 50. In response to the authorization signal (e.g., containing authorization information), a processor of the computer 50 can be used to provide the user with access to conduct the at least one interaction with the secured capability.

An example computer system 200 (e.g., a verification server 60) in accordance with certain embodiments described herein for performing the method 2000 is shown schematically in FIG. 3B. While the method 2000 is described herein by referencing the structural components shown in FIG. 3B, the method 2000 may be performed by other structural components. In the discussion herein, the identifier 214 can be embodied in different expressions, each of which, corresponds to the secured capability. For example, the identifier 214 can be embodied by a first identifier 214a, a second identifier 214b, a third identifier 214c, or other identifiers that are related to one another by known and predetermined relationships.

The validation data (e.g., user verification information 226) can be stored on, or can be otherwise accessible by, the electronic device 20. In certain embodiments, the user verification information 226 comprises information that can be used to verify and authenticate the user (e.g., a verifiable "fingerprint" of the user and mobile device). For example, the user verification information 226 can comprise information regarding (e.g., specific to) the user (e.g., the user's first name, family name, email address, phone number), information regarding (e.g., specific to) the electronic device 20 (e.g., a device identification character string, hardware-specific information such as manufacturer or operating system of the electronic device 20), or both. In certain embodiments, the user verification information 226 can comprise information derivable from user-specific information (e.g., predetermined portions of the user-specific information that would not themselves contain private information) or information derivable from device-specific information (e.g., predetermined portions of the device-specific information that would not themselves contain private information). The user verification information 226 may or may not be encrypted.

The user verification information 226 corresponding to users that are authorized to access at least one secured capability can be stored in the storage device 230 in the second association 234 (e.g., in a database or look-up table) that keeps track of both the user verification information 226 and the authorized user which it denotes. In certain embodiments, the user verification information 226 is not made available to the computer 50. In certain embodiments, the second association 234 also includes information regarding which secured capabilities each of the users denoted by user verification information 226 is authorized to access. Use of such user verification information 226 (e.g., user-specific information, device-related information, or both) can provide a desired level of security to ensure that the user 10 attempting to access the secured capability is an authorized user.

After having received the first identifier 214a and the validation data, the verification server 60 can evaluate (e.g., using the processor 240), based at least on the validation data and at least one of the first identifier 214a, the second identifier 214b, and the third identifier 214c, whether the user 10 is authorized to conduct the at least one interaction with the secured capability in the operational block 2400. For example, the verification server 60 can correlate the first identifier 214a with the third identifier 214c from the electronic device 20. Correlated identifiers will both correspond to the same secured capability (e.g., will correspond in a predetermined manner with one another or will match one another). The verification server 60 can also utilize the identifier 214 with the first association 232 of each secured capability with at least one corresponding identifier 214 to identify the secured capability that the user 10 is attempting to access. For example, using a received identifier 214 (e.g., one or both of the first identifier 214a and the third identifier 214c), the validation server 60 can access the first association 232 to determine (e.g., look up) which secured capability (or computer 50, or both) corresponds to the received identifier 214. The verification server 60 can also utilize the user verification information 226 and the second association 234 of the user verification information 226 with corresponding verified users 10 to evaluate, based at least on the user verification information 226, whether the user 10 of the electronic device 20 is one of the verified users of the secured capability. For example, using the user verification information 226, the verification server 60 can access the second association 234 to determine (e.g., look up) which user corresponds to the user verification information 226. If the user verification information 226 received from the electronic device 20 does not match any of the entries of the second association 234, then the user is deemed to not be one of the verified users of the secured capability. Also, in certain embodiments in which the second association 234 also includes information regarding which secured capabilities the user denoted by the user verification information 226 is authorized to access, the verification server 60 can use the second association 234, the user verification information 226, and the identifier 214 to determine (e.g., look up) whether the user is authorized to access the particular secured capability that the user is seeking to access.

In certain embodiments, the verification server 60 also checks whether the electronic device 20 (e.g., mobile device, mobile phone, smartphone, tablet) is deactivated. For example, upon receipt of a notification (e.g., from the user or from a third party authorized to provide such notifications), the verification server 60 can place the user's electronic device 20 on a stored list of deactivated electronic devices 20 that have been deactivated from use by the verification server 60. Such notifications can be provided to the verification server 60 upon discovery that the user's electronic device 20 is lost or stolen. Deactivated electronic devices 20 (e.g., those on the stored list of deactivated devices) would not be authorized by the verification server 60. Certain such embodiments can provide a way for a user to deactivate a lost or stolen electronic device 20 and to stop access by people other than the user.

In certain embodiments in which the identifier 214 is only valid for a finite and predetermined period of time, the validation server 60 can determine a first time of receipt of the first signal 212 and a second time of receipt of the second signal 222, and can compare the time differential between the first time and the second time. If the time differential is less than or equal to the finite and predetermined period of time for the identifier 214, the validation server 60 can evaluate that the user 10 is authorized to conduct the at least one interaction with the secured capability corresponding to the identifier 214. If the time differential is greater than the finite and predetermined period of time for the identifier 214, the validation server 60 can evaluate that the user 10 is not authorized to access the secured capability. In certain other embodiments in which the identifier 214 is only valid for a finite and predetermined period of time, after the period of time has elapsed, the verification server 60 deletes the record corresponding to the identifier 214. Certain such embodiments avoid performing any timestamp comparison. In certain other embodiments, the computer 50 can request from the verification server 60 to renew the identifier 214 for another finite and predetermined period of time, before such period of time has elapsed.

The authorization information can comprise a flag indicating that the user 10 is authorized to conduct the at least one interaction with the secured capability, can comprise additional information regarding the conditions of the user 10 accessing the secured capability (e.g., number of interactions that are authorized, the type of interactions that are authorized), or both. For example, in certain embodiments, the authorization information sent to the computer 50 in the third signal 252 can comprise an identifier that is unique to the user 10. The computer 50 can use this identifier to identify the user 10. For example, for a login to a secured account, the computer 50 can use this identifier to select which user's account to present to the browser running on the electronic device 30.

In certain embodiments in which the secured capability is a purchase of an ecommerce transaction and the third signal 252 comprising the authorization information is transmitted to the electronic device 20, the first signal 212 from the computer 50 can further comprise invoice information corresponding to the purchase, and the third signal 252 can also comprise the invoice information. In certain other embodiments, the invoice information is sent to the electronic device 20 from a second output of the validation server 60.

The electronic device 20 can respond to the third signal 252 by transmitting payment information to at least one of the computer 50, the validation server 60, or a payment processing gateway. For example, the payment information can comprise a confirmation (e.g., in a fourth signal) that a payment by the user 10 was made, and the output can be configured to transmit the confirmation to the computer 50. In certain embodiments, the payment information further comprises shipping information and/or billing information. For example, the electronic device 20 can transmit to the computer 50 shipping information for delivery corresponding to the purchase. In other embodiments, the payment information, with or without shipping information and/or billing information, is transmitted to the validation server 60 (e.g., by signal 804), and in turn is transmitted to the computer 50 by the validation server 60 (e.g., by signal 808).

In certain embodiments, the user has previously entered one or more sets of payment information (e.g., shipping information, billing information, or both) into the first electronic device 20 and the transmitted payment information comprises a selected set of the previously-entered one or more sets of payment information. For example, the electronic device 20 can contain information regarding multiple payment options (e.g., credit card accounts, debit card accounts, checking accounts, or other ACH/electronic payment options) available to the user. The user can enter the one or more sets of payment information into electronic device 20 as part of the setup procedure of the app configuration or as part of an update of information available to the app. During or prior to conducting a transaction, the user can be provided the opportunity to identify which of these payment options is to be used for the present transaction (e.g., to change the payment option or to allow a default payment option to be used), and the information regarding the selected payment option can be transmitted by the electronic device 20 in response to the third signal 252. In certain such embodiments, payment can be confirmed on the electronic device 20 before the payment information is transmitted. For example, the confirmation of the payment can be done by the selection of the payment option to be used.

In certain embodiments, the payment or login information comprises one or more of the following: user information (e.g., one or more of the user's name, mailing address, email address, phone number), means of payment information (e.g., one or more credit card, debit card, checking or savings account information, or other payment account information), which can be stored on the electronic device 20 or can be stored and accessible elsewhere on the internet (e.g., "in the cloud"), shipping information (e.g., one or more user information data records indicating the address to be used for shipping; the shipping information field can be empty where there is no need for a physical product shipment, and one shipping information can be shared among one or more payment information fields), billing information (e.g., one or more user information data records indicating the address to be used for billing; the billing information field can be empty where there is no need for billing, and one billing information can be shared among one or more payment information fields), userID (e.g., a registered combination of alphanumeric, special characters, or both that may be optionally followed by a password input, as a separate input field, composed of alphanumeric, special characters, or both), and authorized Login URL (e.g., a special url, composed of a site login url and an authorized user identification).

In certain embodiments, the electronic device 20 can respond to the third signal 252 by transmitting payment information to a payment gateway (e.g., a computer system with a processor configured to receive such payment information and to facilitate the transfer of funds) via the interne or a network. Certain such embodiments in which the electronic device 20 transmits payment information to the payment gateway can advantageously reduce credit card theft or fraud, can significantly increase user security, can make compliance with Payment Card Industry (PCI) data security standards easier and less costly, and/or to make anonymous payments in which the user's name or credit card information are not provided to the merchant of the goods or services being purchased. Certain embodiments described herein also include the capability of performing anonymous secured or verified login.

In certain embodiments, the payment information available to be selected by the user and transmitted by the electronic device 20 (e.g., credit or debit account information, bank account information) can be stored on the electronic device 20 while in certain other embodiments, the payment information can be stored in the "cloud" in a manner that is accessible to the electronic device 20. By storing the payment information on the electronic device 20 and not the cloud, the financial incentive for hackers to break into a data storage can be removed since the relatively small amount of information (e.g., just a few credit card numbers) stored on the electronic device 20 would not be worth the time, effort, and cost of breaking into an individual electronic device 20.

In certain embodiments, the computer system can be configured to provide the option of charging different amounts (e.g., to the user or to the entity running the computer 50) for the different available payment options. For example, it may be cheaper for the computer 50 to process ACH payments, so a lower price may be offered to the user for using an ACH payment option. In certain other embodiments, the computer system can be configured to only allow one or more payment options to be used with a particular computer 50. For example, a computer 50 may only be able to process ACH payments, to the computer system may only allow the user to select that payment option when transacting with the computer 50. In certain embodiments, the information regarding available payment options and their corresponding payment amounts can be provided by the computer 50 to at least one of the processor of the verification server 60 and the user (e.g., via the electronic device 20).

In certain embodiments (e.g., in which the electronic device 20 comprises a smartphone or a tablet), pushing the second identifier 214b to the electronic device 20 can be performed using a service such as Goggle Cloud Messaging (GCM) or IOS Push Notification in which the pushed message contains the second identifier 214b (e.g., sent from either the computer 50 or the verification server 60 to the electronic device 20). The identifiers 214a, 214b of certain such embodiments can be independent of the actual identity of the user or the electronic device 20 (e.g., independent of the phone number of the electronic device 20), which can provide a measure of anonymity to the interaction. In certain other embodiments (e.g., in which the electronic device 20 comprises a mobile phone having short message service or SMS capability), the verification server 60 can push a text message to the electronic device 20, prompting the user to respond by sending a return text message back to the verification server 60. In certain such embodiments, the phone number of the electronic device 20 can serve as both the second identifier and the validation data.

In certain such embodiments, the computer 50 provides identifying information to the verification server 60 sufficient for the verification server 60 to know where to push the text message. For example, the computer 50 can send a prompt to the user, to which the user responds by sending the computer 50 a signal comprising information identifying the user (e.g., a UserID or the phone number of the electronic device 20). The identifying information can be provided by the computer 50 to the verification server 60 (e.g., in a signal sent from the computer 50 to the verification server 60). The verification server 60 can respond to the identifying information provided by the computer 50 by at least temporarily associating the phone number with the first identifier 214a (e.g., the first identifier 214a received from the computer 50 or selected by the verification server 60). Thus, the verification server 60 can use and maintain an up-to-date association (e.g., a database or look-up table stored on the storage device 230) that correlates phone numbers to first identifiers. This association can be used to effectively note which phone numbers correspond to which secured capabilities, thereby allowing use of the phone numbers as the second identifiers 214b corresponding to the secured capabilities.

For example, if the identifying information provided by the computer 50 includes the phone number of the electronic device 20, the verification server 60 can push a text message to the electronic device 20 having the phone number. For another example, if the identifying information provided by the computer 50 includes a userID, the verification server 60 can determine which electronic device 20 corresponds to the userID (e.g., using a stored database or look-up table that correlates the userIDs with corresponding electronic device phone numbers) and the verification server 60 can push a text message to the electronic device 20 having the phone number corresponding to the userID. In either example, the verification server 60 can update a stored association to note that the phone number is associated with the first identifier 214a received from the computer 50 and that the phone number corresponds to the secured capability of the computer 50 to which access is being attempted. Thus, the first identifier 214a and the phone number (e.g., being used as the second identifier 214b) both correspond to the secured capability.

The pushed text message from the verification server 60 to the electronic device 20 can be configured to prompt the user to send a text message response from the electronic device 20 to the verification server 60. For example, the pushed text message from the verification server 60 can be "Do you wish to access [the secured capability]?" and the user can respond by texting "Yes" to the verification server 60. Upon verifying a relationship of the phone number from the return text message with a first identifier 214a and verifying that the phone number from the return text message corresponds to an authorized user (e.g., checking the phone number against a database or look-up table), the verification server 60 can authorize the user to access the secured capability. Thus, the verification server 60 can use the phone number of the return text message as both the second identifier 214b and the user verification information 226.

In certain embodiments in which the first identifier 214a and the second identifier 214b are each only valid for a finite and predetermined period of time, and the period of time has elapsed after the pushed text message has been sent from the verification server 60 to the electronic device 20, the verification server 60 can further update the stored association to note that the phone number is no longer associated with the first identifier 214a and that the phone number no longer corresponds to the secured capability. For example, the verification server 60 can check to see if the period of time has elapsed between pushing the text message to the electronic device 20 and receiving the return text message from the electronic device 20. If the period of time has not elapsed, the verification server 60 will find that the phone number corresponds to the secured capability, and the authentication process can proceed. If the period of time has elapsed, the verification server 60 will find that the phone number does not correspond to the secured capability, so the authentication process will not authenticate the user.

Geolocation-Based Authorization

In certain embodiments (e.g., in conjunction with use of reusable identifiers, specially-formatted URLs, or pushed identifiers), the computer system can evaluate whether the user 10 is authorized to access the secured capability based at least in part on the geographic location of the user 10. For example, the electronic device 20 can generate information regarding the geographic location of the user 10 (e.g., by a global positioning system utility of the electronic device 20), and this information can be included in the second signal 222 transmitted from the electronic device 20 (e.g., with the verification data). The verification server 60 can store one or more geolocation rules which are applied to the incoming information as part of the authorization process. Example geolocation rules for authorizing access in accordance with certain embodiments described herein include, but are not limited to, the following:

user is within a predetermined distance from a predetermined location (e.g., within 500 feet of the user's office; within 100 miles of the user's home; within 10 feet of an ATM).

user is outside a business establishment (e.g., preventing a customer within one business establishment from purchasing from another business establishment's website).

user is outside one or more predetermined nations (e.g., outside Russia, Romania, and Indonesia; outside nations or regions where hacking activity is suspected to occur).

Rather than having the verification server 60 apply one or more geolocation rules as part of the authorization process, in certain embodiments, the one or more geolocation rules are applied by the computer 50 (e.g., after having received the information regarding the user's geographic location from either a signal transmitted to the computer 50 by the electronic device 20 or a signal transmitted to the computer 50 by the verification server 60 after the verification server 60 receives the information from the electronic device 20), and the computer 50 decides whether to allow the access to occur.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention.

What is claimed is:

1. A method of authenticating a user seeking to conduct at least one interaction with a secured capability provided by a computer system, the method comprising:

using the computer system to provide a first identifier to at least one verification server, the first identifier corresponding to the secured capability;

using the computer system to provide, to an electronic device being used by the user, a user-selectable application-specific resource identifier with a second identifier corresponding to the secured capability, the user-selectable application-specific resource identifier configured to, upon being selected by the user, initiate an app to run on the electronic device, the app configured to access the second identifier, to access user verification information, and to transmit a third identifier and the user verification information to the at least one verification server, the third identifier corresponding to the secured capability;

using the computer system to receive authorization information from at least one of the electronic device and the at least one verification server, the authorization information indicative of the user being authorized to conduct the at least one interaction with the secured capability; and using a processor of the computer system to provide the user with access to conduct the at least one interaction with the secured capability in response at least to the authorization information.

2. The method of claim 1, wherein at least two of the first identifier, the second identifier, and the third identifier match one another.

3. The method of claim 1, wherein at least two of the first identifier, the second identifier, and the third identifier are related to one another with a predetermined relationship.

4. The method of claim 1, wherein the user-selectable application-specific resource identifier comprises a specially-formatted uniform resource identifier (URI) compatible with a custom URI scheme.

5. The method of claim 1, wherein the user-selectable application-specific resource identifier is selectable by clicking one button.

6. The method of claim 1, wherein the authorization information is received from the at least one verification server.

7. The method of claim 1, wherein the at least one interaction comprises a purchase.

8. The method of claim 7, further comprising providing information regarding a company providing the secured capability, price, and shopping cart details to the at least one verification server.

9. The method of claim 8, further comprising providing the information to the electronic device.

10. The method of claim 7, wherein the authorization information comprises information regarding at least one of: a company providing the secured capability, a shopping cart, and an amount that is to be paid.

11. The method of claim 7, further comprising sending a receipt signal to the electronic device.

12. The method of claim 1, wherein the at least one interaction comprises retrieval of information from or access to a secured internet portal.

13. The method of claim 12, further comprising providing information regarding a company providing the secured capability and regarding the secured internet portal to the at least one verification server.

14. The method of claim 13, further comprising providing the information to the electronic device.

15. The method of claim 1, wherein the computer and the at least one verification server are integrated with one another.

16. A non-transitory computer storage having stored thereon a computer program that instructs a computer system to authenticate a user seeking to conduct at least one interaction with a secured capability provided by the computer system by at least:
   using the computer system to provide a first identifier to at least one verification server, the first identifier corresponding to the secured capability;
   using the computer system to provide, to an electronic device being used by the user, a user-selectable application-specific resource identifier with a second identifier corresponding to the secured capability, the user-selectable application-specific resource identifier configured to, upon being selected by the user, initiate an app to run on the electronic device, the app configured to access the second identifier, to access user verification information, and to transmit a third identifier and the user verification information to the at least one verification server, the third identifier corresponding to the secured capability;
   using the computer system to receive authorization information from at least one of the electronic device and the at least one verification server, the authorization information indicative of the user being authorized to conduct the at least one interaction with the secured capability; and
   using a processor of the computer system to provide the user with access to conduct the at least one interaction with the secured capability in response at least to the authorization information.

17. The non-transitory computer storage of claim 16, wherein the user-selectable application-specific resource identifier comprises a specially-formatted uniform resource identifier (URI) compatible with a custom URI scheme.

18. The non-transitory computer storage of claim 16, wherein the at least one interaction comprises a purchase or retrieval of information from or access to a secured internet portal.

19. The non-transitory computer storage of claim 16, wherein at least two of the first identifier, the second identifier, and the third identifier match one another or are related to one another with a predetermined relationship.

20. A computer system hosting a secured capability with which a user is seeking to conduct at least one interaction, the computer system comprising:
   a memory; and
   a processor configured to:
      provide a first identifier to at least one verification server, the first identifier corresponding to the secured capability;
      provide, to an electronic device being used by the user, a user-selectable application-specific resource identifier with a second identifier corresponding to the secured capability, the user-selectable application-specific resource identifier configured to, upon being selected by the user, initiate an app to run on the electronic device, the app configured to access the second identifier, to access user verification information, and to transmit a third identifier and the user verification information to the at least one verification server, the third identifier corresponding to the secured capability;
      receive authorization information from at least one of the electronic device and the at least one verification server, the authorization information indicative of the user being authorized to conduct the at least one interaction with the secured capability; and
      provide the user with access to conduct the at least one interaction with the secured capability in response at least to the authorization information.

21. The computer system of claim 20, wherein the computer system and the at least one verification server are integrated with one another.

22. The computer system of claim 20, wherein the at least one interaction comprises a purchase.

23. The computer system of claim 22, wherein the processor is further configured to provide information regarding a company providing the secured capability, price, and shopping cart details to the at least one verification server.

24. The computer system of claim 23, wherein the processor is further configured to provide the information to the electronic device.

25. The computer system of claim 22, wherein the authorization information comprises information regarding at least one of: a company providing the secured capability, a shopping cart, and an amount that is to be paid.

26. The computer system of claim 22, wherein the processor is further configured to send a receipt signal to the electronic device.

* * * * *